US009865167B1

(12) United States Patent
Liang et al.

(10) Patent No.: US 9,865,167 B1
(45) Date of Patent: Jan. 9, 2018

(54) TRAFFIC CONTROL ASSISTING SYSTEM

(71) Applicant: Hitachi, Ltd., Tokyo (JP)

(72) Inventors: Yuxin Liang, Tokyo (JP); Masayoshi Mase, Tokyo (JP); Junji Yamamoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 15/496,986

(22) Filed: Apr. 25, 2017

(30) Foreign Application Priority Data

Sep. 1, 2016 (JP) ................................ 2016-170965

(51) Int. Cl.
*G08G 1/16* (2006.01)
*B63B 51/00* (2006.01)
*G01C 21/34* (2006.01)

(52) U.S. Cl.
CPC ..................................... *G08G 1/16* (2013.01)

(58) Field of Classification Search
CPC ........................................................ G08G 1/16
See application file for complete search history.

(56) References Cited

U.S. PATENT DOCUMENTS

2015/0344030 A1* 12/2015 Damerow ......... B60W 30/0956 701/1
2016/0103218 A1* 4/2016 Mandava .............. G01S 13/931 701/301
2017/0137025 A1* 5/2017 Muto .................... B60W 30/09
2017/0153644 A1* 6/2017 Otsuka ................. G05D 1/0214

FOREIGN PATENT DOCUMENTS

JP 2008-281488 A 11/2008
JP 2015-059896 A 3/2015
JP 2015-228204 A 12/2015
JP 2016-004495 A 1/2016
WO 2009053792 4/2009

* cited by examiner

*Primary Examiner* — Joseph Feild
*Assistant Examiner* — Pameshanand Mahase
(74) *Attorney, Agent, or Firm* — Procopio, Cory, Hargreaves & Savitch LLP

(57) ABSTRACT

A traffic control assisting system ("assisting system") stores action data on an action of a moving object, geographic data in which geographic attribute information, which is information on a reference of movement of the moving object, is imparted to individual segments that are meshes into which a map is divided, and responsiveness data on the moving object's responsiveness to an instruction. The assisting system estimates an ideal action of the moving object based on the responsiveness data; calculates a difference between the estimated action and an action in the action data; updates the responsiveness data based on a result of the calculation; estimates probability of presence of the moving object at certain coordinates at each time point based on the action data, the geographic data, and the responsiveness data and generates a geographic E map; and predicts future coordinates of the moving object based on the geographic E map.

16 Claims, 34 Drawing Sheets

FIG. 16

SESSION TABLE 9804

| SHIP NAME 9101 | LAST RECEPTION TIME POINT 9102 | DESTINATION 9103 | SESSION DATA ITEM 9104 | ... |
|---|---|---|---|---|
| 10032 | 2016/01/01 12:34:00 | TOKYO | [AIS DATA 1, AIS DATA 2,...] | ... |
| 10033 | 2016/01/01 12:34:01 | CHIBA | [AIS DATA 1] | ... |
| 10034 | 2016/01/01 12:34:04 | OSAKA | [AIS DATA 1, AIS DATA 2,...] | ... |

SESSION DATA 9805

| SESSION ID 9105 | SHIP NAME | START TIME POINT 9106 | LAST TIME POINT 9107 | DESTINATION 9108 | AIS RECEPTION TIME POINT 9109 | AIS DATA 9110 | ... |
|---|---|---|---|---|---|---|---|
| 0001 | 10032 | 2016/01/01 12:34:00 | 2016/01/01 22:34:00 | TOKYO | 2016/01/01 22:34:00 | [AIS DATA 1] | ... |
| | | | | | ⋮ | ⋮ | ⋮ |
| | | | | | 2016/01/01 22:34:00 | [AIS DATA N] | ... |

FIG. 17

| SHIP NAME 9101 | NUMBER OF ANALYSIS ACTIONS 9928 | INSTRUCTION TARGET SKILL Sp | | | |
|---|---|---|---|---|---|
| | | Sp_ship 9920 | Sp_skill 9922 | Sp_time 9921 | LAST UPDATE TIME POINT 9002 |
| Ship_A | 12 | [sp_deep = 0.5, sp_seawater = 1, ...] | [sp_deep = 2, sp_seawater = 1.2, ...] | 0.3 | 2016/1/1/ 00:00:00 |
| Ship_B | 8 | [sp_deep = 2, sp_seawater = 2, ...] | [sp_deep = 0.3, sp_seawater = 0.7, ...] | 0.95 | 2015/12/13/ 00:00:00 |
| Ship_C | 2 | [sp_deep = 0.1, sp_seawater = 0.1, ...] | [sp_deep = 0.1, sp_seawater = 0.1, ...] | 1 | 2000/10/10/ 00:00:00 |
| Ship_D | 0 | [sp_deep = 1, sp_seawater = 1, ...] | [sp_deep = 0, sp_seawater = 0, ...] | 1 | 1970/01/01/ 00:00:00 |

| SHIP NAME 9101 | RESPONSE SPEED Tr | | | DEGREE OF INSTRUCTION OBSERVANCE L | |
|---|---|---|---|---|---|
| | FIRST 9003 | ... | N-TH 9006 | IGNORANCE COUNT 9004 | RECEPTION COUNT 9005 |
| Ship_A | 3sec | ... | 5sec | 1 | 15 |
| Ship_B | 63sec | ... | 40sec | 7 | 13 |
| Ship_C | 9999sec | ... | 9999sec | 15 | 15 |
| Ship_D | 0sec | ... | 0sec | 0 | 0 |

INSTRUCTION RESPONSIVENESS DATA

9007

FIG. 19

COORDINATE AIS DATA

000

| AIS DATA# | SHIP NAME 9501 | STATEMENT DATE AND TIME | POSITION | DESTINATION 9503 | DISTANCE TO BOTTOM OF SHIP | SHIP SPEED 9505 | BOW DIRECTION 9506 | : |
|---|---|---|---|---|---|---|---|---|
| 10 | 10032 | 2016/01/01 12:34:00 | LONGITUDE: 135.60.23 LATITUDE: 35.00.23 | TOKYO | 20m | 12km/h | 30° (from North) | |
| 20 | NULL | 2016/01/01 12:34:01 | LONGITUDE: 135.50.23 LATITUDE: 35.10.23 | NULL | 30m | 12km/h | 30° (from North) | |
| 30 | 10032 | 2016/01/01 12:34:04 | LONGITUDE: 135.60.24 LATITUDE: 35.00.24 | TOKYO | 20m | 12km/h | 30° (from North) | |

FIG. 20

TRAFFIC CONTROL INSTRUCTION DISTRIBUTION DB

| CATEGORY 7903 | TRAFFIC CONTROL TARGET 7904 | DISTRIBUTION TIME POINT 7902 | DISTRIBUTION PLACE COORDINATES 7905 | INSTRUCTION SENTENCE 7901 |
|---|---|---|---|---|
| MOVE | SHIP_A | 2016/01/01/ 00:00:00 | N 24.2.2 E133.32.2 | MOVE TO N 23.2.2 E132.32.2 |
| AVOID | ALL | 2016/01/01/ 00:00:00 | N 24.2.2 E133.32.2 | AVOID N 25.2.2 E135.32.2 |
| SLOW | ALL | 2016/01/01/ 00:00:00 | N 24.2.2 E133.32.2 | CAUTION BAD WEATHER |

FIG. 21

009

SHIP INFORMATION DB

| SHIP NAME 9501 | REGISTERED NAME 7701 | TYPE OF SHIP 7702 | LOADAGE 7703 | SHIP WIDTH 7704 | SHIP LENGTH 7705 | SHIP DEPTH 7706 | MAXIMUM LOG SPEED 7707 | ... |
|---|---|---|---|---|---|---|---|---|
| 10001 | Titanic | PASSENGER SHIP | 5678t | 20m | 100m | 8m | 32km/h | |
| 10002 | TENSHO-MARU | CARGO SHIP | 3000t | 20m | 123m | 3.3m | 32km/h | |
| 10003 | Atlanta | TANKER | 7000t | 30m | 200m | 10m | 32km/h | |

FIG. 22

006

GEOGRAPHIC INFORMATION DB

| MESH ID 7601 | SEA AREA ID 7602 | OCEAN CURRENT 7603 | SHALLOW WATER 7604 | ICE FLOW 7605 | WEATHER 7606 | OCEANOGRAPHIC PHENOMENA 7607 | TOPOLOGY 7608 | SHOAL OF FISH 7609 | ... |
|---|---|---|---|---|---|---|---|---|---|
| 1 | 1 | 1 | 2 | 3 | 3 | 1 | 1 | 1 | |
| 2 | 1 | 2 | 0 | 2 | 1 | 1 | 0 | 2 | |
| 3 | 2 | 0 | 0 | 3 | 3 | 0 | 3 | 3 | |

GEOGRAPHIC E MAP DB

013

| MAP ID 7501 | SHIP NAME 9501 | TIME POINT 7502 | FOLLOWING TIME POINT MAP ID 7503 | MESH ID 7601 | GEOGRAPHY E 9907 | LATITUDE 7504 | LONGITUDE 7505 | ... |
|---|---|---|---|---|---|---|---|---|
| 0001 | 10031 | 2016/01/01/ 00:00:00 | 0002 | 1 | 123 | 23.2.2 | 123.2.2 | |
| | | | | 2 | 2 | 24.2.2 | 124.2.2 | |
| | | | | 3 | 32 | 25.2.2 | 125.2.2 | |

T=0

| | | |
|---|---|---|
| 50 | 40 | 50 |
| 20 | 10 | 30 |
| 30 | 20 | 30 |
| 999 | 999 | 999 |

T=1

| | | |
|---|---|---|
| 20 | 10 | 30 |
| 15 | 20 | 40 |
| 40 | 100 | 40 |
| 500 | 500 | 500 |

T=2

| | | |
|---|---|---|
| 15 | 20 | 20 |
| 30 | 50 | 40 |
| 80 | 200 | 80 |
| 999 | 999 | 999 |

FIG. 24

COURSE PREDICTION DB

014

| COURSE ID 7401 | SHIP NAME 9501 | TIME POINT 7502 | LONGITUDE 7505 | LATITUDE 7504 | MESH ID 7404 | SEA AREA ID 7602 | LONGITUDE SPEED 7403 | LATITUDE SPEED 7402 | ... |
|---|---|---|---|---|---|---|---|---|---|
| 1 | 10032 | 2016/01/01 12:34:00 | 135.60.23 | 35.00.23 | 1 | 1 | 0km/h | 1km/h | ... |
| | | 2016/01/01 12:34:01 | 135.60.23 | 35.00.23 | 1 | 1 | 0km/h | 1km/h | ... |
| | | 2016/01/01 12:34:02 | 135.60.23 | 35.00.24 | 2 | 2 | 0km/h | 1km/h | ... |
| ... | ... | ... | ... | ... | ... | ... | ... | ... | ... |
| 2 | 10033 | 2016/01/01 12:34:01 | 135.60.23 | 35.00.24 | 1 | 1 | 2km/h | 6km/h | ... |
| ... | ... | ... | ... | ... | ... | ... | ... | ... | ... |
| 3 | 10034 | 2016/01/01 12:34:01 | 135.60.23 | 35.00.24 | 1 | 1 | 3km/h | 5km/h | ... |
| ... | ... | ... | ... | ... | ... | ... | ... | ... | ... |

FIG. 25

ACCIDENT RISK DATA

| ANALYSIS ID 7301 | TARGET SEA AREA 7306 | TRAFFIC CONTROL PRIORITY 7302 | MAXIMUM ACCIDENT RISK 7307 | MESH ID 7601 | ACCIDENT RISK 7305 | TRAFFIC CONTROL TARGET SHIP NAME 7303 | TRAFFIC CONTROL TARGET COURSE ID 7304 | ... |
|---|---|---|---|---|---|---|---|---|
| 1 | [1,2,3] | 2 | 1234 | 1 | 1234 | [10032,10033,10034,...] | [1,2,3,...] | ... |
| | | | | 2 | 12 | [10032,10033,10034,...] | [1,2,3,...] | ... |
| | | | | 3 | 12 | [10032,10033,10034,...] | [1,2,3,...] | ... |
| ⋮ | ⋮ | ⋮ | ⋮ | ⋮ | ⋮ | ⋮ | ⋮ | ⋮ |
| 2 | [4] | 0 | 151 | 4 | 151 | [30032,30033] | [6,7] | ... |
| ⋮ | ⋮ | ⋮ | ⋮ | ⋮ | ⋮ | ⋮ | ⋮ | ⋮ |
| 3 | [5] | 1 | 1531 | 5 | 1531 | [20032,20033] | [4,5] | ... |
| ⋮ | ⋮ | ⋮ | ⋮ | ⋮ | ⋮ | ⋮ | ⋮ | ⋮ |

FIG. 26

EVASION METHOD INSTRUCTION DATA

| EVASION ID 7209 | TARGET SEA AREA 7208 | TRAFFIC CONTROL TARGET SHIP 7210 | OVERALL ACCIDENT RISK | TIME POINT 7202 | LATITUDE 7203 | LONGITUDE 7204 | SPEED 7205 | BOW ANGLE 7206 | ACCIDENT RISK | ... |
|---|---|---|---|---|---|---|---|---|---|---|
| 1 | [1,2] | 100032 | 703 | 2016/01/01 12:34:00 | 24.32.2 | 134.2.1 | 12km/h | 0 | 13 | ... |
| | | | | 2016/01/01 12:34:04 | 24.32.2 | 134.2.1 | 9km/h | 0 | 2 | ... |
| | | | | 2016/01/01 12:34:08 | 24.32.4 | 134.2.1 | 9km/h | 0 | 31 | ... |
| | | 100033 | 423 | 2016/01/01 12:34:00 | 24.33.4 | 134.3.1 | 12km/h | 30 | 5 | ... |
| | | ⋮ | ⋮ | ⋮ | ⋮ | ⋮ | ⋮ | ⋮ | ⋮ | ⋮ |
| | | 100034 | 603 | 2016/01/01 12:34:00 | 24.43.4 | 134.43.1 | 12km/h | 0 | 5 | ... |
| | | ⋮ | ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ | ⋮ | ⋮ | ⋮ |

FIG. 27

EVASION METHOD INSTRUCTION AND EVASION ORDER INSTRUCTION DATA

| EVASION ID 7209 | TARGET SEA AREA 7208 | TRAFFIC CONTROL TARGET SHIP 7210 | DISTRIBUTION TIME POINT 7102 | TRAFFIC CONTROL PRIORITY 7101 | INSTRUCTION SENTENCE 7901 | DISTRIBUTION PLACE ID 7103 | ... |
|---|---|---|---|---|---|---|---|
| 1 | [1,2] | 100032 | 2016/01/01 12:34:00 | 30 | KEEP MOVE | 1 | ... |
| | | | 2016/01/01 12:34:04 | 2 | SLOW DOWN to 5knot | 1 | ... |
| | | | 2016/01/01 12:34:08 | 31 | KEEP MOVE | 1 | ... |
| | | 100033 | 2016/01/01 12:34:00 | 5 | MOVE TO 132.2.2 | 1 | ... |
| | | ⋮ | ⋮ | ⋮ | ⋮ | | ⋮ |
| | | 100034 | 2016/01/01 12:34:00 | 6 | MOVE TO 141.2.2 | 2 | ... |
| | | ⋮ | ⋮ | ⋮ | ⋮ | ⋮ | ⋮ |
| 2 | [1,2] | ALL | 2016/01/01 12:34:00 | 1 | AVOID 131.2.2.2 | 1,2,3,4 | ... |
| ⋮ | ⋮ | ⋮ | ⋮ | ⋮ | ⋮ | ⋮ | ⋮ |

TRAFFIC CONTROL ASSISTING SYSTEM

CROSS-REFERENCE TO PRIOR APPLICATION

This application relates to and claims the benefit of priority from Japanese Patent Application number 2016-170965, filed on Sep. 1, 2016 the entire disclosure of which is incorporated herein by reference.

BACKGROUND

The present invention generally relates to moving object traffic control.

As described in Japanese Patent Application Nos. 2015-059896, there is a system that predicts coordinates of moving objects that travel in a space. As described in Japanese Patent Application Nos. 2015-228204 and 2008-281488, there are known methods for exploring the range over which a moving object can act based on, for example, information on the specifications of the moving object and predicting an action pattern of the moving object. However, in consideration of time spent until the moving object performs a traffic control instruction, possibility of the moving object's inobservance of the instruction, and other factors, it is difficult to consider all possibilities because there are too many traffic control prediction patterns. Among the huge number of options, however, only part thereof is achievable by an operator.

Japanese Patent Application Nos. 2015-059896 discloses a technology for creating a plurality of representative courses in accordance with statistics data for past travel routes of ship, and estimating future coordinates of the ship. However, the technology is unsuitable for traffic control since it is impossible for the technology to make a prediction as for a ship that moved to a coordinate which is not in a past travel history of the ship, the technology does not consider external factors such as another ship and weather conditions, and future coordinates may overlap when the future coordinates are predicted as for a plurality of ships.

Japanese Patent Application No. 2015-228204 discloses that as a method for exploring a method for determining, predicting, and avoiding automobile collision, a traffic context in a travel area is predicted from "in-vehicle drive information including the engine and the direction of the steering wheel" and "surrounding vehicle information acquired from sensors." However, the information is limited only to in-vehicle information, and no consideration is given to absence or delay of the information or whether or not a sensor is introduced. There is no guarantee of an environment that allows information transmission to an external traffic controller, and even if the environment allows information transmission, the information cannot be used as data used in analysis because absence of data or an error of the transmission occur.

Japanese Patent Application No. 2008-281488 discloses extraction of data on a scene in which a road on which the vehicle has actually traveled differs from a route presented by past travel history navigation and analysis of a driver's driving preference on the basis of the characteristics of the road on which the vehicle has actually traveled for prediction of "preference of the driver" who is driving the automobile. However, on the sea, there is no clear index that serves as "characteristics of a road on which a vehicle has traveled." Further, the example described above is intended to present a recommended route to the driver and does not allow prediction of the probability of the driver's selection of the route.

Japanese Patent Application No. 2016-004495 discloses that an operator's response time is measured from the timing when the operator steps down the brake and a warning is issued when the response speed decreases greatly as compared with the normal response speed. However, it is difficult for a traffic controller to externally grasp the "timing when the operator steps down the brake."

SUMMARY

The accuracy of ship course control is improved by increasing the number of items used in analysis. Increasing the number of items, however, increases the amount of calculation. It is therefore desired to reduce the amount of calculation with the traffic control accuracy maintained and improved. An object of the present invention is to provide a traffic control assisting system that maintains and improves traffic control accuracy with the amount of calculation reduced.

A traffic control assisting system (hereinafter assisting system) according to an embodiment stores action data on an action of a moving object, geographic data in which geographic attribute information, which is information on a reference of movement of the moving object, is imparted to individual segments that are meshes into which a map is divided, and responsiveness data on the moving object's responsiveness to an instruction. The assisting system estimates an ideal action of the moving object based on the responsiveness data, calculates a difference between the estimated action and an action in the action data, and updates the responsiveness data based on a result of the calculation. The assisting system estimates probability of presence of the moving object at certain coordinates at each time point based on the action data, the geographic data, and the responsiveness data and generates a geographic E map. The assisting system predicts future coordinates of the moving object based on the geographic E map.

According to the present invention, the traffic control accuracy can be maintained and improved with the amount of calculation reduced.

BRIEF DESCRIPTION OF THE DRAWINGS

FIG. 16 shows a session table in the AIS session classifier and the data structure of session data in a session DB;

FIG. 17 shows the data structure of an instruction responsiveness DB;

FIG. 19 shows the data structure of coordinate AIS data;

FIG. 20 shows the data structure of traffic control instruction distribution data;

FIG. 21 shows the data structure of a ship information DB;

FIG. 22 shows the data structure of a geographic information DB;

FIG. 24 shows the data structure of a course prediction DB;

FIG. 25 shows the data structure of accident risk data;

FIG. 26 shows the data structure of an evasion method instruction;

FIG. 27 shows the data structure of the evasion method instruction and evasion order instruction data;

DETAILED DESCRIPTION

Figure 1:
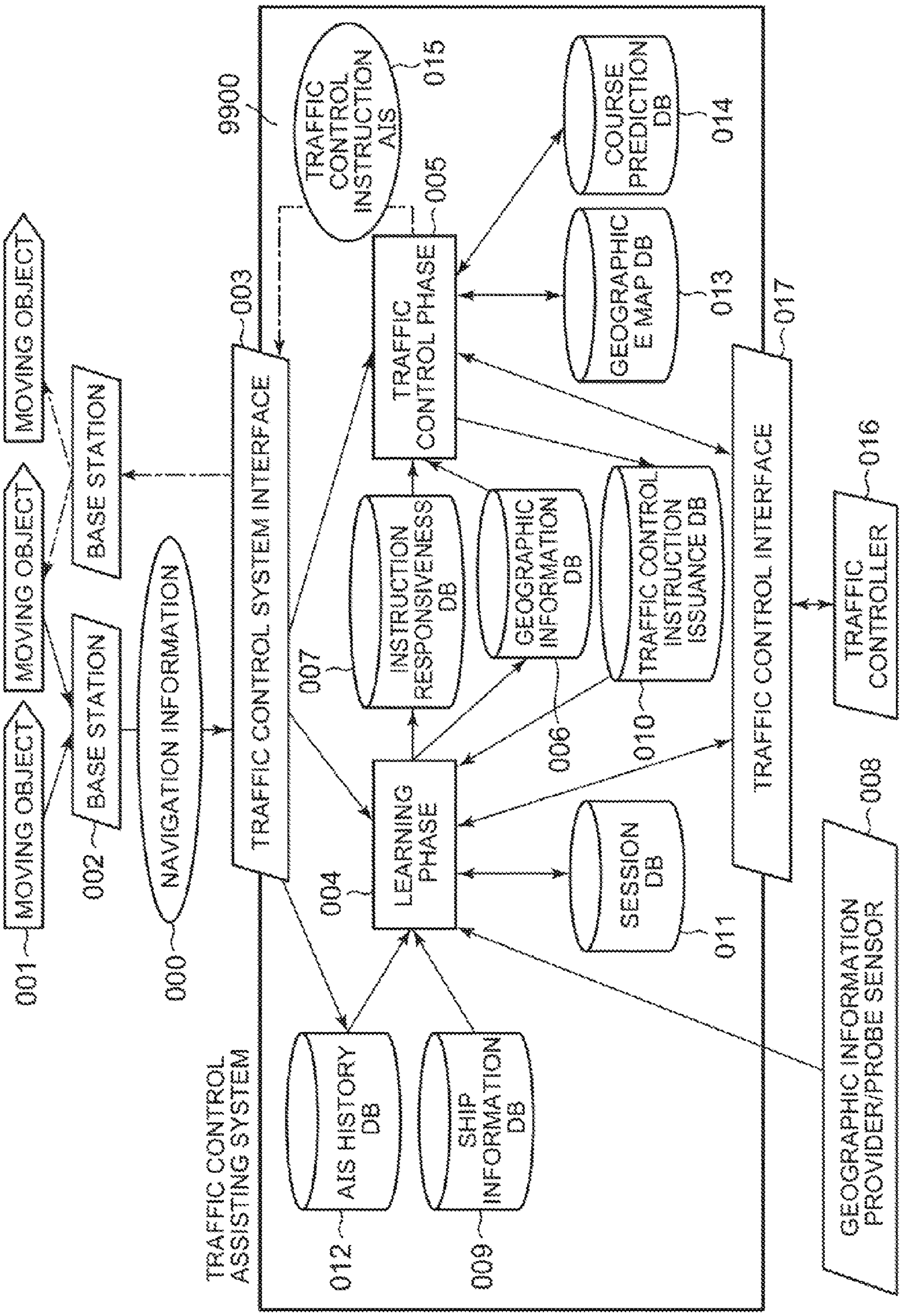
FIG. 1 is a block diagram of a traffic control assisting system.

Embodiments will be described below.

In the following description, information is described in some cases in the form of an "aaa table," an "aaa cue," or an "aaa list," but information may be expressed in any data structure. That is, to indicate that information is independent of a data structure, the "aaa table," the "aaa cue," or the "aaa list" can be called "aaa information."

Further, in the following description, a process is described in some cases with a "program" used as a subject of the sentence. Since a program, when executed by a processor (CPU (central processing unit), for example), carries out a specified process by using at least one of a storage resource (memory, for example) and a communication interface device as appropriate, the subject of a sentence including a process may instead be the processor or a device including the processor. Part or entirety of a process carried out by the processor may be carried out with a hardware circuit. A computer program may be installed by using a program source. The program source may be a program distribution server or a storage medium (portable storage medium, for example).

First Embodiment

A traffic control system according to the present embodiment controls the action of a moving object having a non-uniform movement characteristic and is characterized in that the probability of presence of the moving object at a certain time point at certain coordinates is estimated for improvement in the accuracy of position prediction in the traffic control and the number of patterns considered for detection of a near miss and generation of a traffic control instruction proposal is reduced for reduction in the amount of calculation.

The present embodiment is directed to a ship as an example of the moving object, and the space in which the moving object is movable is assumed to be the sea surface. The present system can, however, be used with moving objects and spaces different from those described above. For example, the present system can be used with an automobile that travels on the land, which is a two-dimensional space, and an airplane or a drone that travels in a three-dimensional space.

In the present embodiment, terms are defined as follows:

Unit time 9991 is a unit that defines the shortest time interval during which a traffic control assisting system 9900 carries out and updates a process. The unit time 9991 may be configured by a traffic controller 016, which will be described later, or may be configured in advance as a system operational limit.

The traffic controller 016 is a user of the traffic control assisting system 9900 and a person who is responsible for traffic control instruction distribution in a traffic controlled sea area 9992. The traffic controller 016 may be one person, a plurality of persons, or an automatic traffic control system.

An operator of a ship is a person (at the point of time of manual operation), a system (at the point of time of automatic operation), or a ship (at the point of time of tugboat traction) having authority to determine the traveling direction and acceleration/deceleration of the ship. The operator of a ship may be one person or a plurality of persons depending on the size of the ship.

A traffic control instruction is a sea traffic cooperation request made by a coast/sea area manager and notified to a ship with the aid of AIS or any other type of equipment for reduction in risk of ship accident and traffic control. The request includes call for attention issued to all ships present in a traffic controlled sea area (abnormal weather/oceanographic phenomena), call for attention to a specific sea area (configuring no-entry area and recommended course), and call for attention to a specific ship (notification of dangerous ship and traffic control instruction issued to specific ship).

The degree of instruction observance L9993 is a variable representing the ratio of cases where an operator of a ship has actually followed traffic control instructions to all cases where the operator has received traffic control instructions relating to the operator in the past traveling histories.

A response speed Tr9994 is a variable representing the "time" from the point of time when an operator of a ship recognizes a traffic control instruction or presence of another ship having a collision risk to the point of time when the action of the operator actually affects the "behavior of the ship."

A mesh is produced by dividing a sea area and is a unit segment having a variable or fixed length and serving as an analysis index. In the present embodiment, the mesh is a square having one side having a length of 5 m, but the mesh may have a circular, rhombus, or hexagonal shape and may have an appropriate size.

Geographic information 9998 is a collective name of information on weather/oceanographic phenomena, topography, an ocean current, an installed object, a shoal of fish, and other pieces of information linked to the latitude and longitude.

A typical ship is a model case of a ship that serves as an index used in analysis of geographic requirement skill and instruction target skill. Any model case may be used as long as the same standard is used. Specifically, the average of ship catalog specifications of a middle-sized ferry manufactured and sold by a primary ship manufacturer.

A typical operator is a model case of an operator that serves as an index used in analysis of the geographic requirement skill Se9995 and the instruction target skill Sp9996. The operator is assumed to act in such a way that benefit of the operator who solves a navigational problem is theoretically maximized. Any model case may be used as long as the same standard is used. Specifically, the average of response speeds or any other pieces of information measured in human behavioristic psychology or a value specified by the traffic controller may be used.

The geographic requirement skill Se9995 is a variable representing a result of evaluation of the degree of difficulty for a predefined "typical ship and operator of the ship" in traveling through meshes of a specific sea area on the basis of the geographic information 9998. The geographic requirement skill Se9995 is specified for each pieces of geographic information 9998, and a higher geographic requirement skill level is required for an area having a higher degree of navigation difficulty.

The instruction target skill Sp9996 is a variable representing a result of evaluation of a correction item for correcting the geographic requirement skill Se9995 in accordance with the same "typical ship and operator of the ship" as those for the geographic requirement skill Se9995 described above on the basis of the specifications of the ship and the skill of the operator. The instruction target skill Sp9996 is specified on a ship/operator basis, and a higher instruction target skill level is required when a ship has higher navigation flexibility, and a ship operator having higher skill/experience has a higher instruction target skill level.

A sea route refers to a marine path along which a ship travels. A trail of a ship refers to a sea route along which a ship has traveled in the past. A course refers to a predicted sea route along which a ship will travel in the future. The current coordinate refers to the latitude and longitude of the coordinates at which a ship is assumed to be currently present.

AIS refers to an international standard used in information communication between ships and between a ship and a land base station. AIS is broadly classified into "traffic control instruction AIS015," which is a traffic control instruction distributed by a traffic controller, and "coordinates AIS000," which is information on a ship distributed by the ship, and both the "traffic control instruction AIS015" and "coordinates AIS000" are transmitted and received under the same standard.

A session is a group of data on the coordinates AIS from the time point when a certain ship migrates from the stationary state to the navigation state at least for fixed time to the time point when the ship becomes stationary again, the destination of the ship is changed, or information on the coordinates AIS is not received for fixed time (10 minutes or more, for example), and the session therefore refers to a basic unit of the ship's travel action.

A ship name refers to an ID for identifying the ship. The ship name basically refers to an MMSI number, which is a unique identifier allocated on an AIS basis.

A geographic information provider or probe sensor provides the traffic control assisting system 9900 with geographic information. The "geographic information provider or probe sensor" may be one person or a plurality of persons, a system for automatic traffic control, or a sensor or a group of sensors attached to a ship, the land, or the sea.

Geography E9997 is a relative index representing the probability of a certain ship being or capable of being present in a mesh for a certain time point. In a mesh where the geography E9997 of a certain ship at a certain time point is high, it is difficult for the ship to be present at the time point in the mesh.

A geographic E map 9999 refers to a kind of geographic information formed of meshes to each of which the geography E9997 information is imparted and which are superimposed on map information. The geographic E map 9999 is generated on a ship basis and on a unit time basis.

An accident risk is a relative index representing the degree of danger of a marine accident of a certain ship, such as collision and stranding. A "high accident risk" of a certain ship refers to "high possibility of a marine accident of the ship."

A database (DB) is used when data is exchanged over communication between processing sections and between system blocks. The DB is not limited to a database management system (DBMS) and may be achieved by a file, a structural body on a memory, or any other component.

First Embodiment

FIG. 1 shows blocks that form the traffic control assisting system according to the present embodiment.

Coordinates AIS000 distributed from a ship A001, which is a ship under traffic control, are inputted to the traffic control assisting system 9900 via a base station 002 and a traffic control interface 003. The inputted coordinates AIS are forwarded to a learning phase 004 and a traffic control phase 005, each of which is an internally processed program. The two phases may operate independently of each other.

The learning phase 004 analyzes "the degree of instruction observance L9993," "the reaction speed Tr9994," "the geographic requirement skill Se9995," and "the instruction target skill Sp9996" as coefficients used in calculation of instruction responsiveness.

The learning phase 004 saves "the geographic requirement skill Se9995" in a geographic information DB006 and "the degree of instruction observance L9993," "the reaction speed Tr9994," and "the instruction target skill Sp9996" in an instruction responsiveness DB007. Analysis of the coefficients uses the geographic information 9998 acquired from a geographic information provider/probe sensor 008, specifications of the ship in a ship information DB009, which records ship specification information, information on an operator of the ship, traffic control instruction AIS distribution history information 9910 in a traffic control instruction distribution DB010, and information on the coordinates in each session time of the ship in a session DB011. The traffic control instruction distribution DB010 saves the history of traffic control instructions AIS issued in the past. The session DB011 records sessions segmented and generated by the coordinates AIS000 inputted in the past up to the current time point. The coordinates AIS000 may be replaced with coordinate AIS information 000 in an AIS history DB012, which saves trails of the ship in advance.

The traffic control phase 005 generates, whenever it receives the coordinates AIS000 from the traffic control interface 003, the geographic E map 9999 on the basis of the information on "a ship name 9501," "ship coordinates 9502," "a destination 9503," and "a transmission time point 9504" at the coordinates AIS000, and the information on "the reaction speed Tr9994," "the instruction target skill Sp9996," "the degree of instruction observance L9993," and "the geographic requirement skill Se9995" saved in the geographic information DB006 and the instruction responsiveness DB007 and saves the generated geographic E map 9999 in a geographic E map DB013. The geographic E map 9999 is geographic information representing the probability of navigation through the meshes of the sea area where the ship A001 is present.

The traffic control phase 005 then predicts the course of the ship on the basis of the geographic E information in the geographic E map DB013 and saves a result of the prediction in a course prediction DB014.

The traffic control phase 005 further calculates an accident risk in each mesh of the sea area on the basis of course prediction information 9911 and the geographic E9997 information saved in the course prediction DB014 and determines whether or not an evasion instruction should be issued on the basis of the magnitude of the accident risk. The traffic control phase 005 identifies a ship having a collision risk in each sea area mesh where a result of the determination is equal to or larger than a predetermined threshold configured by the traffic controller and creates an evasion plan that allows the identified ships to take evasive actions.

The traffic control phase 005 finally arranges a traffic control instruction distribution order and timing on the basis of the evasion plan and the "response speed Tr9994" and the "degree of instruction observance L9993" of the ships involved in the evasion plan and distributes the traffic control instructions as the traffic control instruction AIS015 at appropriate timings to a ship A001-*b* via a base station 002-*b*.

The traffic controller 016 checks, via a traffic control interface 017, if the traffic control assisting system 9900 has performed input and output operation.

The learning phase 004 allows the traffic controller to check and manually correct information on the "response speed Tr9994," the "instruction target skill Sp9996," the "degree of instruction observance L9993," and the "geographic requirement skill Se9995" on a ship/sea area basis.

The traffic control phase 005 allows the traffic controller to check and manually correct information on the "geographic E map information 9999," the "course prediction information 9911," the "threshold used to determine whether or not an instruction to evade an accident risk is generated," the "evasion plan," and the "traffic control instruction distribution plan." Further, the traffic controller 016 can check and manually correct the pieces of information described above in each step that will be described later.

Figure 2A:
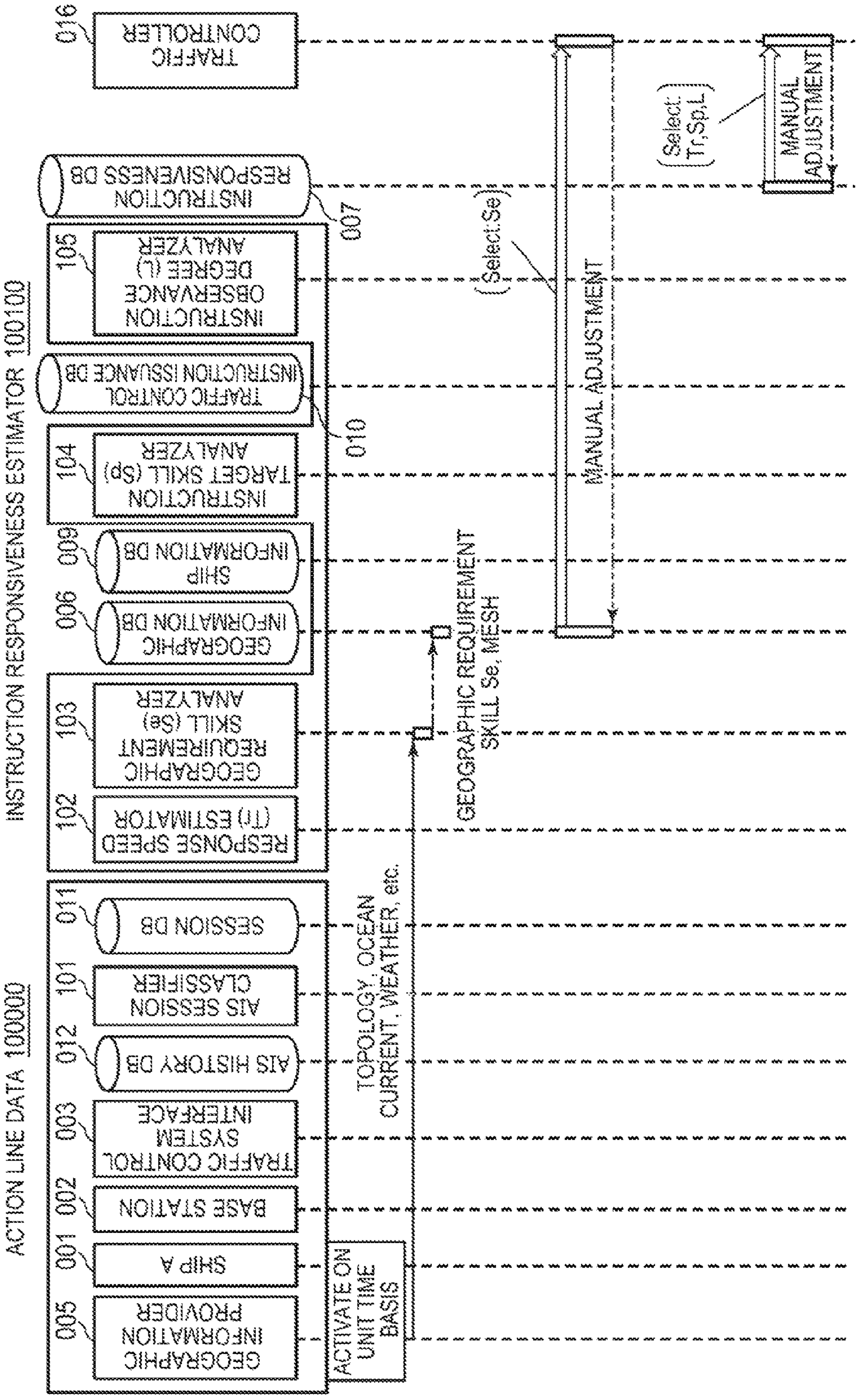
FIG. 2*a* is a sequence diagram of a learning phase (topographic information acquisition and manual adjustment)
Figure 2B:
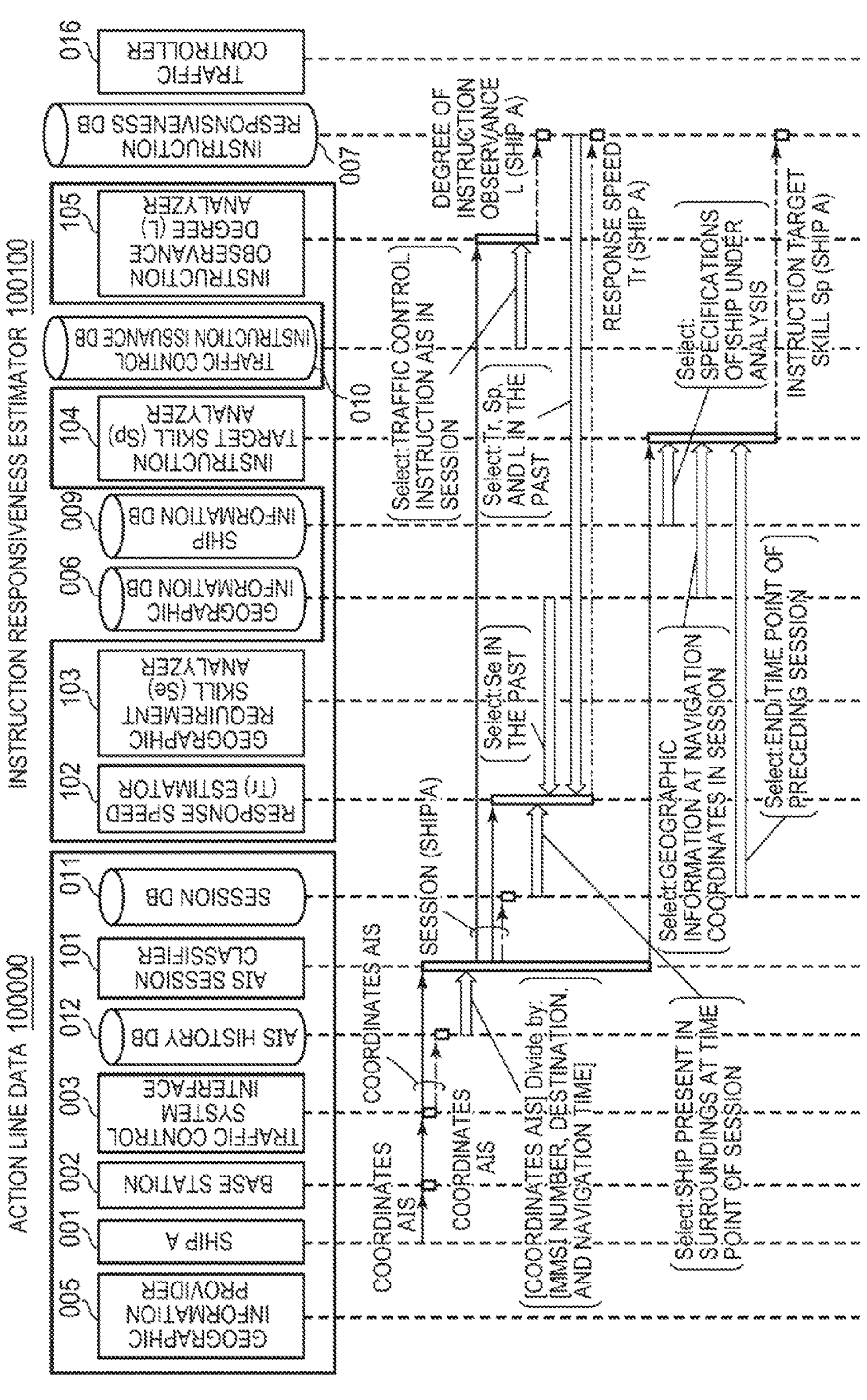
FIG. 2*b* is a sequence diagram of the learning phase (calculation of degree of instruction performance)

FIGS. 2*a* and 2*b* show examples of processes in the learning phase 004.

Figure 3:
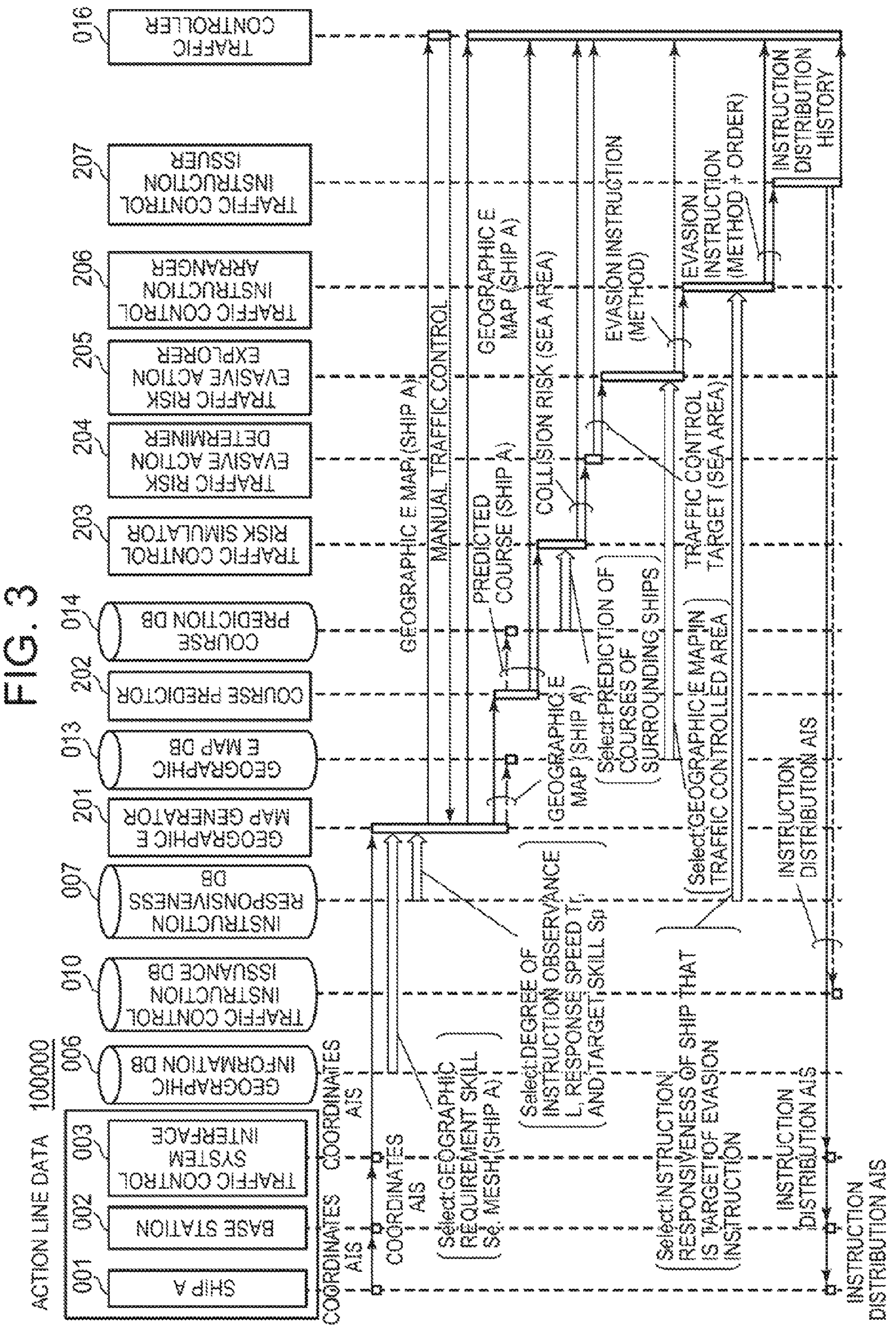
FIG. 3 is a sequence diagram of a traffic control phase.

In FIGS. 2*a*, 2*b*, and 3, each dashed line represents the process of storing data in a database. Each thick arrow represents the process of extracting data from a database. Each arrow represents the direction in which data flows. Therefore, in the data extracting process, a query is issued in the direction opposite the arrow before the data extraction.

The learning phase 004 is a program internally processed in the traffic control assisting system 9900 and is formed of an AIS session classifier 101, a response speed estimator 102, a geographic requirement skill analyzer 103, an instruction target skill analyzer 104, and an instruction observance degree analyzer 105.

The geographic requirement skill analyzer 103 is executed whenever information is received from the geographic information provider/probe sensor 008 or at regular time intervals. The AIS session classifier 101 is executed whenever coordinates AIS000 are inputted to the system. The response speed estimator 102, the instruction target skill analyzer 104, and the instruction observance degree analyzer 105 are executed whenever a new session is generated in the AIS session classifier 101. The response speed estimator 102, the instruction target skill analyzer 104, and the instruction observance degree analyzer 105 may be simultaneously executed.

The geographic requirement skill analyzer 103 analyzes the "geographic requirement skill Se9995" in each mesh of a sea area under the traffic control on the basis of the geographic information received from the geographic information provider/probe sensor 008 and saves a result of the analysis in the geographic information DB006. A method for performing the analysis will be described later in detail.

The AIS session classifier 101 receives information on the coordinates AIS000 and distributes the received information to sessions. When each of the sessions is completed, the AIS session classifier 101 saves the completed session in the session DB011. At this point of time, the AIS session classifier 101 activates the response speed estimator 102, the instruction target skill analyzer 104, and the instruction observance degree analyzer 105.

A session may be started when a table for the session of the currently performed navigation contains no session of a relevant ship. Whether or not the ship in question is the relevant ship may be determined based on, for example, the ship name or any other ID notified as the coordinates AIS000 or on tracking the trail of the ship.

A session may be completed when any of the following conditions is achieved for a specific ship: "1. Fixed time (10 minutes, for example) has elapsed since the time point when the preceding coordinates AIS were received," "2. The destination has been changed," and "3. The speed of the ship has reduced to zero." A detailed analysis method will be described later.

The response speed estimator 102 analyzes the response speed Tr9994 and saves a result of the analysis in the instruction responsiveness DB007. For example, in the timeframe of a session (session A) of a ship (ship A) 001 under the analysis, the response speed estimator 102 extracts a session (session B) of another ship (related ship) that has traveled in a surrounding sea area from the session DB011 and estimates coordinates and a time point that allow the traffic controller to perceive possibility of collision between the ship A and the related ship on the basis of the positional relationship between the ship A and the related ship. The perception refers, for example, to the timing when the ship B enters a pre-estimated range within which AIS is received from the ship A. The response speed estimator 102 creates an ideal evasion plan with priority given to a location and a time point having high collision possibility. The ideal evasion plan may be created on the basis of the "response speed Tr9994," the "instruction target skill Sp9996," the "degree of instruction observance L9993," and the "geographic requirement skill Se9995" obtained in the past. To create the evasion plan, a geographic E map generator 201, which is a function of the traffic control phase, which will be described later, and a traffic risk evasive action explorer 205 may be used, or any other type of agent simulation or any other method may be used. The response speed estimator 102 updates the response speed Tr on the basis of a discrepancy between the ideal evasion plan and an actually performed evasive action. In a case where there is no precedent for the actual evasive action, the response speed estimator 102 may use a value of a typical operator or an ideal operator or may use a reference specified by the traffic controller 016. For example, the following assumption may be made: The response speed Tr9994 is zero seconds; the instruction target skill Sp9996 is the average of values of other ships in the navigation sea area; and the degree of instruction observance L9993 is 100%, that is, the operator responds instantly, has the same operation skill as those in the other ships, and responds to an instruction without fail. A detailed analysis method will be described later.

The response speed estimator 102 may instead update the response speed Tr as follows: That is, in the timeframe of the session A, the response speed estimator 102 extracts, from the traffic control instruction distribution DB010, the history of traffic control instructions distributed in a sea area and a timeframe around the session A and base stations or marine buoys (distribution locations) from which the traffic control instructions have been issued. The response speed estimator 102 makes a rough estimate of a sea area where the traffic control instructions described above can be received and extracts a traffic control instruction that can be received by the ship A and expects the ship A to respond. The response speed estimator 102 creates an ideal instruction counteraction from the location and the time point where and when the ship A receives the traffic control instruction that expects the ship A to respond on the basis of the "response speed Tr9994," the "instruction target skill Sp9996," the "degree of instruction observance L9993," and the "geographic requirement skill Se9995" obtained in the past. The response speed estimator 102 updates the response speed Tr9994 on the basis of a discrepancy between the ideal counteraction and an actually performed counteraction. A detailed analysis method will be described later (see FIG. 15).

The instruction observance degree analyzer 105 analyzes the degree of instruction observance L9993 and saves a result of the analysis in the instruction responsiveness DB007. For example, in the timeframe of the session A, the instruction observance degree analyzer 105 extracts, from the traffic control instruction distribution DB010, the history of traffic control instructions distributed in the sea area and the timeframe around the session A and the base stations or marine buoys from which the instructions are issued. The instruction observance degree analyzer 105 makes a rough estimate of a sea area where the traffic control instructions described above can be received and extracts a traffic control instruction that can be received by the ship A001 and expects the ship A to respond. The instruction observance degree analyzer 105 creates an ideal instruction counteraction from the location and the time point where and when the ship A001 receives the traffic control instruction that expects the ship A to respond. The ideal instruction counteraction may be created on the basis of the "response speed Tr9994," the "geographic requirement skill Se9995," and the "instruction target skill Sp9996" obtained in the past. In a case where a discrepancy between the ideal counteraction and an actually performed counteraction is equal to or larger than a predetermined threshold, the instruction observance degree analyzer 105 determines that the ship A001 has unsuccessfully responded to the instruction. "The number of traffic control instructions to which the ship A has unsuccessfully responded" and "the number of traffic control instructions that the ship A has successfully received" may be saved in the instruction responsiveness DB007. The instruction observance degree analyzer 105 updates the degree of instruction observance L9993 on the basis of the ratio of "the number of traffic control instructions that the ship A has unsuccessfully responded" to "the number of traffic control instructions that the ship A has successfully received." A detailed analysis method will be described later.

The instruction target skill analyzer 104 analyzes the instruction target skill Sp9996 and saves a result of the analysis in the instruction responsiveness DB007. The instruction target skill Sp9996 is formed of a navigation freedom coefficient Sp_ship9920, which is specific to a ship, a navigation concentration degree coefficient Sp_time9921, and a skill related coefficient Sp_skill9922.

For example, the instruction target skill analyzer 104 extracts the end time point of the preceding navigation session (session C) of the ship A from the session DB011, extracts information on the specifications of the ship that is the target of the session A from the ship information DB009, and extracts the geographic requirement skill Se9995 in the sea area that is the target of the navigation in the session A from the geographic information DB006.

The instruction target skill analyzer 104 calculates the Sp_ship9920 on the basis of the specifications of the ship and increases or decreases Sp_time9921 and Sp_skill9922 on the basis of the start time point of the session A and the end time point of the session C. The instruction target skill analyzer 104 then calculates Sp-a9923 that reflects a result of the increase or decrease in Sp_time9921 and Sp_skill9922 described above and calculates a difference between the calculated Sp-a9923 and Se9995 in the mesh through which the ship A has traveled.

The instruction target skill analyzer 104 repeats the increase in Sp_skill9922 on the basis of the difference to update the value of the instruction target skill Sp9996.

In a case where there is no precedent for the Sp_ship9920, Sp_time9921, and Sp_skill9922, the instruction target skill analyzer 104 may set assumed values of Sp_ship9920, Sp_time9921, and Sp_skill9922. For example, Sp_ship=1, Sp_time=1, and Sp_skill=0 may be set, or Sp_ship, Sp_time, and Sp_skill may be estimated from information on surrounding ships or may be configured by the traffic controller 016. To quickly perform search when the data is used in a traffic control session, which will be described later, the end time point of the session A may be saved as related information in the instruction responsiveness DB007. A detailed analysis method will be described later.

The variables saved in the geographic information DB006 and the instruction responsiveness DB007 can be viewed by the traffic controller 016 any time and may be manually adjusted.

FIG. 3 shows an example of processes in the traffic control phase 005.

The traffic control phase 005 is a program internally processed in the traffic control assisting system and is formed of a geographic E map generator 201, a course predictor 202, a traffic control risk simulator 203, a traffic risk evasive action determiner 204, a traffic risk evasive action explorer 205, a traffic control instruction arranger 206, and a traffic control instruction issuer 207.

The geographic E map generator 201 is executed whenever the coordinates AIS000 are inputted to the system. The course predictor 202 is activated when the geographic E map generator 201 is deactivated. The traffic control risk simulator 203 is activated when the course predictor 202 is deactivated. The traffic risk evasive action determiner 204 is activated when the traffic control risk simulator 203 is deactivated. The traffic risk evasive action explorer 205 is activated when the traffic risk evasive action determiner 204 issues a request. The traffic control instruction arranger 206 is activated when the traffic risk evasive action explorer 205 is deactivated. The traffic control instruction issuer 207 keeps activated and distributes a traffic control instruction AIS015 in accordance with a request from the traffic control instruction arranger 206.

The geographic E map generator 201 uses the "response speed Tr9994," the "instruction target skill Sp9996," the "degree of instruction observance L9993," and the "geographic requirement skill Se9995" to calculate the geography E9997 for each unit time 9991 on a ship basis for each sea area mesh and saves the calculated information as the geographic E map 9999 in the geographic E map DB013. The geography E9997 is the reciprocal of the probability of the ship A001 being or capable of being present in a specific sea area mesh at a specific time point and represents that the higher the value of the geography E9997, the lower the possibility of the ship A001 being present in the specific sea area mesh at the specific time point. A detailed method will be described later.

The course predictor 202 predicts a course that the ship A001 can take on the basis of the geographic E map 9999 for each unit time 9991 of the ship A001. The course predictor 202 saves a result of the course prediction in the form of the coordinate value for each unit time 9991 in the course prediction DB014. A detailed method will be described later.

The traffic control risk simulator 203 analyzes the probability of occurrence of an accident including collision and stranding caused by a ship that travels through a location around the coordinates indicated by a result of the prediction of the course of the ship A001 in the predicted timeframe. The traffic control risk simulator 203 forwards information on the mesh where the accident risk is detected in a result of the analysis, the probability of the accident risk, and information on the time interval until the accident occurs to the traffic risk evasive action determiner 204, for example, in the form of a cue. A detailed method will be described later.

The traffic risk evasive action determiner 204 determines the mesh where the accident risk has been detected and the probability of the accident risk forwarded from the traffic control risk simulator 203, specifically, determines whether or not the probability of the accident risk exceeds a threshold A8800, which is "the average determined in advance from accident examples" or "a value configured by the traffic controller 016." The traffic risk evasive action determiner 204, when it determines that the accident risk is larger than the threshold A8800, forwards a request to explore an evasive action, information on the mesh where the accident risk has been detected in the result of the analysis, and information on the time interval until the accident occurs to the traffic risk evasive action explorer 205. The traffic risk evasive action determiner 204 may request the exploration whenever the probability of the accident risk exceeds the threshold A8800, may request the exploration in descending order of accident risk probability whenever fixed time elapses, or may request exploration in ascending order of the time interval until an accident occurs. A detailed method will be described later.

The traffic risk evasive action explorer 205, when it is requested by the traffic risk evasive action determiner 204 to perform the exploration, explores evasive actions for ships that travel through locations around the mesh where the accident risk has been detected at the specific time point on the basis of the respective geographic E maps 9999. The traffic risk evasive action explorer 205 recursively explores evasive actions until the accident, such as collision, is evaded, and when the exploration is completed, the traffic risk evasive action explorer 205 forwards a result of the exploration to the traffic control instruction arranger 206. Even in a case where the exploration of a plan that allows evasion of the accident is not completed, but when the difference between the time interval until the accident may occur and the current system time point is a threshold B8801 or less, the traffic risk evasive action explorer 205 may forward a currently present evasion plan that provides the lowest accident risk, along with information on accident risk of each ship, to the traffic control instruction arranger 206. The threshold B8801 may be a value calculated in advance from accident examples or may be a value configured by the traffic controller 016. A detailed method will be described later.

The traffic control instruction arranger 206 divides the evasion plan forwarded from the traffic risk evasive action explorer 205 into small parts and uses them as traffic control instructions to a ship (ship Xa) that is a target of an evasive action instruction. The traffic control instruction arranger 206 evaluates the priority of a traffic control instruction on the basis of an accident risk of the ship Xa, the response speed Tr9994, and the degree of instruction observance L9993. The traffic control instruction arranger 206 forwards a plan of distribution of the traffic control instructions based on the priority to the traffic control instruction issuer 207. A detailed method will be described later.

The traffic control instruction issuer 207 generates and distributes a traffic control instruction AIS015 to each base station and marine buoy on the basis of the traffic control instruction distribution plan forwarded from the traffic control instruction arranger 206. The traffic control instruction issuer 207 saves the history of the distributed traffic control instructions AIS015 in the traffic control instruction distribution DB010.

The geographic E map information, a mesh having an accident risk and the probability of the accident, determination of an evasive action, a formulated evasion plan, the order in which the evasion plan is distributed, base stations and marine buoys from which the evasion plan is distributed, and each process described below may be viewable by the traffic controller 016 any time and manually adjustable.

Figure 4:
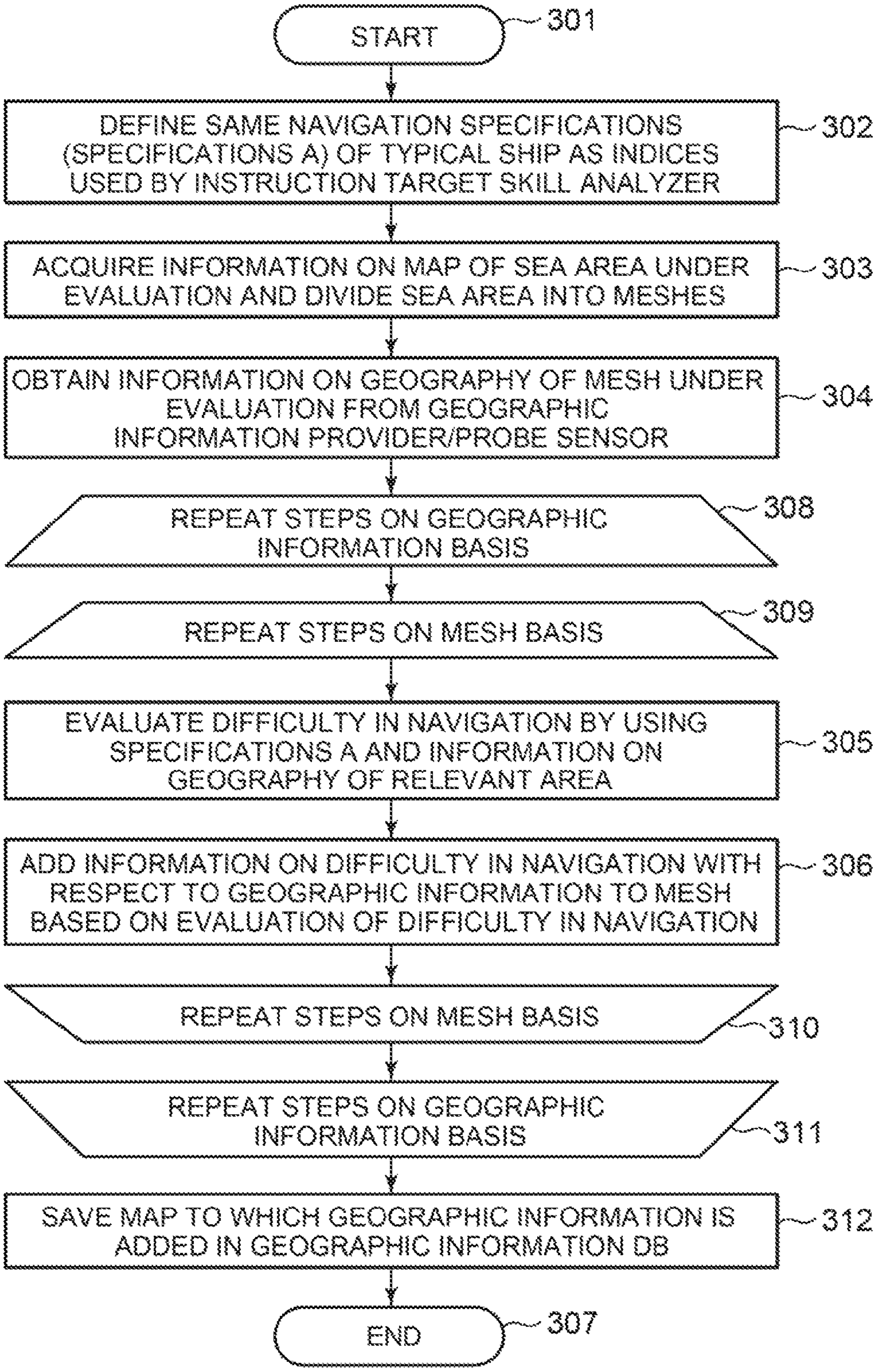
FIG. 4 is a flowchart of the process carried out by a geographic requirement skill analyzer.

FIG. 4 is a flowchart showing an example of the process carried out by the geographic requirement skill analyzer 103. In the present embodiment, an example of evaluation of a risk of a shallow-water-related accident and an ocean-current-related accident will be described.

The geographic requirement skill analyzer 103, when it starts the process in step 301, "defines the same typical ship and operator as those defined by the instruction target skill analyzer 104" in step 302 and set the specifications of the ship as specifications A. In the description, it is assumed that the length of the ship is 100 m, the width of the ship is 20 m, the distance to the bottom of the ship is 20 m, and the maximum log speed is 30 km/h.

In step 303, the geographic requirement skill analyzer 103 "acquires information on the topography of a sea area under evaluation and divides the sea area into meshes." In this example, meshes of an area handled as a sea-surface area are so generated that one side of each mesh is 5 m.

In step 304, the geographic requirement skill analyzer 103 "acquires data on geographic information in each generated mesh." The geographic information is assumed to keep having the value of geographic information received last time until the following relevant data is received. An area where no geographic information has yet been created can be determined to have a high accident risk during navigation and is therefore temporarily handled as a navigation inhibited area as the land is.

In step 305, for each geographic information and mesh, the geographic requirement skill analyzer 103 "uses the specifications A and the information on geography of a relevant area to evaluate the degree of difficulty in navigation on the basis of geographic requirement skill level or relative index."

For example, when a case where the difference between the water depth and the distance to the bottom of the ship is 1 m or less is defined as a shallow water warning level 5 and a case where the difference is 10 m or less is defined as a shallow water warning level 3, an area where the water depth is 21 m may be defined as the shallow water warning level 5, and an area where the water depth is 30 m may be defined as the shallow water warning level 3 in the case of the specifications A described above. Table 1 shown below shows an example of the level definition.

TABLE 1

| Level | (Water depth − distance to bottom of ship) = X(m) |
|---|---|
| 5 | $X \leq 1$ |
| 4 | $X \leq 5.5$ |
| 3 | $X \leq 10$ |
| 2 | $X \leq 14.5$ |
| 1 | $X \leq 19$ |
| 0 | $X > 19$ |

Further, when a case where the difference between the maximum log speed of the ship and the ocean current speed is 1 km/h or less is defined as an ocean current warning level 5 and a case where the difference is 10 km/h or less is defined as an ocean current warning level 3, the geographic requirement skill analyzer 103 may define an area where the ocean current speed is 29 km/h as the ocean current warning level 5 and an area where the ocean current speed is 20 km/h as the ocean current warning level 3. Table 2 shown below shows an example of the level definition.

TABLE 2

| Level | (Maximum log speed − ocean current speed) = Y(km/h) |
|---|---|
| 5 | $Y \leq 1$ |
| 4 | $Y \leq 5.5$ |
| 3 | $Y \leq 10$ |
| 2 | $Y \leq 14.5$ |
| 1 | $Y \leq 19$ |
| 0 | $Y > 19$ |

The geographic requirement skill analyzer 103 then imparts the geographic requirement skill Se9995 evaluated in step 306 as information to each mesh.

The geographic requirement skill analyzer 103 repeats steps 305 and 306 described above on a mesh basis (from step 309 to step 310) and on a geographic information basis (from step 308 to step 311) to generate, as the geographic information, a group of meshes to each of which the geographic requirement skill is imparted.

In step 312, the geographic requirement skill analyzer 103 saves the generated geographic information in the geographic information DB006.

In step 307, the geographic requirement skill analyzer 103 terminates the present process.

Figure 5:
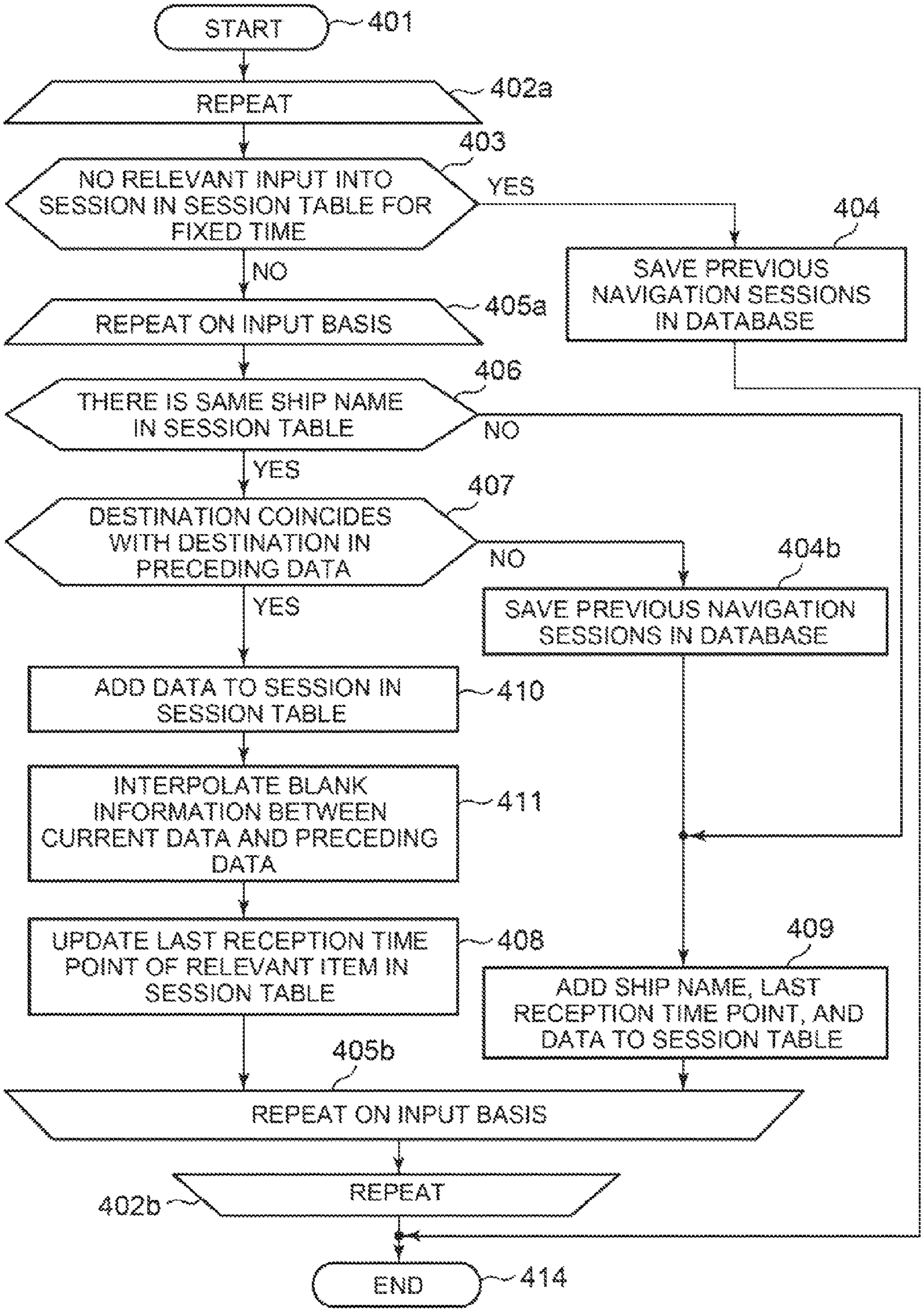
FIG. 5 is a flowchart of the process carried out by an AIS session classifier.

FIG. 5 describes the process carried out by the AIS session classifier 101.

The AIS session classifier 101 starts the process in step 401.

A session may be managed by a session table 9804 shown in the example in FIG. 16. The session table 9804 may have the following columns: "Ship name 9101," "Last reception time point 9102," "Destination 9103," and "Coordinate AIS data group 9104."

The coordinate AIS data group 9104 is a data structure in which the coordinates AIS000 are saved in each item. The ship name 9101 and the destination 9103 are the same as the data stored in the coordinates AIS000 in the coordinate AIS data group 9104 and may therefore not be defined as columns, and a method for searching the coordinate AIS data group 9104 for the ship name and the destination may be used as required. In this case, the columns are formed of two columns, the last reception time point 9102 and the coordinate AIS data group 9104. The currently undergoing session may be managed on a column basis. The management will be described later in detail.

The AIS session classifier 101 checks the system time point on a regular basis and determines whether or not the difference between the system time point and the last reception time point 9102 in the session table 9804 is equal to or larger than a predetermined threshold. In a case where a result of the determination is affirmative, the AIS session classifier 101 determines that the session has ended and "saves the previous sessions in the database" in step 404. After the saving operation, the AIS session classifier 101 may terminate the process in step 414 or may wait until the following coordinate AIS data group 9104 is inputted.

The AIS session classifier 101 carries out the following processes in loop 405 (from step 405*a* to step 405*b*) whenever a coordinate AIS data group 9104 is inputted.

In step 406, the AIS session classifier 101 determines whether or not there is a column in the session table 9804 that shows the ship name that coincides with the ship name in the coordinate AIS data 000.

In a case where the AIS session classifier 101 determines in step 406 that there is no column in the session table 9804 that shows the same name, the AIS session classifier 101 proceeds to step 409.

In step 409, the AIS session classifier 101 adds the "ship name 9101" and the "last reception time point 9102" to the session table 9804, further adds "the coordinates AIS000 to the end of the coordinate AIS data group 9104," and starts the process of inputting the following coordinate AIS data 000 in loop 405.

The last reception time point 9102 is the system time point when the coordinate AIS data 000 is received.

In a case where the AIS session classifier 101 determines in step 406 that there is a column in the session table 9804 that shows the same ship name, the AIS session classifier 101 proceeds to step 407.

In step 407, the AIS session classifier 101 determines whether or not a "destination 9503" in the newly added coordinates AIS000 coincides with the "destination 9103" in the last data that is the data at the end of the coordinate AIS data group 9104 in the session table 9804.

In a case where the AIS session classifier 101 determines in step 407 that the destination 9503 differs from the destination 9103 (NO in step 407), the AIS session classifier 101 "saves the previous navigation sessions in the session DB011" in step 404*b*, adds "the ship name 9101" and "the last reception time point 9102", and further adds "the coordinates AIS000 to the end of the coordinate AIS data group 9104." The AIS session classifier 101 then starts the process of inputting the following coordinate AIS data 000 in step 405.

In a case where the AIS session classifier 101 determines in step 407 that the destination 9503 coincides with the destination 9103 (YES in step 407), the received session in the session table 9804 has not ended yet, and the AIS session classifier 101 "adds the data to the session in the session table 9804" in step 410. The AIS session classifier 101 then "interpolates blank information between the current session data and the preceding session data" in step 411. The interpolation of the blank may be performed by using duplication of a relevant item in the preceding session data, linear interpolation based on a difference between a relevant item in the preceding session data and the relevant item in the current session data, estimation by creation of a model based on the data, or any other method.

The AIS session classifier 101 then "updates the last reception time point in the data in the column in the session table 9804 to which the data is added in step 410" in step 408. The AIS session classifier 101 then starts the process of inputting the following coordinate AIS data 000 in step 405.

The process described above is repeated in loop 402 (from step 402*a* to step 402*b*). Instead, loop 402 may be omitted, and the AIS session classifier 101 may be activated whenever an input is made. Still instead, a batch processing method in which loop 402 is activated whenever fixed time elapses may be employed.

After all the loops described above are completed, the AIS session classifier 101 deactivates the session classifier 101 in step 414.

Figure 6:
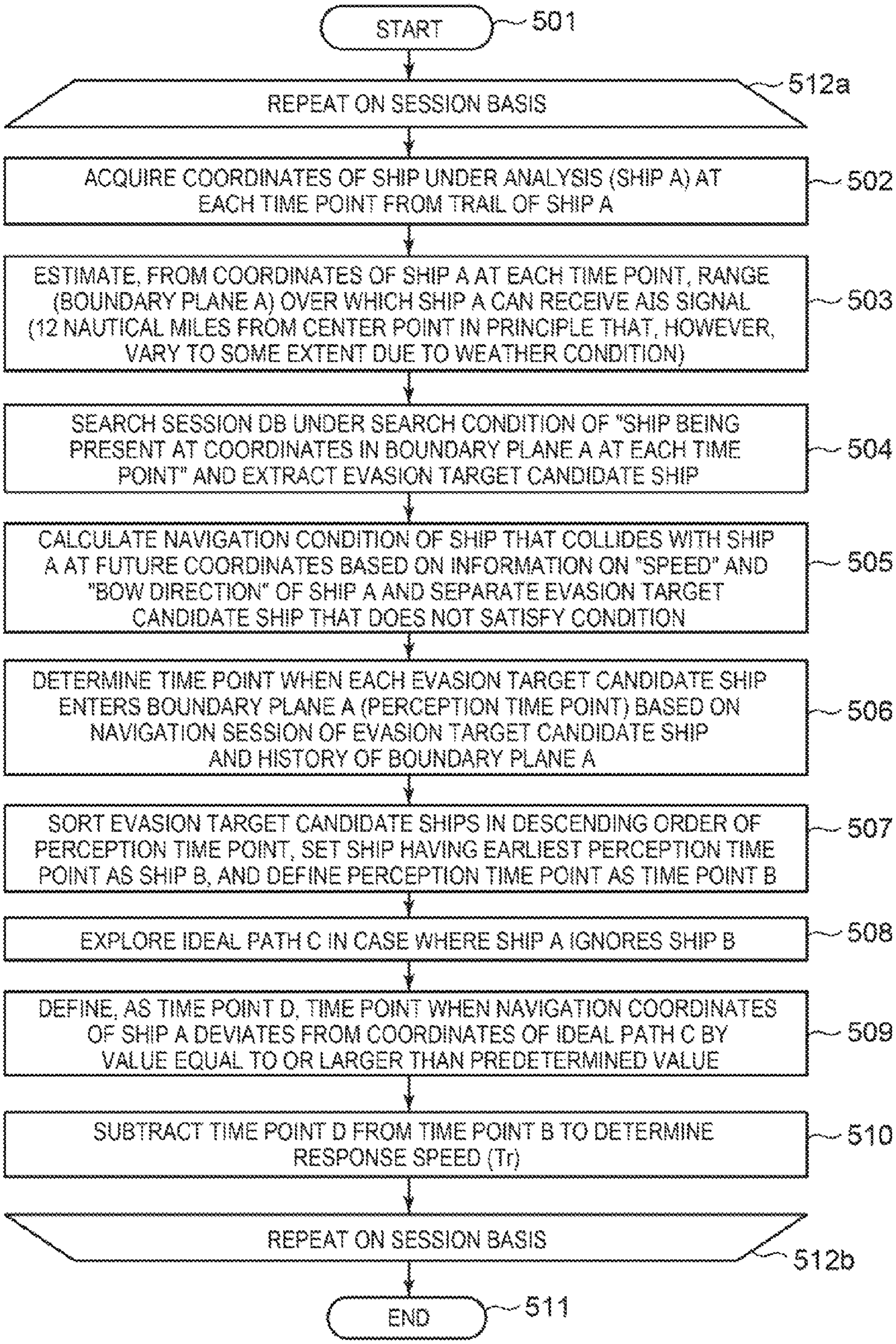
FIG. 6 is a flowchart of the process carried out by a response speed estimator.

FIG. 6 is a flowchart showing an example of the process carried out by the response speed estimator 102.

Estimation of the response speed is performed on a session basis. The response speed estimator 102 starts the process in step 501 and carries out the processes in loop 512 (from step 512*a* to step 512*b*) whenever a session is generated. In loop 512, the following processes are carried out.

In step 502, the response speed estimator 102 acquires the coordinates of the ship A001, which is a ship under analysis, from the trail of the ship A001 at each time point in the session.

In step 503, the response speed estimator 102 then estimates, from the coordinates of the ship A001 at each time point, a range (boundary plane A9701) over which the ship A001 can receive an AIS signal. The range of the boundary plane A9701 may be specified by the traffic controller 016 in advance or may be specified on the basis of the values of catalog specifications disclosed by the manufacturer of AIS. The range of the boundary plane A9701 may instead be values measured in the past as an effective AIS reception range (about 12 nautical miles (about 22 km), for example). The effective reception range may be extended or narrowed in accordance with a predetermined model formed on the basis of the weather/oceanographic phenomena, the timeframe, the degree of ship congestion, the distribution of other radio transmitters, and a variety of other pieces of information. The effective reception range may instead be extended or narrowed in accordance with judgement made by the traffic controller 016. The range of coordinates where AIS communication with the ship A001 can be established is thus calculated as a space inside the boundary plane A9701 at each time point in the session.

In step 504, the response speed estimator 102 searches each session in the session DB011 under a search condition of "a search target being present at coordinates in the boundary plane A9701 at each time point" and extracts an evasion target candidate ship 9702. For example, the response speed estimator 102 may use the range between "a session start time point 9601" and "a session end time point 9602," each of which is information on the session, to acquire information in the session and narrow the coordinate search target.

In step 505, the response speed estimator 102 then picks up a ship that possibly collides with the ship A001 at future coordinates and inversely calculates the navigation condition of the ship "that can be inferred from the viewpoint of the ship A001" on the basis of "a speed 9505" and "a bow direction 9506," each of which is the coordinate AIS data 000 information of the ship A. The response speed estimator 102 then excludes an evasion target candidate ship 9702 that does not satisfy the navigation condition from the evasion target candidates. The ships to be excluded may include a stationary ship. A more detailed description will be made later (see FIG. 18).

In step 506, the response speed estimator 102 then "calculates the time point when each evasion target candidate ship 9702 enters the boundary plane A9701 (perception time point 9704) on the basis of the navigation session of the evasion target candidate ship 9702 and the history of the boundary plane A9701. The combination of the session and the perception time point 9704 in the session may be temporarily saved.

In step 507, the response speed estimator 102 sorts the evasion target candidate ships 9702 in ascending order of the perception time point 9704, sets a ship having the earliest perception time point 9704 as a ship B9705, and defines the perception time point as a time point B9706.

In step 508, the response speed estimator 102 then explores an ideal course C9707, along which the ship A001 reaches the location where the session ends or the destination 9103, in a case where the ship A001 ignores the presence of the evasion target candidate ships 9702. The exploration may be performed by using the geographic E map generator 201 and the traffic risk evasive action explorer 205, each of which is a function of the traffic control phase 005, which will be described later, or may be performed by using an any other type of agent simulation or any other method.

Further, in step 509, the response speed estimator 102 defines, as a time point D9708, the time point when the actual trail of the ship A001 deviates from the ideal course C9707, which is calculated in step 508 described above, by a value equal to or larger than a predetermined threshold.

In step 510, the response speed estimator 102 finally calculates a difference between the time point B9706 and the time point D9708 and saves the calculated value as the response speed Tr9994 in the instruction responsiveness DB007.

The response speed estimator 102 carries out the processes in loop 512 described above whenever a session is generated. In a case where no session is present, the response speed estimator 102 terminates the present process in step 511.

In the example described above, the response speed Tr9994 can be calculated only once per session. However, the following method may be used to divide a session into traffic control special-case areas 9709 for multiple learning. An example of the process in this case will next be described with reference to FIG. 6*a*.

Figure 6A:
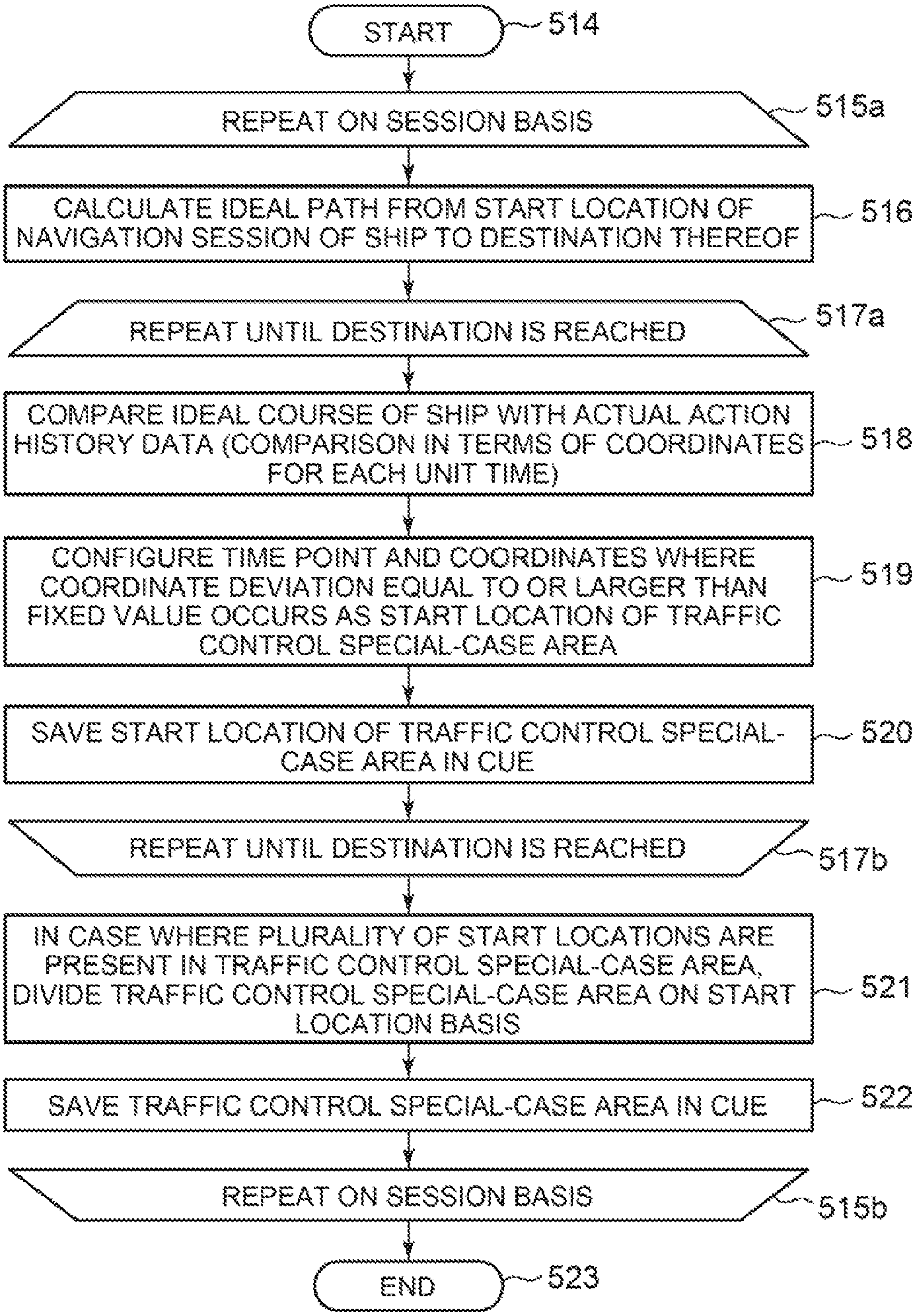
FIG. 6*a* is a supplementary flowchart of the process carried out by the response speed estimator.

FIG. 6*a* is a flowchart showing an example of the process of extracting the traffic control special-case areas 9709.

In the present process, data on a session is divided into the traffic control special-case areas 9709, which are intervals where an evasive action is taken, to increase the amount of information obtained from a single navigation record for improvement in learning efficiency.

The traffic control special-case areas 9709 are produced by dividing session data in the following process:

The response speed estimator 102 starts dividing session data in step 514.

The response speed estimator 102 carries out the processes in the following loop 515 (from step 515*a* to step 515*b*) on a session basis.

In step 516, the response speed estimator 102 generates the ideal course C9707 from the start point of a traffic control special-case area of the ship A001 to the end point of the traffic control special-case area. The ideal course C9707 may be generated by using the geographic E map generator 201 and the course predictor 202, each of which is a function of the traffic control phase, which will be described later, or may be generated by any other type of agent simulation or any other method.

The response speed estimator 102 then repeats the following processes on the generated ideal course C9707 in loop 517 (from step 517*a* to step 517*b*) until the ship that starts from the start point of the ideal course C9707 reaches the destination 9103.

First, in step 518, the response speed estimator 102 compares the ideal course C9707 with actual action history data for each unit time 9991 of the ship A001 and calculates the difference in coordinates.

In step 519, the response speed estimator 102 then configures the time point and coordinates where the difference in coordinates is equal to or larger than a predetermined threshold as the start point of a traffic control special-case area 9709. The thus configured start point may be temporarily saved in step 520. The saving destination may be a database, a memory, a file, or any other component.

The response speed estimator 102 carries out the processes in loop 517 described above for all coordinates of the generated ideal course C9707 from the start point to the destination 9103 thereof.

Thereafter, "in a case where a plurality of start points are present in the traffic control special-case area 9709," the response speed estimator 102 "divides the traffic control special-case area 9709 on a start point basis" in step 521.

In step 522, the response speed estimator 102 finally saves the traffic control special-case area 9709 in a cue, a database, a memory, a file, or any other component.

The response speed estimator 102 carries out the processes in loop 515 described above on a session basis. In the case where no session is present, the response speed estimator 102 terminates the present process in step 523.

Figure 6B:
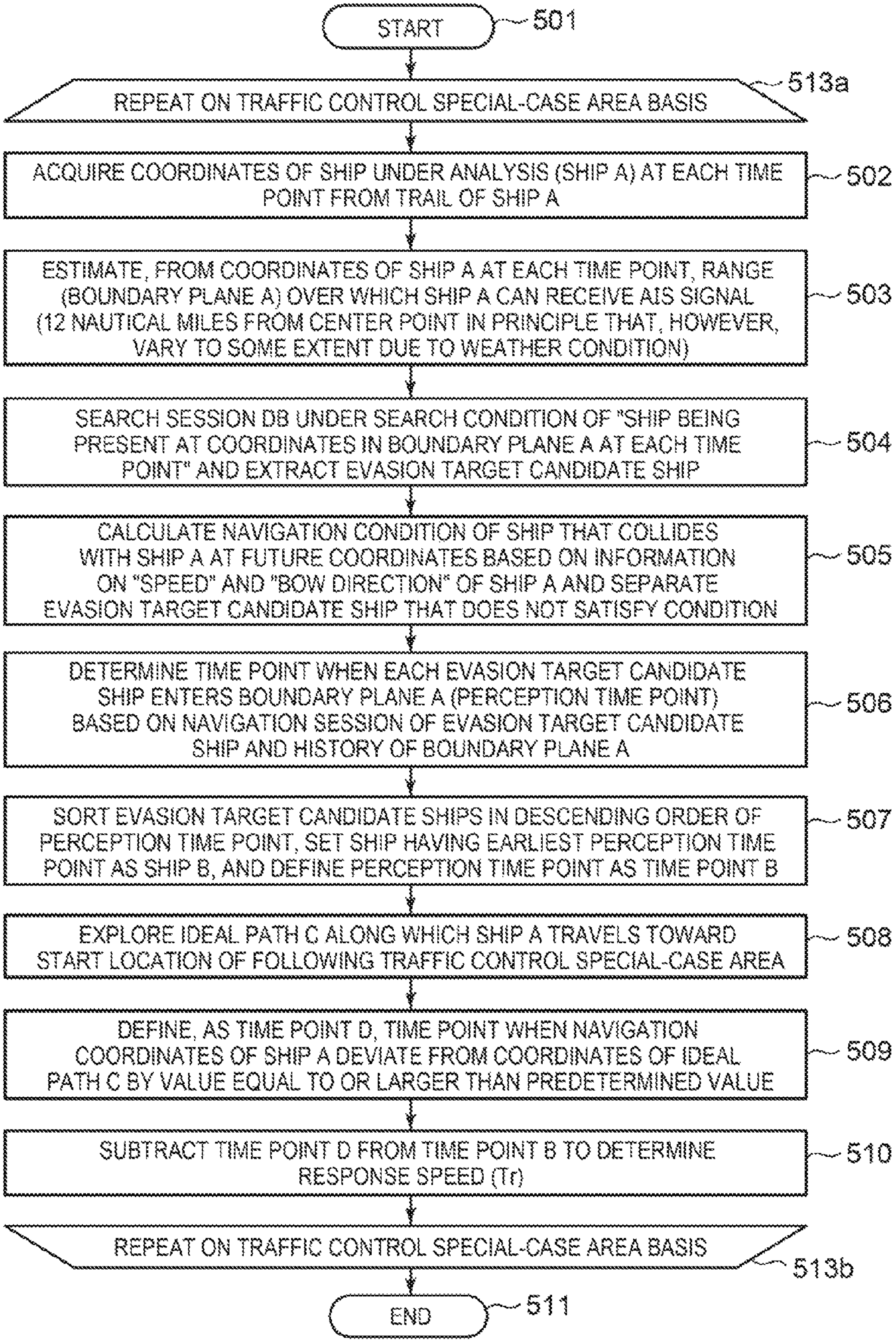
FIG. 6*b* is another supplementary flowchart of the process carried out by the response speed estimator.

Having extracted the traffic control special-case areas 9709 from the session by carrying out the process described above, the response speed estimator 102 replaces the process of "performing repetition on a session basis" in loop 512 in FIG. 6 with the process of "performing repetition for each traffic control special-case area 9709" in loop 513 (from step 513*a* to step 513*b*) shown in FIG. 6*b* and performs the replaced process.

The response speed estimator 102 may instead measure the response speed Tr9994 by using a traffic control instruction AIS015 instead of the positional relationship with the ship B9705 in the process shown in FIG. 6.

In this case, step 504 is changed as follows: That is, "a target to be searched for under the search condition of "a target being present at coordinates in the boundary plane A9701 at each time point" is changed to a "base station 9710" and a "marine buoy 9711" in the geographic information DB006, and a traffic control instruction distribution candidate is extracted."

Step 505 is then changed as follows: That is, "the traffic control instruction distribution DB010 is so searched that among traffic control instructions AIS015 transmitted to the base station 9710 and the marine buoy 9711 around the ship A001 in a target timeframe, an instruction relating to the ship A001 is selected." A method for selecting an instruction relating to the ship A001 may include broadly classifying commands in accordance with a natural language into "call for attention issued to all ships," "traffic control instructions to the ship A001," and "traffic control instructions to a specific sea area," estimating appropriate actions based on the classified instructions, and specifying the estimated actions as references used to evaluate the ideal course C9707 in step 508 (evaluation Z9712).

"The evasion target candidate ships 9702" in steps 506, 507, and 508 are replaced with "the base station 9710 or the marine buoy 9711", and the evaluation 29712 is added to the condition under which the ideal course C9707 is explored.

In a case where before an evasive action for a certain evasion target candidate ship 9702 is completed, another evasion target candidate ship 9702 is perceived again, the response speed may be evaluated in a plurality of stages, such as a first response speed, a second response speed, . . . , and N-th response speed. In this case, the traffic control side can grasp the N-th response speed of a certain ship to grasp the number of ships that the certain ship can realistically handle by an evasive action in response to one traffic control instruction. The traffic control side can therefore adjust the number of steps of traffic control instruction. For example, in the case of a ship capable of handling three ships at a fixed response speed, the traffic control side can forward, to the ship, an evasive action for handling three ships. As a result, the accuracy in traffic control instruction can be improved, and the bandwidth used to distribute traffic control instructions AIS015 can be saved.

Figure 7:
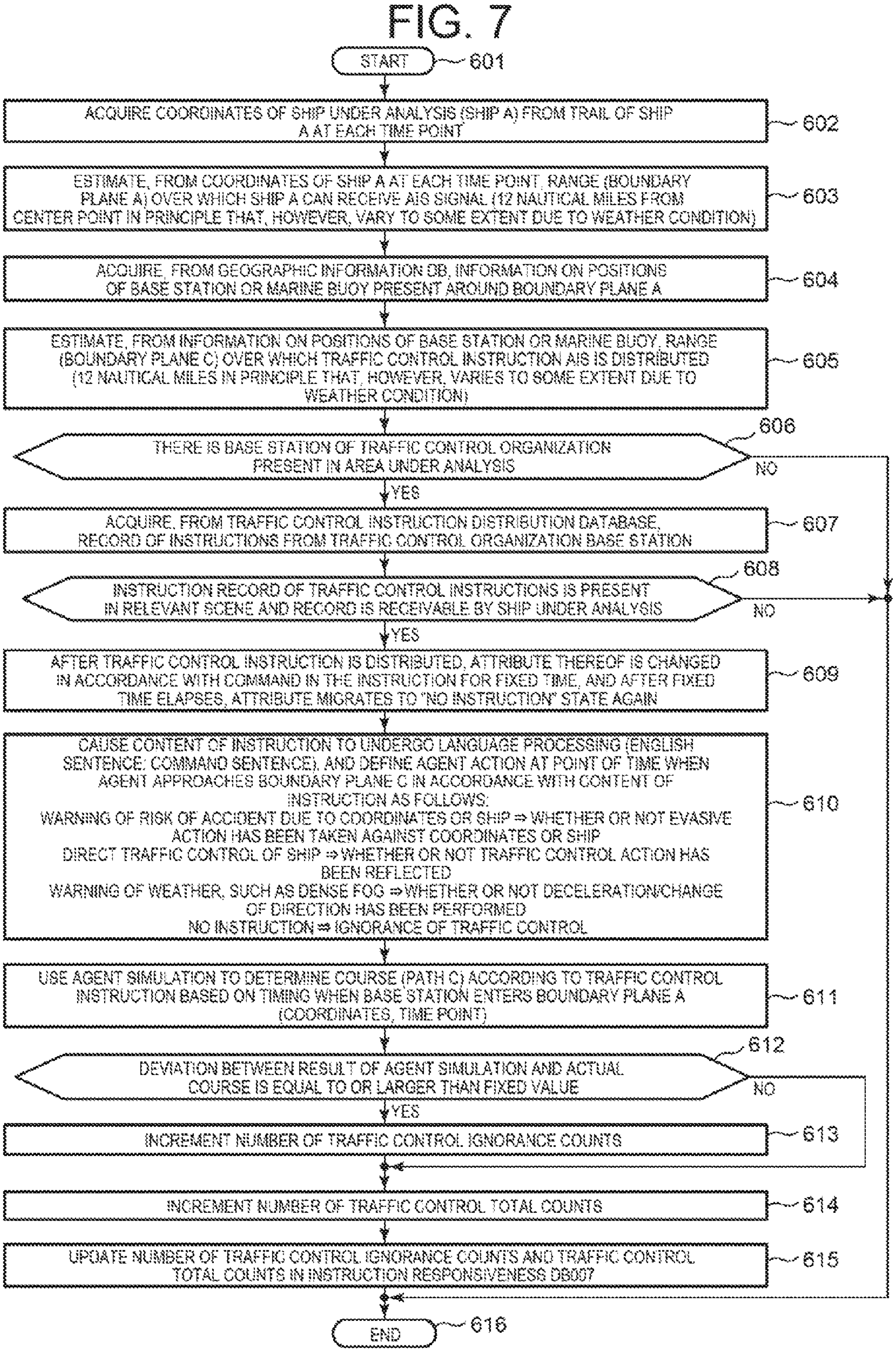
FIG. 7 is a flowchart of the process carried out by an instruction observance degree analyzer.

FIG. 7 is a flowchart showing an example of the process carried out by the instruction observance degree analyzer 105.

The instruction observance degree analyzer 105 is carried out whenever a session is generated. The process is started in step 601 and the processes are carries out up to step 616.

In step 602, the instruction observance degree analyzer 105 acquires the coordinates of the ship A001, which is a ship under analysis, from the trail of the ship A at each time point in the session.

In step 603, the instruction observance degree analyzer 105 then estimates, from the coordinates of the ship A001 at each time point, the range (boundary plane A9701) over which the ship A001 can receive an AIS signal. The range of the boundary plane A9701 may be specified by the traffic controller 016 in advance or may be specified on the basis of the values of catalog specifications disclosed by the manufacturer of AIS. Instead, since there is a paper that specifies that the AIS effective reception range is about 12 nautical miles (about 22 km), this value may be used as the range of the boundary plane A9701. The effective reception range may be extended or narrowed in accordance with a predetermined model formed on the basis of the weather/oceanographic phenomena, the timeframe, the degree of ship congestion, the distribution of other radio transmitters, and a variety of other pieces of information. The effective reception range may instead be extended or narrowed in accordance with judgement made by the traffic controller 016. The range of coordinates where AIS communication with the ship A001 can be established is thus calculated as a space inside the boundary plane A9701 at each time point in the session.

In step 604, the instruction observance degree analyzer 105 searches the geographic information DB006 for the base station 9710 and the marine buoy 9711 under the search condition of "a target being present at coordinates in the boundary plane A9701 at each time point" and extracts the coordinates of the base station 9710 and the marine buoy 9711 (hereinafter referred to as distribution place 9713) capable of distributing a traffic control instruction AIS015 to the ship A001. For example, the instruction observance degree analyzer 105 may use the range between "the session start time point 9601" and "the session end time point 9602," each of which is information on the session, to acquire information in the session and narrow the coordinate search target.

In step 605, the instruction observance degree analyzer 105 estimates a range (boundary plane E9714) over which the facilities at the distribution place 9713 can distribute a traffic control instruction. The estimation may use the same method used to estimate the boundary plane A9701.

In determination 606, the instruction observance degree analyzer 105 determines whether or not the distribution place 9713 of the traffic control organization is present in a sea area under the analysis.

In a case where a result of determination 606 is negative (NO), the instruction observance degree analyzer 105 terminates the present process in step 616.

In a case where a result of determination 606 is affirmative (YES), the instruction observance degree analyzer 105 proceeds to step 607.

In step 607, the instruction observance degree analyzer 105 extracts, from the traffic control instruction distribution DB010, a record of traffic control instructions distributed during the session period.

In determination 608, the instruction observance degree analyzer 105 then determines whether or not a traffic control instruction AIS015 has been distributed during the session period and the distributed information is receivable by the ship A001. The determination of whether or not the information is receivable may be performed by determining whether or not the coordinates of the distribution place 9713 having distributed the information overlap with coordinates in the boundary plane A9701.

In a case where no traffic control instruction has been distributed in the session period or the ship A001 was not capable of receiving the distributed information (that is, in a case where a result of the determination 608 is negative (NO)), the instruction observance degree analyzer 105 terminates the present process in step 616.

In a case where a traffic control instruction has been distributed in the session period and the ship A001 was capable of receiving the information (that is, in a case where the result of the determination 608 is affirmative (YES)), the instruction observance degree analyzer 105 proceeds to step 609.

In step 609, the instruction observance degree analyzer 105 extracts the period for which the distribution place 9713 has distributed the information and the content of the information.

In step 610, the instruction observance degree analyzer 105 then analyzes the attribute of the traffic control instruction on the basis of the extracted information. The analysis may use a method for causing the content of an instruction sentence 7901 to undergo language processing and estimating the attribute of the content. Since the format of a traffic control instruction AIS restricts a target to be analyzed to an English command sentence, the analysis may be performed by using a language processing engine that handles English command sentences.

In step 611, the instruction observance degree analyzer 105 calculates, in accordance with the attribute of the traffic control instruction, a course according to the traffic control instruction from the coordinates and time point where and when the distribution place 9713 enters the boundary plane 9701 by using an agent simulation.

In determination 612, the instruction observance degree analyzer 105 determines whether or not the deviation between a result of the agent simulation described above and the trajectory actually employed by the ship A001 in the session is equal to or larger than a predetermined threshold.

In a case where deviation equal to or larger than the predetermined threshold is detected (that is, in a case where a result of determination 612 is affirmative (YES)), the instruction observance degree analyzer 105 increments the number of ignorance of the traffic control instruction by one (ignorance count 9004) in step 613 and proceeds to step 614.

In a case where deviation equal to or larger than the predetermined threshold is not detected (that is, in a case where the result of determination 612 is negative (NO)), the instruction observance degree analyzer 105 proceeds to step 614 with no action.

In step 614, the instruction observance degree analyzer 105 increments the total number of received traffic control instructions (reception count 9005) by one.

In step 615, the instruction observance degree analyzer 105 saves the ignorance count 9004 and the reception count 9005 in the instruction responsiveness DB007.

In step 616, the instruction observance degree analyzer 105 terminates the present process. It is noted that the degree of instruction observance L9993 may be "ignorance count reception count."

Figure 8:
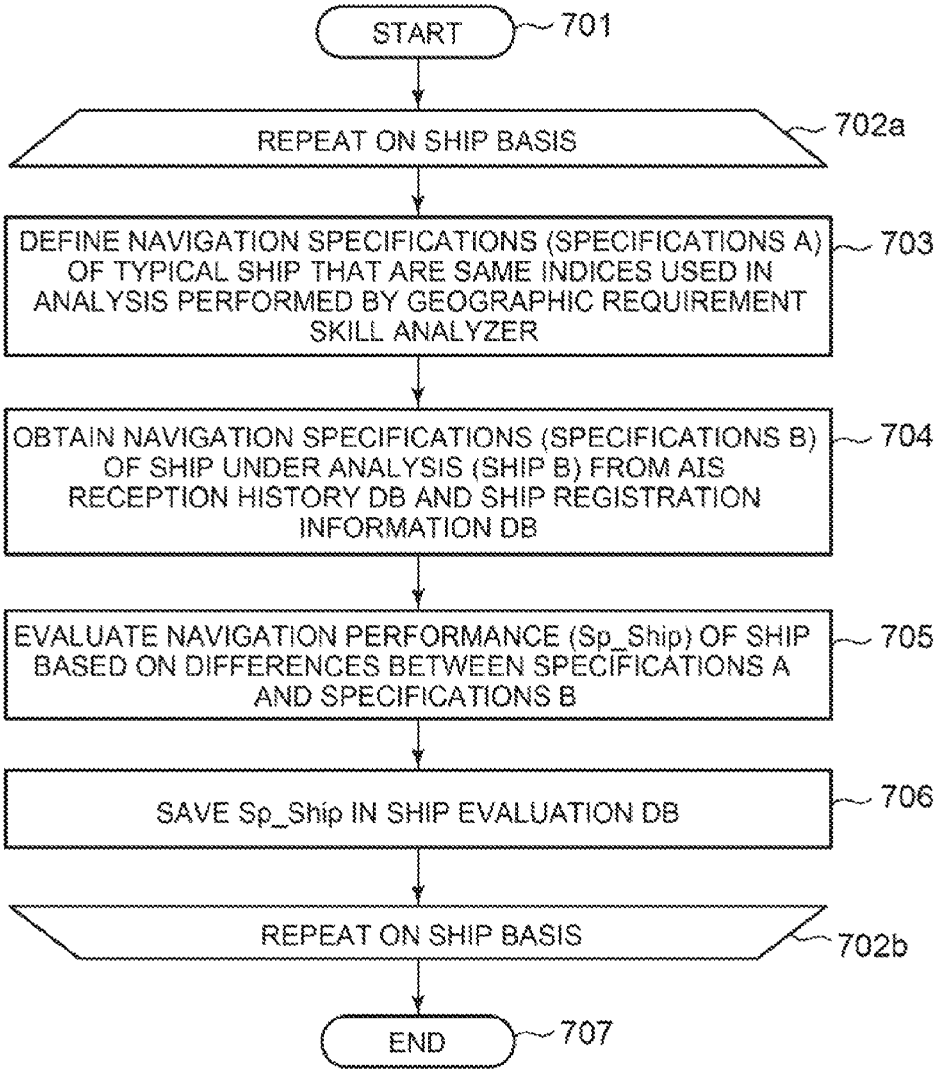
FIG. 8 is a flowchart of the process carried out by an instruction target skill analyzer.

FIG. 8 is a flowchart showing an example of the process carried out by the instruction target skill analyzer 104.

The instruction target skill Sp9996 may be an evaluation function defined by the following Numerical Equation 1 or may be an evaluation function defined by Sp_ship9920 alone or Sp_man9923 alone. In the following Numerical Equation 1, Sp_ship9920 is a skill value specific to a ship, and Sp_man9923 is a skill value specific to an operator. The skill values may be linked to each other via an operator name list and a ship name list or may be fixed by using the ship name 9101 or the operator name. In the case where the skill values are fixed by using the operator name, the name or ID of a person who is responsible for ship navigation or a navigation conductor may be acquired from information on registration of the ship or a port use application.

Sp_ship9920 and Sp_man9923 each have items on "water depth," "ocean current," "abnormal weather," "another ship," and other accident risks independent of one another.

Sp_man9923 is calculated as Sp_skill9922, which is a variable representing the operator's skill and experience, multiplied by Sp_time9921, which is a variable representing the degree of traffic control concentration and the degree of fatigue.

Sp_skill9922 and Sp_ship9920 are values representing the possibility of a specific accident risk in the form of a level or a relative index.

Whether the sign of the Sp_ship9920 index is positive or negative is calculated in accordance with whether accident evasion performance of the ship is superior or inferior to that of a typical ship.

Whether the sign of the Sp_skill9922 index is positive or negative is calculated in accordance with whether accident evasion performance of the operator is superior or inferior to that of a typical operator.

The tendency of whether each of the variables increases or decreases may vary in accordance with the type of accident risk. Further, the tendency of whether each of the variables increases or decreases may be the same or vary among the items.

Sp_time9921 is a value specified by the operator's continuous navigation time. The result of multiplication of Sp_time9921 by Sp_skill9922 is a value that reflects the ship operator's skill. According to the equation, when Sp_skill9922 is negative and Sp_time9921 approaches zero, the overall instruction target skill Sp9996 improves, and one may doubt if this is true. However, in a case where an operator's skill is lower than that of a typical operator, it is expected that the operator of the ship is likely to make wrong judgment, and the equation is set up from a viewpoint of causing such an operator to be rather inactive to reduce chances of wrong judgement so that accident risks of the ship as a whole are reduced. No practical problem will therefore occur.

In the case where Sp_time9921 is specified only by the operator's continuous navigation time, an operator whose degree of traffic control concentration is low in a steady manner cannot be undesirably identified. In this case, however, an effect (adverse effect) due to the low degree of traffic control concentration is reflected in Sp_skill9922 in place of Sp_time9921. No practical problem will therefore occur.

Equation 1

$$Sp = \text{Sp\_ship} + \text{Sp\_man} = \text{Sp\_ship} + (\text{Sp\_skill} \times \text{Sp\_time})$$

$$\text{Sp\_ship} = \begin{pmatrix} \text{Sp\_deep} = \pm y \\ \text{Sp\_seawater} = \pm z \\ \text{Sp\_weather} = \pm a \\ \text{Sp\_other\_ship} = \pm b \\ \vdots \end{pmatrix}$$

$$\text{Sp\_skill} = \begin{pmatrix} \text{Sp\_deep} = \pm c \\ \text{Sp\_seawater} = \pm d \\ \text{Sp\_weather} = \pm e \\ \text{Sp\_other\_ship} = \pm f \\ \vdots \end{pmatrix}$$

$$\text{Sp\_time} = (0 \sim 1)$$

Among the variables that form instruction target skill Sp9996, Sp_ship 9920, which is a value roughly fixed by the specifications of a ship and therefore hardly changes with time or experience, is hence desirably determined from the specifications of the ship in advance.

Sp_ship9920 may instead be calculated as appropriate by searching a database in which the specifications of a ship having a new "ship name 9501" are saved.

Sp_ship9920 is calculated by the following process:

In step 701, the instruction target skill analyzer 104 starts the process of measuring Sp_ship9920 in step 701 and repeats the processes in loop 702 (from step 702*a* to step 702*b*) for all ships registered as a ship.

To realistically operate the system, the traffic controller 016 may preferentially derive Sp_ship9920 of a ship that has made it clear in advance that the ship travels through a traffic controlled sea area and/or a ship that travels through a sea area close to the traffic controlled sea area.

In step 703, the instruction target skill analyzer 104 defines specifications A9924 configured as the typical ship and the typical operator that are the same references used by the geographic requirement skill analyzer 103. The specifications A9924 used in the description, which are the same as those used by the geographic requirement skill analyzer 103, may be saved in a memory, a file, a database, or any other component in advance. In the present embodiment, the specifications A9924 are assumed to include the following items: The length of the ship is 100 m; the width of the ship is 20 m; the distance to the bottom of the ship is 20 m; and the maximum log speed is 30 km/h.

In step 704, the instruction target skill analyzer 104 acquires navigation specifications (specifications B9925) of the ship having a ship name from the ship information DB009. In the present embodiment, the specifications B9925 are assumed to include the following items: The length of the ship is 100 m; the width of the ship is 20 m; the distance to the bottom of the ship is 11 m; and the maximum log speed is 30 km/h.

In step 705, the instruction target skill analyzer 104 evaluates Sp_ship9920 on the basis of differences between the specifications A9924 and the specifications B9925. For example, in the case of the example described above, the specifications B9925 differ from the specifications A9924 in that the distance to the bottom of the ship is shorter by 9 m. One of the accident risk analysis items affected by the distance to the bottom of the ship is a "shallow water." In the example presented in the description of the geographic requirement skill analyzer 103, the shallow water warning levels are defined as follows: The shallow water warning level is 5 when the difference between the water depth and the distance to the bottom of the ship is 1 m or less, and the shallow water warning level is 3 when the difference is 10 m or less. Further, in the specifications A9924 described above, the shallow water warning levels are defined as follows: The shallow water warning level is 5 in an area where the water depth is 21 m, and the shallow water warning level is 3 in an area where the water depth is 30 m. When the warning level calculation is made by using the specifications B9925, however, the shallow water warning level is 3 in an area where the water depth is 21 m. It is therefore appropriate for a typical ship among ships having the specifications B9925 to add a correction value "+2" to the "shallow water" item.

In step 706, the instruction target skill analyzer 104 saves a result of the evaluation described above in the instruction responsiveness DB007. The destination to which the result is saved may be another DB, a cue, a file, a table, a memory, or any other component.

The instruction target skill analyzer 104 carries out the processes in loop 702 described above on a ship basis.

The instruction target skill analyzer 104 may keep carrying out the processes described above until all currently existing ships are evaluated. However, when the evaluation of all the ships is completed, when a predetermined amount of capacity of the saving medium is consumed, or when the traffic controller 016 judges that a necessary and sufficient number of ships are evaluated, the instruction target skill analyzer 104 may terminate the present process in step 707. In this case, the instruction target skill analyzer 104 may carry out the processes described above whenever a new ship is registered. Further, the instruction target skill analyzer 104 may check whether or not a new ship is present whenever fixed time elapses.

On the other hand, Sp_man9923, which is the result of the multiplication of Sp_skill by Sp_time, is required to be updated on a session basis because Sp_man9923 greatly changes with time and experience.

Figure 8A:
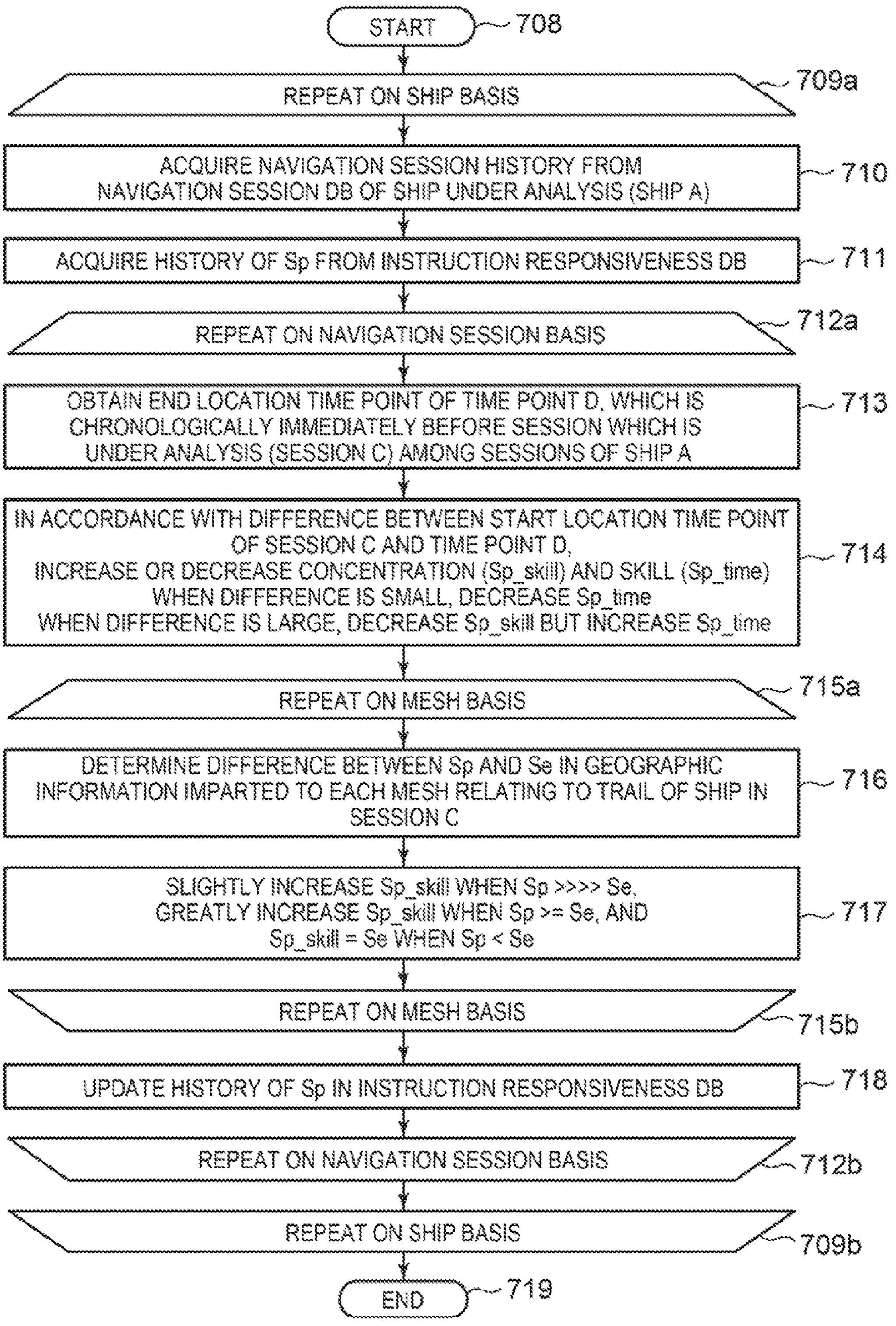
FIG. 8*a* is a flowchart of another process carried out by the instruction target skill analyzer.

Learning is therefore performed whenever a session is added to each ship. The learning process will be described below with reference to FIG. 8*a*.

The instruction target skill analyzer 104 first starts the process of measuring Sp_man9923 in step 708 and repeats the processes in loop 709 (from step 709*a* to step 709*b*) for all the ships registered as a ship.

To realistically operate the system, the traffic controller 016 may preferentially derive Sp_ship9920 of a ship that has made it clear in advance that the ship travels through a traffic controlled sea area and/or a ship that travels through a sea area close to the traffic controlled sea area.

Further, for a ship having no session saved, since the following determination processes and other processes are rejected in practice, the actual amount of calculation depends on the number of saved sessions and therefore converges to a realistic value.

In step 710, the instruction target skill analyzer 104 acquires session data representing the trail of the ship A001 from the session DB011 on the basis of the ship name of the ship A001, which is a ship under analysis.

In step 711, the instruction target skill analyzer 104 acquires, from the instruction responsiveness DB007, the instruction target skill variable Sp9996 evaluated in the past. In a case where no evaluation result exits yet, values of a typical ship and a typical operator may be used as replacements.

The instruction target skill analyzer 104 carries out the processes in loop 712 (from step 715*a* to step 715*b*), which will be described below, on a session data basis.

In step 713, the instruction target skill analyzer 104 acquires the end time point (time point D9927) of the session chronologically immediately before the session under analysis (session C9926), among the navigation sessions of the ship A, and the start time point of the session C9926.

In step 714, the instruction target skill analyzer 104 increases or decreases Sp_time9921 and Sp_skill9922 in accordance with the difference between the start time point of the session C9926 and the time point D9927.

For example, in a case where the difference in time point between the sessions is small, it is assumed that the operator continuously performs navigation, and the instruction target skill analyzer 104 may decrease the concentration parameter Sp_time9921.

On the other hand, in a case where the difference in time point between the sessions is large, it is assumed that the operator has taken a sufficient rest, and the instruction target skill analyzer 104 may increase Sp_time9921. At the same time, it is assumed that an excessive rest may cause degradation in skill, and the instruction target skill analyzer 104 may decrease Sp_skill9922.

The degree of increase or decrease in Sp_time9921 and Sp_skill9922 and the reference in accordance with which the difference in time point between sessions is evaluated may be specified on the basis of the average obtained from past accident examples, learning from past examples, or any other factor, may be specified by rule of thumb of the traffic controller 016, or may be specified on the basis of the operator's score of a driving license examination or the average of questionnaire results made to the operator.

After the processes described above are carried out, the value of the instruction target skill Sp9996 of the ship A001 at the start point of the session C9926 is updated to the value from the latest information and calculated in the same way.

The instruction target skill analyzer 104 then acquires, from the geographic information DB006, the geographic requirement skill Se9995 in each mesh through which the ship A001 has traveled and carries out the processes in loop 715 (from step 715*a* to step 715*b*), which will be described below.

In step 716, the instruction target skill analyzer 104 calculates the difference between the geographic requirement skill Se9995 imparted to each mesh through which the ship A001 has traveled and the instruction target skill Sp9996.

In step 717, the instruction target skill analyzer 104 increases Sp_skill9922 in accordance with the difference between the instruction target skill Sp9996 and the geographic requirement skill Se9995. At this point of time, in a case where the instruction target skill Sp9996 is significantly greater than the geographic requirement skill Se9995 in a mesh where the navigation is performed, no improvement in skill is achieved, and Sp_skill9922 may therefore be slightly increased. In a case where instruction target skill Sp9996 is roughly equal to the geographic requirement skill Se9995, improvement in skill is achieved, and Sp_skill9922 may be greatly increased. In a case where the geographic requirement skill Se9995 is greater than the instruction target skill Sp9996, the evaluation of the instruction target skill Sp9996 possibly contains an error, and Sp_skill9922 may therefore be increased to the level of the geographic requirement skill Se9995.

The instruction target skill analyzer 104 repeats the processes in loop 715 described above on a mesh basis.

When the update of Sp_skill9922 is completed by the repetition described above, the instruction target skill analyzer 104 updates the value of instruction target skill Sp9996 in the instruction responsiveness DB007 in step 718. Since the number of update actions serves as a reference of evaluation of the reliability of the information on the skill, the number may be separately counted as the number of analysis actions 9928 and used as an Sp correction term.

The instruction target skill analyzer 104 carries out the processes in loop 712 described above on a session basis. The instruction target skill analyzer 104 carries out the processes in loop 709 on a ship basis.

The instruction target skill analyzer 104 carries out the present process until all currently existing ships are evaluated. When the evaluation of all the ships is completed, when the amount of capacity of the saved information reaches a predetermined value, or when the traffic controller 016 judges that a necessary and sufficient number of ships are evaluated, the instruction target skill analyzer 104 terminates the present process in step 719. In this case, whenever a new session is inputted, the instruction target skill analyzer 104 may carry out the processes in steps 708 to 719 on a relevant ship. Further, the instruction target skill analyzer 104 may check whether or not a new session is present whenever fixed time elapses.

Figure 9:
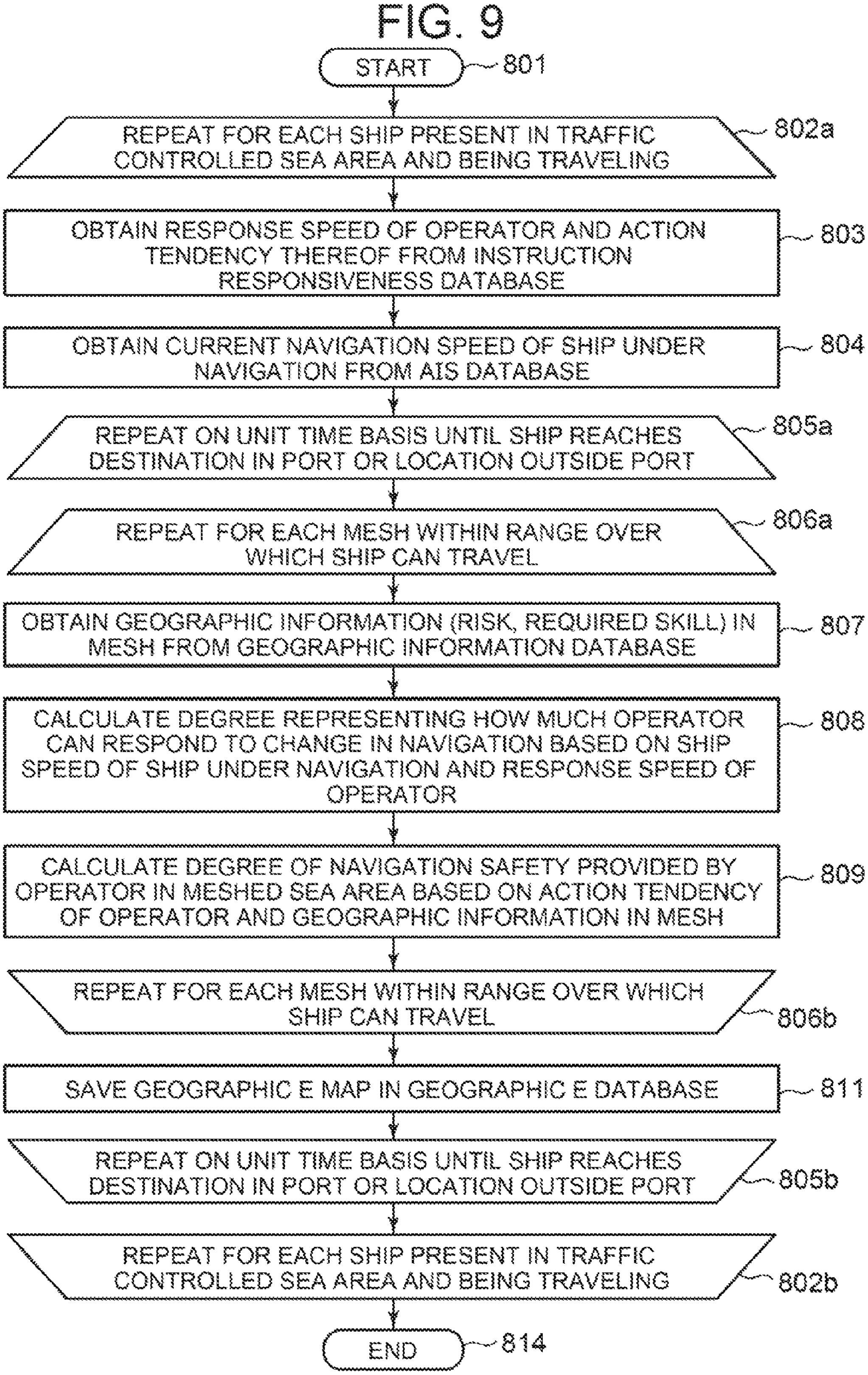
FIG. 9 is a flowchart of the process carried out by a geographic E map generator.

FIG. 9 is a flowchart showing an example of the process carried out by the geographic E map generator 201.

The geographic E map generator 201 starts the process in step 801 and carries out the following processes in loop 802 (from step 802*a* to step 802*b*) for all ships that "are present in a traffic controlled sea area" and "are traveling."

In step 803, the geographic E map generator 201 acquires information on the response speed Tr9994, the instruction target skill Sp9996, and the degree of instruction observance L9993 of the ship A001 from the instruction responsiveness DB007. The geographic E map generator 201 further acquires information on the geographic requirement skill Se9995 in each mesh in the traffic controlled sea area from the geographic information DB006. In the acquisition of the instruction target skill Sp9996, the geographic E map generator 201 may acquire the start time point 9111 of the current session of the ship A001 from the session table 9804 and acquire the session last time point 9107 of the preceding navigation session of the ship A001 from the session DB011. The geographic E map generator 201 may then separately carry out the same processes as those in loop 712 (from step 712*a* to step 712*b*) carried out by the instruction target skill analyzer 104 to update Sp_skill and Sp_time.

In step 804, the geographic E map generator 201 acquires the ground speed of the ship A001 at the current system time point from the coordinate AIS data 000.

The geographic E map generator 201 then repeats the processes in loop 805 (from step 805*a* to step 805*b*), which will be described below, whenever unit time elapses until the ship A001 reaches the in-port destination 9103 defined by the coordinate AIS data 000 of the ship A001 or the ship A001 enters a sea area other than the traffic control target sea area.

The geographic E map generator 201 repeats the processes in loop 806 (from step 806*a* to step 806*b*), which will be described below, for each mesh in a specific timeframe in loop 805.

In step 807, the geographic E map generator 201 obtains information on the geographic requirement skill Se9995 on a mesh basis.

In step 808, the geographic E map generator 201 calculates the degree representing how much the operator can respond to a change in navigation on the basis of the ship speed 9505 of the ship A001 and the response speed Tr9994.

In step 809, the geographic E map generator 201 calculates the degree of navigation safety provided by the operator in each meshed sea area on the basis of the difference between the instruction target skill Sp9996 of the operator and the geographic requirement skill Se9995 in the mesh.

The processes in steps 808 and 809 described above may be integrated with each other by using evaluation function geography E. The evaluation function geography E may be calculated by the following Equation 2:

$$\text{Geography } E = \left(L * u\left(\frac{\sum (\alpha_i^*(Sp_i - Se_i)) * u(Tc - Tr)}{Tc}\right)\right)^{-1} \quad \text{Equation 2}$$

The variables in Equation 2 are as follows:

"Degree of instruction observance" L (unit: %)

"Weight on geographic requirement" α (unit: none)

"Geographic requirement skill (variety of items)" Se (unit: rank evaluation)

"Instruction target skill (variety of items)" Sp (unit: rank evaluation)

"Instruction response speed" Tr (unit: second)

"Period of time required to travel to navigation target mesh" Tc (unit: second)

The processes in loop 806 described above are repeated on a mesh basis to produce the geographic E map 9999, which is geographic information representing the probability of the navigation of the ship A001 at a specific time point and in a specific sea area mesh.

In step 811, the geographic E map generator 201 saves the generated geographic E map 9999 in the geographic E map DB013.

The geographic E map generator 201 repeats the processes in loop 805 described above whenever the unit time elapses until the ship A001 enters a sea area other than the traffic control target sea area.

The geographic E map generator 201 carries out the processes in loop 802 described above for all the ships that "are present in the traffic controlled sea area" and "are traveling."

When there is no ship present in the traffic controlled sea area and being traveling, the geographic E map generator 201 terminates the present process in step 814.

In a case where a ship approaches the boundary line of the traffic controlled sea area, in a case where a system time point specified in the application stating that the ship travels through the traffic controlled sea area is reached, or in a case where a stationary ship in the traffic controlled sea area starts traveling, the geographic E map generator 201 may start the present process again.

Figure 10:
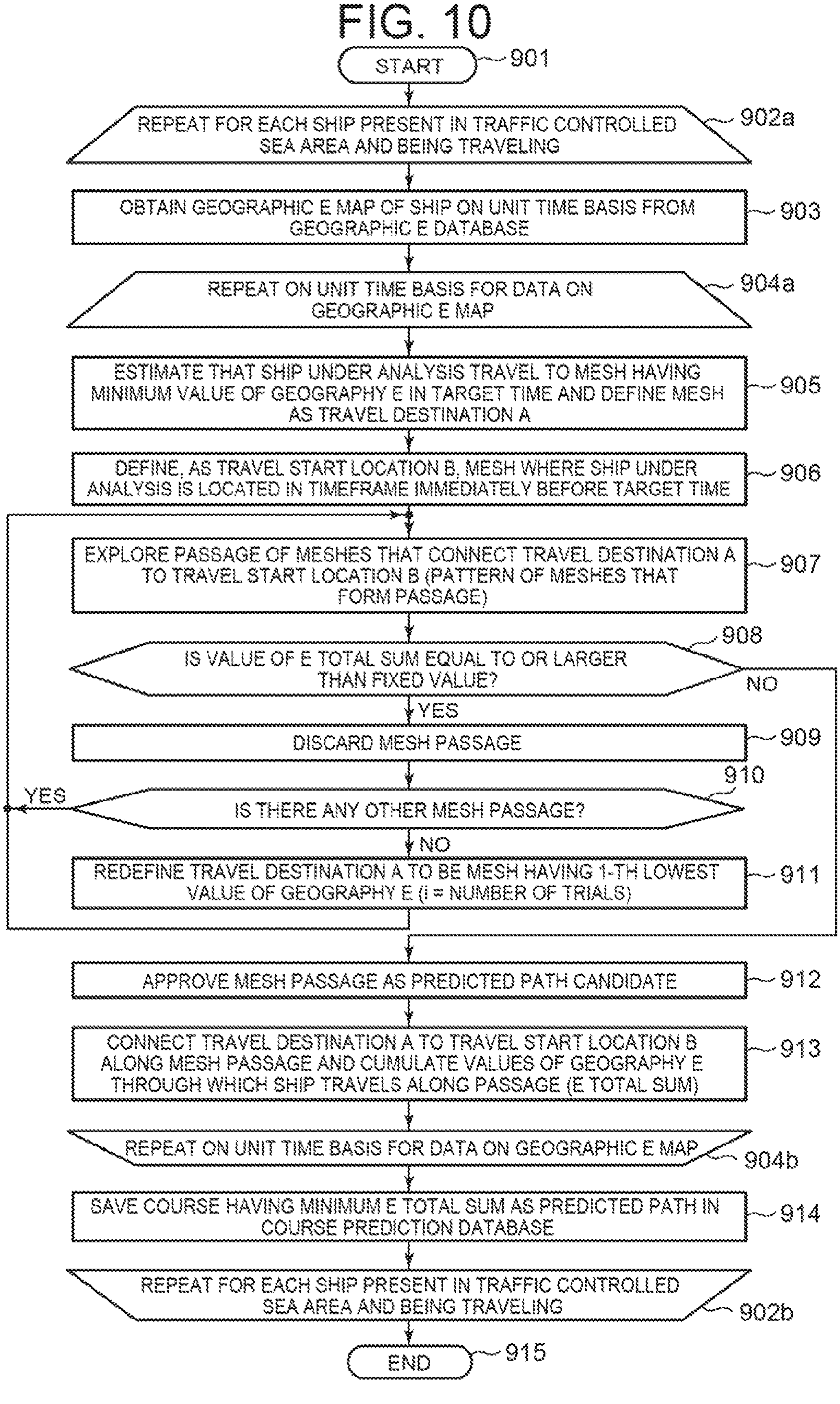
FIG. 10 is a flowchart of the process carried out by a course predictor.

FIG. 10 is a flowchart showing an example of the process carried out by the course predictor 202.

The course predictor 202 starts the process in step 901 and carries out the processes in loop 902 (from step 902*a* to step 902*b*), which will be described below, for all the ships that "are present in the traffic controlled sea area" and "are traveling."

In step 903, the course predictor 202 acquires the geographic E map 9999 of the ship A001, which is a ship under analysis, from the geographic E map DB013.

In the processes in loop 904 (from step 904*a* to step 904*b*), the course predictor 202 carries out the following processes on future geographic E maps 9999 later than the current system time point in ascending order of time measured with respect to the current system time point.

In step 905, the course predictor 202 assumes that the ship A001 travels to a mesh having a minimum value of the geography E9997 in target time and defines the mesh as a travel destination A5002.

In step 906, the course predictor 202 defines, as a travel start point B5003, the mesh where the ship A001 is located in the timeframe immediately before the target time. Since the definition is made on a future geographic E map later than the current system time point, the travel start point B5003 defined by the course predictor 202 for the first time may be the coordinates of the ship A001 at the current system time point.

In step 907, the course predictor 202 connects the travel destination A5002 to the travel start point B5003 and explores a pattern of meshes that form a passage therebetween (mesh passage 5001).

In step 908, the course predictor 202 determines whether or not an E total sum 5004, which will be described later, along the mesh passage 5001 described above exceeds a predetermined threshold C8803.

The threshold C8803 may be calculated from accident examples in advance or may be configured by the traffic controller 016.

In a case where the E total sum 5004 along the mesh passage 5001 is smaller than the threshold C8803 (that is, a result of the determination in step 908 is negative (NO)), the course predictor 202 proceeds to step 912.

In step 912, the course predictor 202 approves the mesh passage 5001 as a predicted course candidate.

In step 913, the course predictor 202 then cumulates the values of geography E 9997 in the meshes that form the passage between the travel destination A5002 and the travel start point B5003 along the mesh passage 5001. The cumulated sum may be defined as the E total sum 5004, and the initial value of the E total sum 5004 may be "0".

In loop 904, the course predictor 202 then migrates to analysis of the geographic E map 9999 in the following timeframe.

In a case where the E total sum 5004 along the mesh passage 5001 is equal to or larger than the threshold C8803 (that is, the result of the determination in step 908 is affirmative (YES)), the course predictor 202 proceeds to step 909.

In step 909, the course predictor 202 discards the mesh passage 5001 and does not analyze it afterward. As a result, exploration of a course in a sea area through which the ship cannot travel, for example, the response of the operator of the ship is not fast enough, the skill of the operator of the ship is insufficient, or the ship cannot travel due to the specifications thereof, can be abandoned in advance. A process that requires the largest amount of calculation in the present system is the process of exploring a course. In the present embodiment, the amount of calculation of course exploration is greatly reduced by narrowing the exploration range in advance as described above.

Having discarded the mesh passage 5001 in step 909, the course predictor 202 determines in step 910 whether or not the ship A001 has another remaining mesh passage 5001.

In a case where there is another remaining mesh passage 5001 (that is, a result of the determination in step 910 is affirmative (YES)), the course predictor 202 migrates to analysis of the geographic E map 9999 along the remaining mesh passage 5001 in the following timeframe in the processes in loop 904.

In a case where there is no other remaining mesh passage 5001 (that is, the result of the determination in step 910 is negative (NO)), the course predictor 202 determines that it is difficult for the ship to travel to the travel destination in a practical sense, redefines, as the travel destination A5002, a mesh having an i-th lower value of the geography E9997 (i is the number of trials in loop 911), and explores a mesh passage 5001.

After the processes described above are repeated and the analysis of the geographic E map 9999 is completed in all future timeframes later than the current system time point, the course predictor 202 terminates the processes in loop 904 and proceeds to step 914.

In step 914, the course predictor 202 selects a course having the minimum E total sum 5004 from the predicted courses of the ship having undergone the exploration and saves the selected course in the course prediction DB014.

The course predictor 202 carries out the processes in loop 902 described above for all the ships that "are present in the traffic controlled sea area" and "are traveling."

When there is no ship present in the traffic controlled sea area and being traveling, the course predictor 202 terminates the present process in step 915.

In a case where a ship approaches the boundary line of the traffic controlled sea area, in a case where a system time point specified in the application stating that a ship travels through the traffic controlled sea area is reached, or in a case where a stationary ship in the traffic controlled sea area starts traveling, the course predictor 202 may start the present process again. Instead, among a plurality of course candidates of the ship A001, the course predictor 202 may analyze each of the courses of the ship A in consideration of the probability of selection of the course. In this case, the course predictor 202 may keep exploring courses until fixed time elapses, determine a relative likelihood in accordance with the ratio between the threshold D8804 and the E total sum 5004 of a predicted course before the predicted course is saved in step 914, and use the relative likelihood at the point of time when the exploration is entirely completed to configure the probability with the aid of an evaluation function.

Figure 11:
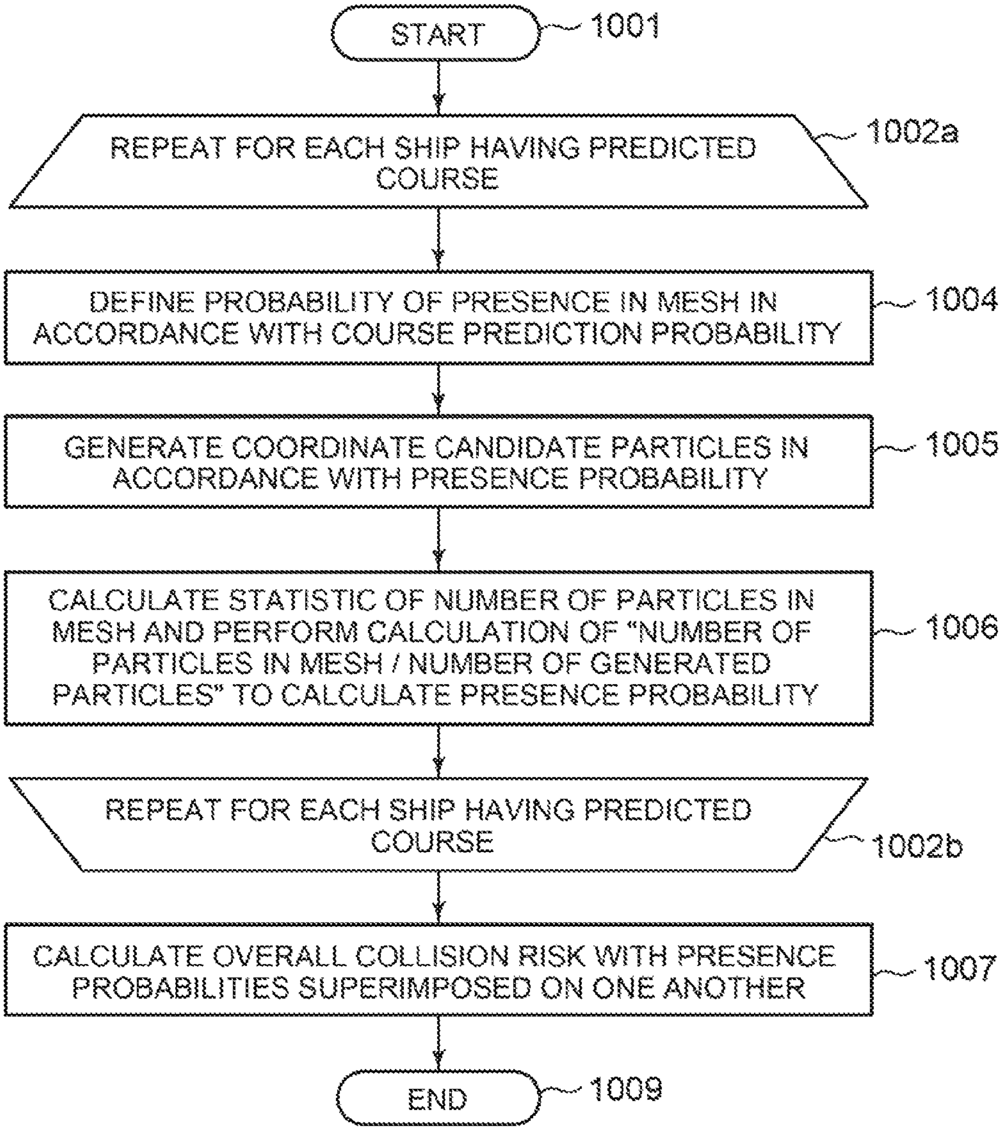
FIG. 11 is a flowchart of the process carried out by a traffic control risk simulator.

FIG. 11 is a flowchart showing an example of the process carried out by the traffic control risk simulator 203.

The traffic control risk simulator 203 starts the process in step 1001 and carries out the processes in loop 1002 (from step 1002*a* to step 1002*b*), which will be described later, for "a ship present in a traffic controlled sea area" and "a ship having a predicted course."

In step 1004, the traffic control risk simulator 203 generates a plurality of coordinate candidate particles in each mesh of the traffic controlled sea area on a predicted course basis for each unit time 9991. The traffic control risk simulator 203 may increase or decrease the number of generated particles on the basis of the E total sum 5004 calculated by the course predictor 202 or may set the number to be a fixed value that is a constant number. In place of generation of the particles, the traffic control risk simulator 203 may use a probability equation having a distribution. In this case, the traffic control risk simulator 203 may increase or decrease the number of terms of the probability equation in place of increase or decrease in the number of particles, which will be described below.

In step 1005, the traffic control risk simulator 203 generates random number coordinate candidate particles in accordance with the value of the geography E9997 in each mesh. The traffic control risk simulator 203 may calculate the number of generated particles in accordance with the ratio of the geography E9997 to the threshold D8804 or may calculate the number of generated particles by using the average of the values of the geography E9997 excluding a no-entry area of the traffic controlled area.

In step 1006, the traffic control risk simulator 203 calculates a statistic of the number of particles in a mesh. For example, the traffic control risk simulator 203 calculates ship presence probability by using the number of particles in a mesh as compared with the total number of generated particles and repeats the presence probability calculation on a ship basis.

In step 1007, the traffic control risk simulator 203 calculates an overall accident risk on the basis of the ship presence probability and forwards information on the calculated accident risk in the sea area to the traffic risk evasive action determiner 204. A forwarding method may be a method using any of a database, a file, a cue, a memory, or any other component.

After the simulation described above is completed, the traffic control risk simulator 203 terminates the present process in step 1009.

Figure 12:
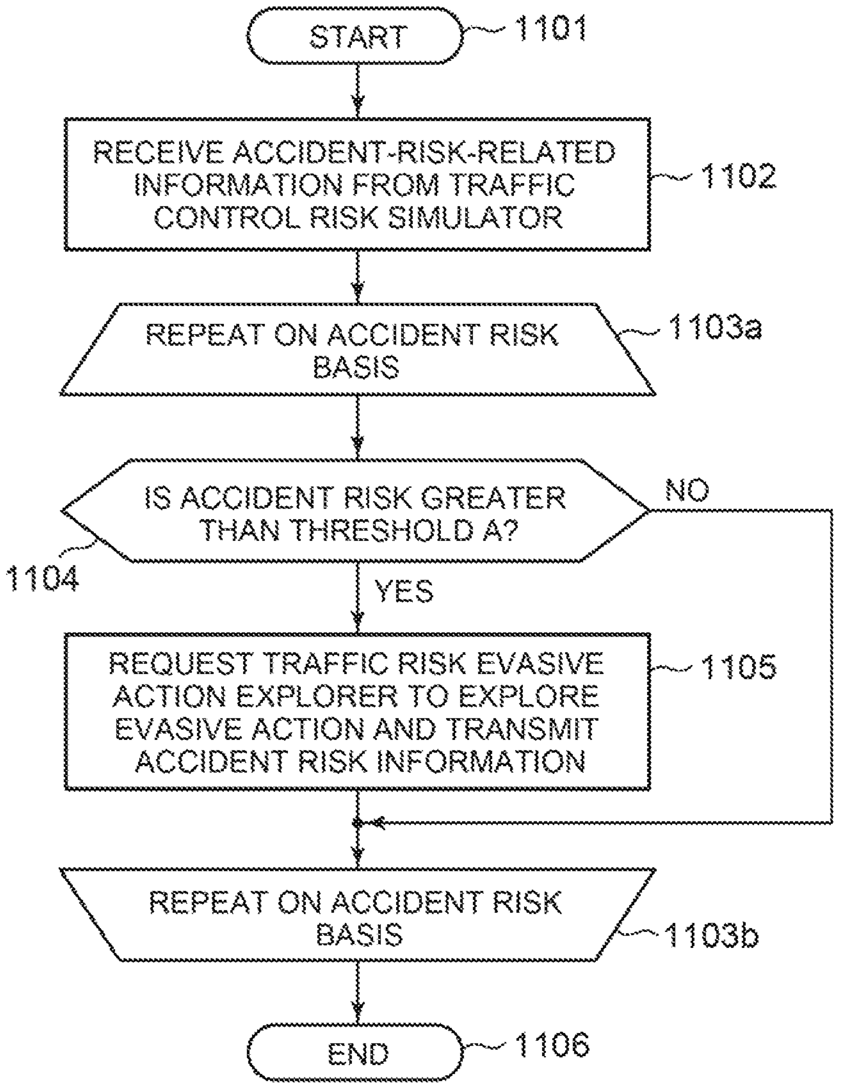
FIG. 12 is a flowchart of the process carried out by a traffic risk evasive action determiner.

FIG. 12 is a flowchart showing an example of the process carried out by the traffic risk evasive action determiner 204.

The traffic risk evasive action determiner 204 starts the process in step 1101.

In step 1102, the traffic risk evasive action determiner 204 receives the accident-risk-related information from the traffic control risk simulator 203. The accident-risk-related information may contain mesh position information, accident probability, an accident occurrence time point, and other factors.

The traffic risk evasive action determiner 204 carries out the processes in loop 1103, which will be described below, on the accident-risk-related information on a sea area basis forwarded from the traffic control risk simulation.

In step 1104, the traffic risk evasive action determiner 204 determines whether or not the accident probability exceeds the threshold A8800, which is "the average determined from accident examples in advance" or "a value configured by the traffic controller 016."

In a case where the accident probability exceeds the threshold A8800 (that is, a result of the determination in step 1104 is affirmative (YES)), the traffic risk evasive action determiner 204 proceeds to step 1105.

In step 1105, the traffic risk evasive action determiner 204 requests the traffic risk evasive action explorer 205 to explore an evasive action and forwards the accident risk information. The request of exploration an evasive action may be made whenever the accident risk exceeds the threshold A8800, may be made whenever fixed time separately given from the traffic controller elapses in descending order of accident risk probability, or may be made in ascending order of the length of time from the current time point to the time point when an accident occurs.

Figure 13:
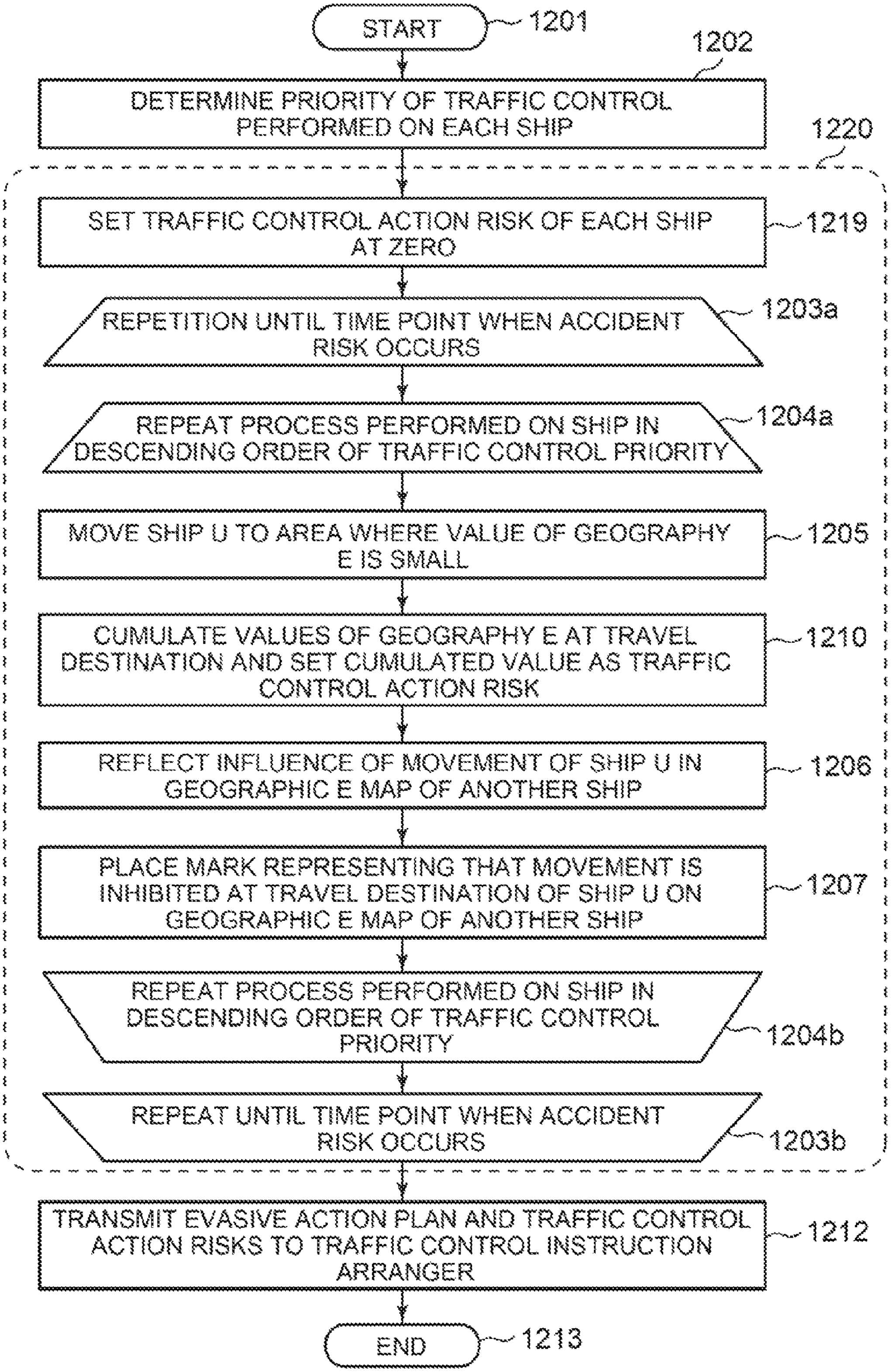
FIG. 13 is a flowchart of the process carried out by a traffic risk evasive action explorer.

FIG. 13 is a flowchart showing an example of the process carried out by the traffic risk evasive action explorer 205.

An evasive action is an instruction issued to each ship when a collision risk is detected and relating to movement required for evasion of the collision.

In step 1201, the traffic risk evasive action explorer 205 starts the process.

In step 1202, the traffic risk evasive action explorer 205 determines traffic control priority in accordance with the E total sum 5004 cumulated until a predicted time point when each ship encounters the collision.

In step 1219, the traffic risk evasive action explorer 205 resets a traffic control action risk 7207 of each ship at zero.

The traffic risk evasive action explorer 205 carries out the processes in loop 1203 (from step 1203*a* to step 1203*b*), which will be described below, in each unit time from the current system time point to the time point when the accident risk occurs.

The traffic risk evasive action explorer 205 carries out the processes in loop 1204 (from step 1204*a* to step 1204*b*), which will be described below, on the ships in descending order of traffic control priority. A ship that is a target of the processes in loop 1204 is hereinafter referred to as a ship U9402.

In step 1205, the traffic risk evasive action explorer 205 causes the ship U9402 to move to a location present on the geographic E map 9999 and having the minimum value of the geography E9997 (safe location 9403).

In step 1210, the traffic risk evasive action explorer 205 cumulates the values of the geography E9997 at the travel destination of the ship U9402 and sets the cumulated value as the traffic control action risk 7207.

In step 1206, the traffic risk evasive action explorer 205 adds "a function based on the geography E9997 of the ship U9402" to the geographic E map 9999 of the remaining ships at relevant time points. The function may be the reciprocal of the geography E9997 of the ship U9402. Further, the function may be multiplied by an influence coefficient based on the size of the ship U9402.

In step 1207, the traffic risk evasive action explorer 205 sets the mesh at the travel destination of the ship U9402 to be "navigation inhibited" on the geographic E map 9999 of the remaining ships. As a method for expressing "navigation inhibited" in the form of a numeral, the numeral may be a larger value as the geography E9997 in a target mesh is closer to infinity or may be displayed as "N/A."

The processes in steps 1205, 1206, and 1207 described above may not be carried out on the geographic E map 9999 of each ship. For example, a geographic E map common to the ships (common map) may be created on a unit time basis, and successively from the ship U9402, based on the geography E9997 of each of the ships, an attribute may be imparted to the common map. The number of actions of rewriting the geographic E map 9999 of the remaining ships at a relevant time point is therefore be reduced.

The traffic risk evasive action explorer 205 carries out the processes in loop 1204 described above on a ship basis.

The traffic risk evasive action explorer 205 carries out the processes in the loop 1203 described above in each unit time from the current system time point to the time point when the accident risk occurs.

A rough proposal of an evasive action plan is thus created by carrying out the processes described above.

In step 1212, the traffic risk evasive action explorer 205 then saves the evasive action proposal and the sum of the pieces of information on the priority of the accident risks of the ships relating to the proposal in a cue and forwards the proposal and the sum to the traffic control instruction arranger 206. In place of the cue, a file, a database, a memory, or any other component may be used.

The traffic risk evasive action explorer 205 then terminates the present process in step 1213. The processes in steps 1202 to 1203*b* in FIG. 13 may be called a block 1220.

Figure 13A:
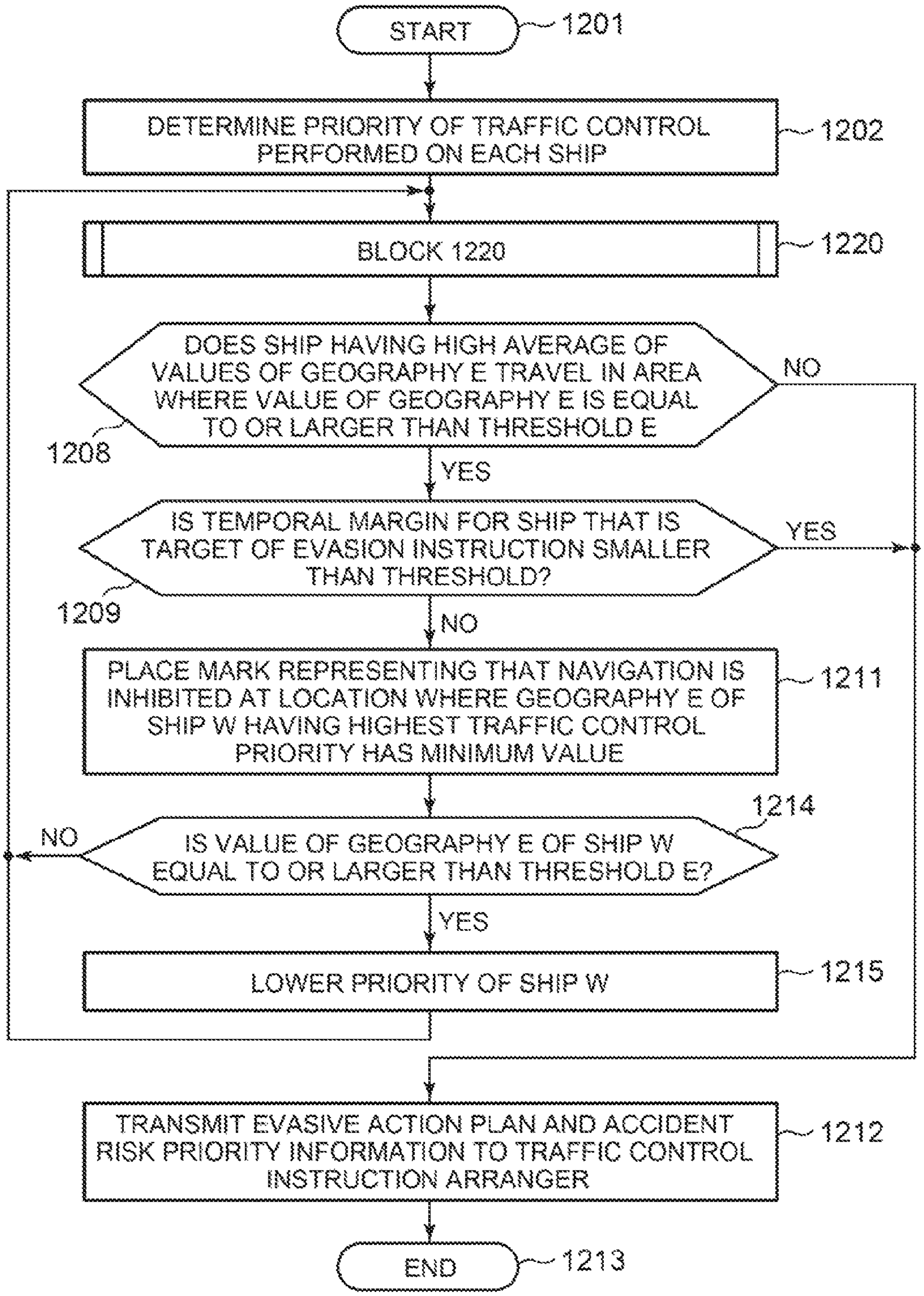
FIG. 13*a* is a supplementary flowchart of the process carried out by the traffic risk evasive action explorer.

FIG. 13*a* is a flowchart showing an example of the process of recursively exploring a plurality of evasion instructions and creating, on the basis of the evasion instructions, an evasive action proposal that guarantees at least a certain degree of safety of navigation of each ship.

The traffic risk evasive action explorer 205 carries out the following processes at the point of time when loop 1203 ends. That is, in step 1208, the traffic risk evasive action explorer 205 determines whether or not "a ship having the maximum average of the values of geography E9997 travels in an area where the value of the geography E9997 is equal to or larger than a threshold E."

In a case where no such ship travels in the area (NO in step 1208), the traffic risk evasive action explorer 205 carries out the process in step 1212 and then terminates the present process in step 1213.

In a case where such a ship travels in the area (YES in step 1208), the traffic risk evasive action explorer 205 proceeds to step 1209.

In step 1209, the traffic risk evasive action explorer 205 determines whether or not "a temporal margin 4000 defined by a difference between, as for a ship which is an avoidance instruction target, a time point according to the response speed Tr9994 which is an analysis target of evasive action and an estimated time point of collision is a fixed value of less."

In a case where the temporal margin 4000 is smaller than a predetermined threshold (YES in step 1209), the traffic risk evasive action explorer 205 suspends the exploration and sets, among the results of the exploration up to the present, a result of the exploration showing the minimum average of "the values of geography E9997 of the ship having the highest average of the geography E9997" to be an evasive action proposal 9301. The traffic risk evasive action explorer 205 then carries out the process in step 1212 and terminates the present process in step 1213.

In a case where the temporal margin 4000 is equal to or larger than the predetermined threshold (NO in step 1209), the traffic risk evasive action explorer 205 sets, in step 1211, the travel destination of a first ship (ship W9404) in the evasive action proposal to be a navigation inhibited destination and starts exploring an evasion plan again in loop 1203. At the point of time when "the travel destination of the ship W9404 is set to be a navigation inhibited destination", the traffic risk evasive action explorer 205 may determine in step 1214 whether or not the value at the safe location of the ship W9404 is equal to or larger than a threshold E8805 to reduce the amount of exploration calculation.

In a case where the value at the safe location of the ship W9404 is smaller than the threshold E8805 (NO in step 1214), the traffic risk evasive action explorer 205 returns to the processes in loop 1203.

In a case where the value at the safe location of the ship W9404 is equal to or larger than the threshold E8805 (YES in step 1214), the traffic risk evasive action explorer 205 lowers the traffic control priority of the ship W9404 in step 1215. As a result, the traffic control priorities of the other ships relatively rise.

The traffic risk evasive action explorer 205 then starts the processes in block 1220. A method for lowering the traffic control priority may use any algorithm that allows the priority of a certain ship to be changed relative to the priorities of the other ships in a random order.

Figure 14:
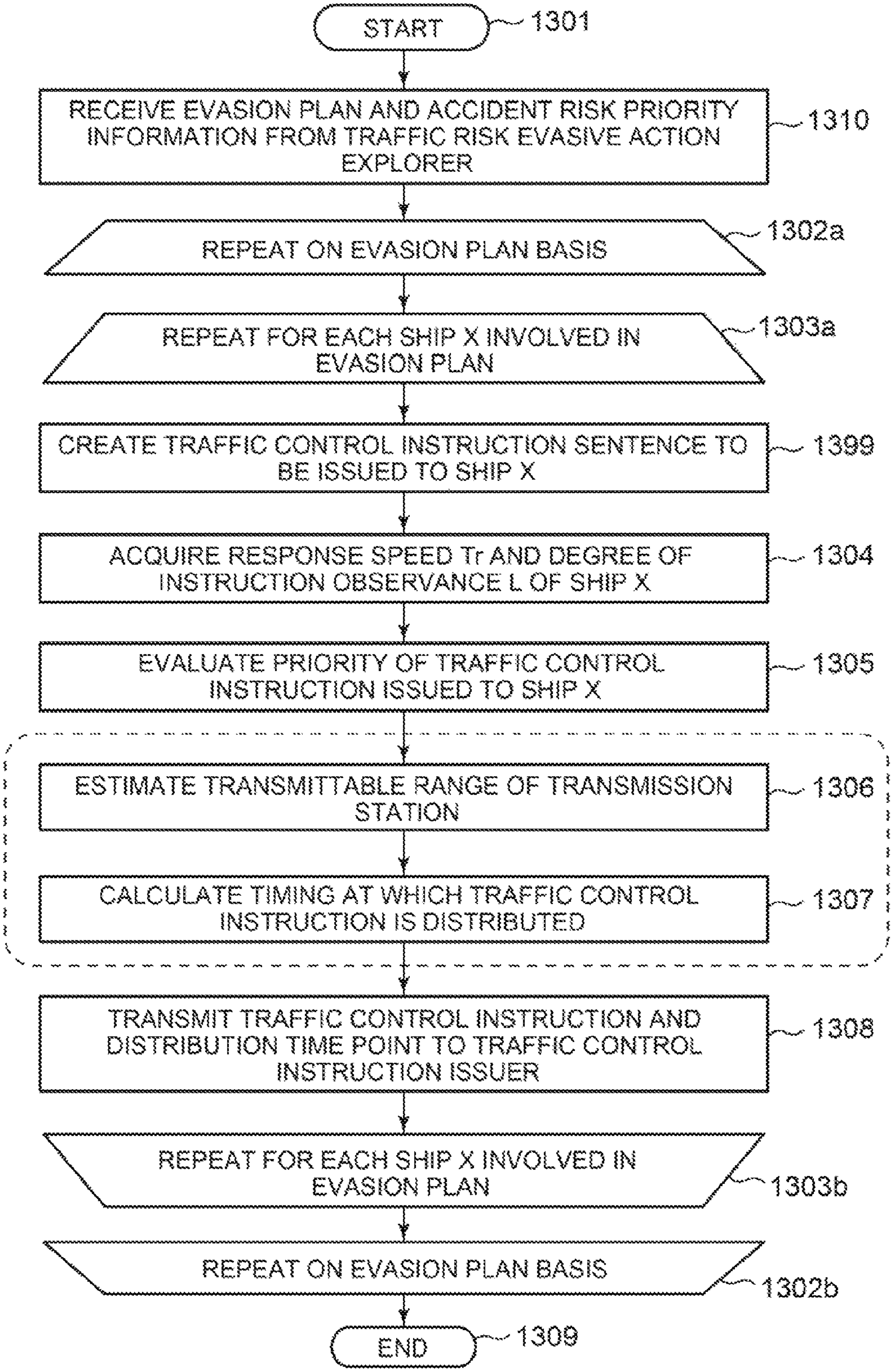
FIG. 14 is a flowchart of the process carried out by a traffic control instruction arranger.

FIG. 14 is a flowchart showing an example of the process carried out by the traffic control instruction arranger 206.

The traffic control instruction arranger 206 starts the process in step 1301.

In step 1310, the traffic control instruction arranger 206 receives the evasion plan 1301 and the information on the priority of the accident risk of each ship from the traffic risk evasive action explorer 205.

The traffic control instruction arranger 206 carries out the processes in loop 1302 (from step 1302*a* to step 1302*b*), which will be described below, on each evasion plan.

The traffic control instruction arranger 206 carries out the processes in loop 1303 (from step 1303*a* to step 1303*b*), which will be described below, for each ship (ship X9302) that is a target of a traffic control instruction in the evasion plan 9301.

In step 1399, the traffic control instruction arranger 206 creates a traffic control instruction sentence to be issued to the ship X9302. The traffic control instruction sentence may be manually created by the traffic controller 016 or may be automatically created in accordance with a difference from the predicted course of the ship X9302 acquired from the course prediction DB014. For example, in the evasion plan from the current system time point to a time point T9303, in a case where the total travel distance of the ship X9302 for each unit time 9991 decreases, an instruction of deceleration of the ship X9302 until the time point T9303 is created. For example, in a case where accident risks concentrate on a specific mesh, the mesh is set as a no-entry mesh.

In step 1304, the traffic control instruction arranger 206 acquires information on the priority of an accident risk of the ship X9302 from the traffic risk evasive action explorer 205 and further acquires information on the response speed Tr9994 and the degree of instruction observance L9993 from the instruction responsiveness DB007.

In step 1305, the traffic control instruction arranger 206 evaluates the priority of the traffic control instruction issued to the ship X9302 on the basis of the accident risk, the response speed Tr9994, and the degree of instruction observance L9993. The priority of the traffic control instruction may be evaluated by using part or entirety of the accident risk, the response speed Tr9994, and the degree of instruction observance L9993. The evaluation may be performed by using the following Numerical Equation 3.

$$\text{Priority of traffic control instruction} = \text{accident risk} \div (Tr/L) \qquad \text{Equation 3}$$

In step 1306, the traffic control instruction arranger 206 acquires, from the geographic information DB006, information on the coordinates of the distribution place 9713, which is present in a sea area from which a traffic control instruction is transmitted and which is capable of transmitting a traffic control instruction AIS015, and estimates the range over which the distribution place can perform transmission. The estimated range may be a specification value of an AIS transmitter provided at the distribution place 9713, may be a value preset by the traffic controller 016, or may be a value actually measured in advance (12 nautical miles or less, for example).

In step 1307, the traffic control instruction arranger 206 calculates the timing when the traffic control instruction AIS015 can be distributed on the basis of the relationship between the predicted course of the ship X9302 acquired from the ship course prediction DB014 or acquired in a stream process and the AIS transmission range of the distribution place 9713. In a case where there are a plurality of distributable traffic control instructions AIS015, the traffic control instruction arranger 206 stores the plurality of traffic control instructions AIS015 in a cue in such a way that they are distributed in descending order of the traffic control instruction priority. In place of the cue, a file, a memory, or a database may be used. The traffic control instruction arranger 206 may not carry out the processes in steps 1306 and 1307 but may distribute the traffic control instruction to all transmission stations.

In step 1308, the traffic control instruction arranger 206 successively forwards the traffic control instruction and the time point when the traffic control instruction is distributed to the traffic control instruction issuer 207. The traffic control instruction issuer 207 distributes the received traffic control instruction to each transmission station at the distribution time point.

Having carried out the processes in loops 1303 and 1302, the traffic control instruction arranger 206 terminates the present process in step 1309.

Figure 15:
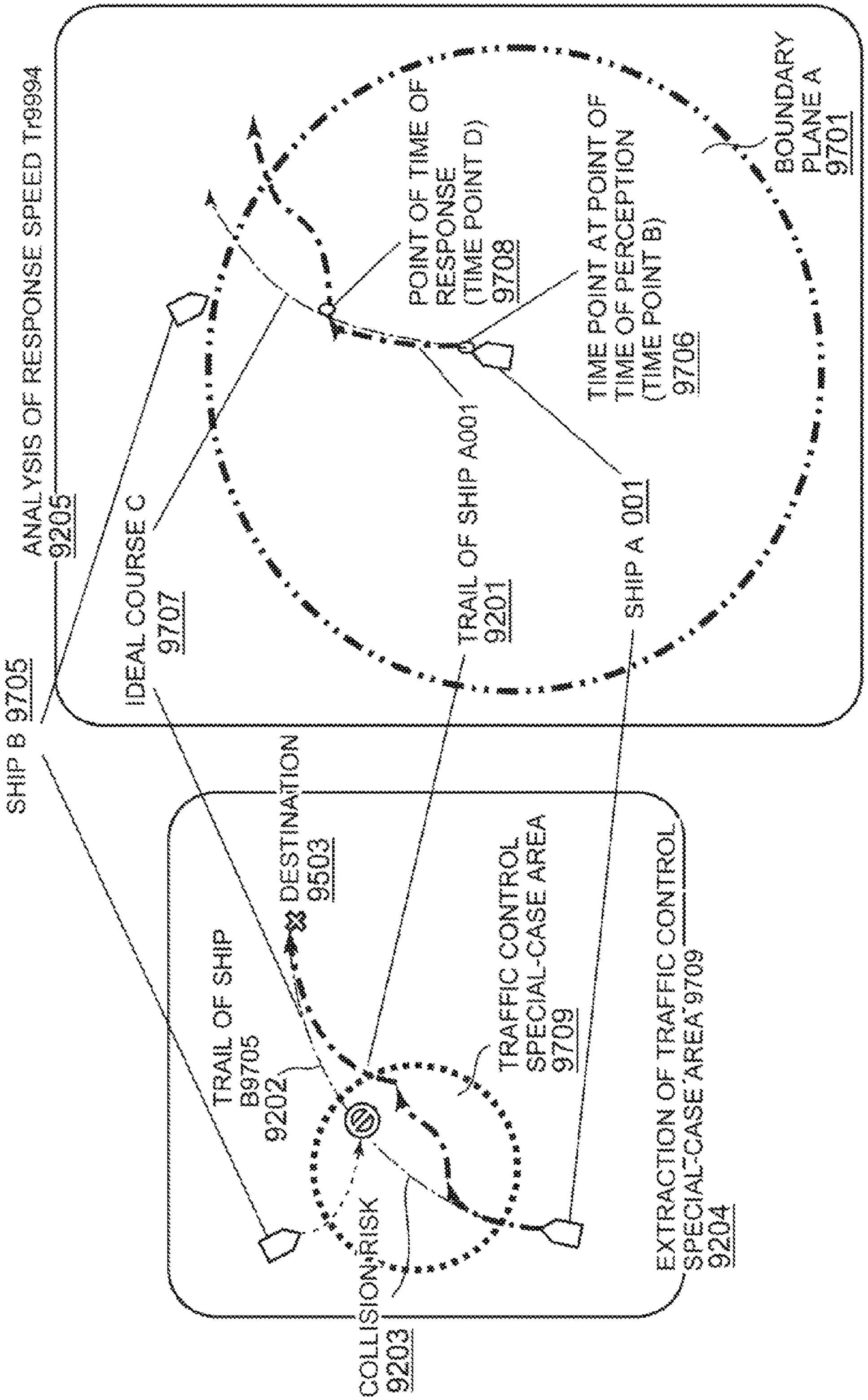
FIG. 15 is a conceptual view of a method for determining a response speed Tr in the response speed estimator.

FIG. 15 is a conceptual view of a method for determining the response speed Tr9994 in the response speed estimator 102.

"Extraction 9204 of a traffic control special-case area 9709" in FIG. 15 shows an example of a scene until the ship A001 reaches the destination 9503. The destination 9503 may be the coordinates in the last AIS data in a session under analysis.

"Analysis 9205 of the response speed Tr9994" in FIG. 15 is an enlarged view of an example of a scene of entry into a traffic control special-case area extracted by "Extraction 9204 of a traffic control special-case area 9709."

In "Extraction 9204 of a traffic control special-case area 9709," the ideal course C9707, along which the ship A001 under analysis travels toward the destination, intersects a trail 9202 of the ship B9705 at the coordinates of the location of a collision risk 9203. In this case, if the ship A001 takes no action, the ship A001 collides with the ship B9705. An action of the ship B9705 changes the action of the ship A001, and this point is reflected by the fact that the target of the analysis performed on the ship B9705 is the trail of the ship B9705 instead of the ideal course thereof.

In a case where the ship A001 is not, for example, a priority ship under the traffic rule or in a case where the operator of the ship A001 expects that the operator of the ship B9705 misunderstands or otherwise wrongly grasps the priority and will take no evasive action, the operator of the ship A001 perceives the presence of the ship B9705 in advance and takes an evasive action. The evasive action causes the coordinates at each time point along "a trail 9201 of the ship 001" to deviate from the ideal course C. An area where the deviation is equal to or larger than a predetermined threshold is defined as the traffic control special-case area 9709.

"Analysis 9205 of the response speed Tr9994" is a view for describing a method for deriving the time point B9706 and the time point D9708, each of which is a variable necessary for analysis of the response speed Tr9994. The time point when the ship B9705 enters the boundary plane A9701 of the ship A001 is defined as the time point when the ship A001 can perceive the ship B9705 (time point B9706). The time point when "the trail 9201 of the ship A001" deviates from the ideal course C by a fixed value or more (time point D9708) is then defined. The response speed Tr9994 may be calculated on the basis of the difference between the time point B and the time point D.

FIG. 16 shows an example of the data structure of the session table 9804 in the AIS session classifier 101 and session data 9805 in the session DB011.

The session table 9804 is a table that lists "a navigation session that is currently likely to newly receive coordinates AIS000 in the same session."

The session table 9804 has a session data item 9104 as a column item. The session table 9804 may be updated when new coordinates AIS000 are received.

The session data item 9104 holds a group of coordinates AIS000 in the current navigation session. The group of coordinates AIS000 relates the coordinates AIS000 formed of those received when the columns in the session table 9804 are created to those received last in the navigation session to one another.

The session table 9804 may further have a ship name 9101, a last reception time point 9102, a destination 9103, and the session start time point 9111 as the column item relating to session end conditions.

The ship name 9101, the last reception time point 9102, and the destination 9103 may be the same as "the ship name 9501," "the reception time point 9502," and "the destination 9503," respectively, contained in the last received coordinate AIS000 data in the session data item 9104.

The session start time point 9111 may be the same as "the reception time point 9502" contained in the first received coordinate AIS000 data in the session data item 9104.

At the point of time when a certain navigation session ends, the contents of the session data item 9104 in the navigation session are saved as the session data 9805 in the session DB011.

The session data 9805 has AIS data 9110 as the column item. The AIS data 9110 relates the coordinates AIS000 formed of those received at the point of time when a session starts to those last received before the session ends to one another.

The session data 9805 may further have a session ID 9105, a session start time point 9106, the session last time point 9107, a destination 9108, and an AIS reception time point 9109 as the column item for increasing the speed of DB search.

The session ID 9105 is an ID of a session issued whenever the session data 9805 is generated.

The session start time point 9106 represents the time point of reception of the coordinates AIS000 received when the session starts.

The session last time point 9107 represents the time point of reception of the coordinates AIS000 last received before the session ends.

The destination 9108 represents object information which is described in the coordinates AIS000 last received before the session ends, or a name of a port existing in a described coordinate.

The AIS reception time point 9109 represents the time point of each of the coordinates AIS000 in the AIS data 9110.

FIG. 17 shows an example of the data structure of the instruction responsiveness DB007.

The instruction responsiveness data 9007 has the ship name 9101, Sp_ship9920, Sp_time9921, Sp_skill9922, a response speed (first) 9003, the ignorance count 9004, and the reception count 9005 as the column item.

The instruction responsiveness data 9007 may have a last update time point 9002 as the column item for increasing the speed of reference operation.

The instruction responsiveness data 9007 may further have the number of analysis actions 9928 and response speeds (second to N-th) 9006 as the column item for more precise analysis.

The ship name 9101 is an ID allocated to each ship and may be the same as that in analyzed session data.

The response speed (first) 9003 is the response speed Tr9994 of a target ship. The response speed (first) 9003 is calculated in the processes from steps 501 to 510 carried out by the response speed estimator 102.

The response speeds (second to N-th) 9006 are calculated by carrying out the processes in steps 501 to 510 on a plurality of ships.

The ignorance count 9004 and the reception count 9005 are calculated in the processes in steps 601 to 616 carried out by the instruction observance degree analyzer 105.

Sp_ship9920 is calculated in the processes in steps 701 to 706 carried out by the instruction target skill analyzer 104.

Sp_time9921 and Sp_skill9922 are updated in the process in loop 712 carried out by the instruction target skill analyzer 104. A last update time point 9902 may be "a reception time point 9502" at "the last coordinates AIS000 in an analyzed session" at the point of time when loop 712 ends last.

The number of analysis actions 9928 represents the number of sessions used in the analysis. The number of analysis actions 9928 may be increased by one whenever the analysis is performed.

Figure 18:
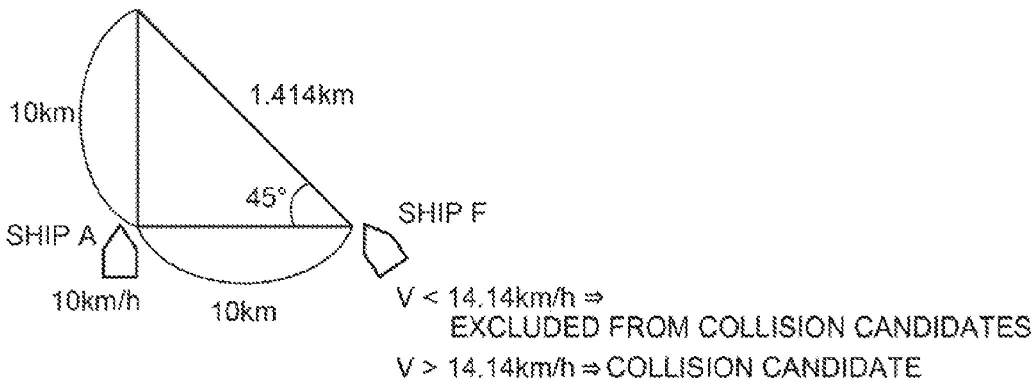
FIG. 18 shows an example of a method for calculating a ship having a risk of collision with a ship A in the procedure of the response speed Tr.

FIG. 18 shows an example of a calculation method for inversely calculating a ship having a risk of collision with the ship A001 in the procedure of the response speed Tr9994.

The ship A001 is traveling due north at a speed of 10 km/h. A ship F9703 is present east of the ship A001 and separate therefrom by 10 km and is traveling in the northwest direction (in the direction inclining by 45° with respect to north direction). Assuming that the ships are traveling in these directions, the distance over which the ship F9703 is supposed to travel until it reaches the same longitude as that of the ship A001 is "10 km×√2=14.14 km." In this case, the ship A001 can avoid collision with the ship F9703 as long as the ship A001 is present at a latitude outside the navigation range of the ship F9703.

To allow the ship F9703 to reach the same longitude as that of the ship A001, the ship F9703 needs to travel by 10 km both in the longitude and latitude directions.

The period required for the ship A001 to travel by 10 km is "10 km/(10 km/h)=1 hour."

Therefore, in a case where it takes 1 hour or more for the ship F9703 to travel over 14.14 km (in a case where the ship F9703 travels at a speed of 14.14 km/h or less), it "cannot be predicted" that the ship F9703 collides with the ship A001, and the ship F9703 is therefore excluded from the evasion target candidate ships 9702.

Whether or not collision occurs may be determined by fixing the bow direction 9506 of the ship F9703, fixing the speed 9505, or using an agent simulation that predicts the course of the ship F9703, or may be based on a model configured in advance by the traffic controller 016 or a system developer.

FIG. 19 shows an example of the data structure of the coordinate AIS data 000.

The coordinate AIS data 000 may have an internationally defined data structure.

The coordinate AIS data 000 may have "the ship name 9501," "the reception time point 9502," "the destination 9503," "the transmission time point 9504," "the speed 9505," "the bow direction 9506," and other factors as the column item. The data may be generated by the ship A001.

Typically, "the ship name 9501," "the reception time point 9502," "the destination 9503," "the speed 9505," and "the bow direction 9506" are information necessary for the analysis.

The ship name 9501 may be expressed by the MMSI number, which is a numeral specific to AIS.

The reception time point 9502 represents the time point when the traffic control system or an AIS transceiver receives an AIS signal.

The transmission time point 9504 represents the time point when the traffic control system or the AIS transceiver transmits an AIS signal.

The destination 9503 represents the name of a destination configured by the operator of the ship.

The speed 9505 represents the navigation speed of the ship.

The bow direction 9506 represents the direction in which the ship is traveling.

FIG. 20 shows an example of the data structure of the traffic control instruction distribution DB.

The traffic control instruction distribution DB may have the instruction sentence 7901 and a distribution time point 7902 as the column item. The traffic control instruction distribution DB may further have a category 7903, a traffic control target 7904, and distribution place coordinates 7905 as the column item for increasing the speed of the analysis.

The distribution time point 7902 is the time point when a traffic control instruction AIS015 is distributed from the traffic control system.

The instruction sentence 7901 is an instruction content of the traffic control instruction AIS015 distributed at the distribution time point 7902.

The distribution time point 7902 and the instruction sentence 7901 may be added whenever a traffic control instruction AIS015 is received.

The category 7903 represents the intention of the instruction sentence 7901. For example, the category 7903 may include "avoid coordinates," "move to coordinates," and "acceleration/deceleration."

The traffic control target 7904 represents a target to which the instruction sentence 7901 is applied.

The category 7903 and the traffic control target 7904 may be derived by analysis of the content of the instruction sentence 7901, for example, with the aid of natural language processing.

The distribution place coordinates 7905 represent the coordinates of the distribution place 9713 where a transmitted traffic control instruction AIS015 can be used. The distribution place coordinates 7905 may be specified on the basis of the distance to the traffic control target 7904 or may be the coordinates of all distribution places.

The fact that a distribution place has distributed a traffic control instruction AIS015 may be transmitted to the traffic control system. The traffic controller 016 may be capable of manually correcting, adding, and deleting data in all the column items described above.

FIG. 21 shows an example of the data structure of the ship information DB009.

The ship information DB009 may have "the ship name 9501" as the column item.

The ship information DB009 may further have "loadage 7703," "a ship width 7704," "a ship length 7705," "a ship bottom depth 7706," "a maximum log speed 7707," and other factors as the column item corresponding to the geographic information to be analyzed and the type of accident risk.

The ship information DB009 may further have "a ship type 7702," "a registered name 7701," and other factors as the column item for improving the convenience to a user, for example, by displaying them on a user interface.

The pieces of information described above may be acquired from a shipping register, a catalog, and other documents.

FIG. 22 shows an example of the data structure of the geographic information DB006.

The geographic information DB006 may have "a mesh ID 7601" as the column item.

The geographic information DB006 may further have "an ocean current 7603," "a shallow water 7604," "drift ice 7605," "weather 7606," "oceanographic phenomena 7607," "topology 7608," "a shoal of fish 7609," and other factors as the column item corresponding to the geographic information to be analyzed and the type of accident risk.

The mesh ID 7601 is an ID representing a mesh in a traffic controlled sea area. The mesh ID 7601 is uniquely allocated to each mesh to be analyzed. The mesh ID 7601 may link each mesh to the coordinates representing an area.

The ocean current 7603, the shallow water 7604, the drift ice 7605, the weather 7606, the oceanographic phenomena 7607, the topology 7608, and the shoal of fish 7609 are generated by using the geographic requirement skill analyzer 103 to analyze the pieces of geographic information corresponding to the items described above and obtained from the corresponding geographic information provider/probe sensor 008.

A sea area ID 7602 is the unit of a set of predetermined number of meshes. The sea area ID 7602 may be determined on the basis of the geographic information, may be a set of meshes so divided as to each have a predetermined size, may be determined on the basis of the degree of ship congestion or the magnitude of an accident risk, or may be manually configured by the traffic controller 016.

Figure 23:
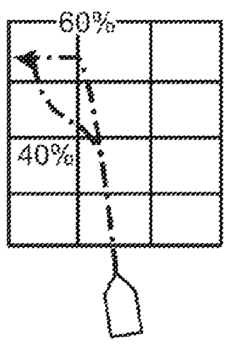
FIG. 23 shows the data structure of a geographic E map DB.

FIG. 23 shows an example of the data structure of the geographic E map DB013.

The geographic E map DB013 may have "the ship name 9501," "a map time point 7502," and "the geography E9997" as the column item.

The geographic E map DB013 may further have “a map ID 7501” and “a following time point map ID 7503” as the column item for increasing the speed of the analysis.

The geographic E map DB013 may further have “a latitude 7504” and “a longitude 7505” as the column item for increasing the speed of the following analysis.

The map time point 7502 represents the time point when geographic information in a geographic E map is analyzed. The map time point 7502 may be calculated by successively adding the unit time 9991 to the system time point.

The map ID 7501 is an ID of an analyzed geographic E map.

The following time point map ID 7503 is an ID of a geographic E map 9999 for the ship name 9501, specifically, the geographic E map 9999 generated after the map time point 7502 but further after the following unit time 9991. That is, the following time point map ID 7503 is an ID of the geographic E map 9999 to be analyzed next.

The latitude 7504 and the longitude 7505 are coordinates of the center point of the mesh having the mesh ID 7601. The coordinates corresponding to the mesh ID 7601 may be held as a separate column item because the coordinates are used in the following processes many times.

FIG. 24 shows an example of the data structure of the course prediction DB014.

The course prediction DB014 may have “the ship name 9501,” “the map time point 7502,” and “a presence mesh 7404” as the column item.

The course prediction DB014 may further have “a course ID 7401,” “the latitude 7504,” “the longitude 7505,” “the sea area ID 7602,” “a latitude speed 7402,” and “a longitude speed 7403” as the column item showing analysis supplementary information.

The course ID 7401 is an ID of the predicted course calculated by the course predictor 202.

The presence mesh 7404 is an ID of a mesh where the ship having the ship name 9501 is possibly present at the map time point 7502. The presence mesh 7404 may be coordinates most probably selected by the course predictor 202 or may be a result of analysis performed by allocating the course ID to each probability.

The latitude speed 7402 and the longitude speed 7403 are speeds of the ship having the ship name 9501 at each map time point 7502 in the latitude direction and the longitude direction, respectively. The latitude speed 7402 and the longitude speed 7403 may be calculated by migration of the latitude 7504 and the longitude 7505 at each map time point 7502.

FIG. 25 shows an example of the data structure of accident risk data.

The accident risk data has “a maximum accident risk 7307” as the column item and has at least one of “a traffic control target ship name 7303” and “a traffic control target course ID 7304.”

The accident risk data may further have “an analysis ID 7301,” “a target sea area 7306,” “traffic control priority 7302,” “the mesh ID 7601,” and “an accident risk 7305” as the column item showing analysis supplementary information.

The analysis ID is an ID of an accident risk analysis result calculated by the traffic control risk simulator 203.

The traffic control priority 7302 is a relative index representing the degree of necessity, calculated by the traffic risk evasive action determiner 204, for evasive action exploration performed by the traffic risk evasive action explorer 205. The traffic control priority 7302 may be calculated on the basis of the maximum accident risk 7307.

The traffic control target ship name 7303 is the ship name 9501 of one or more ships selected as analysis targets by the traffic control risk simulator 203.

The traffic control target course ID 7304 is one or more course IDs 7401 selected as analysis targets by the traffic control risk simulator 203.

The accident risk 7305 is a value representing the possibility of occurrence of an accident at the mesh having a specific mesh ID 7601. The accident risk 7305 may be a value calculated in step 1007.

The target sea area 7306 is one or more sea areas having one or more sea area IDs 7602 where analysis is performed on the traffic control target course ID 7304 or the traffic control target ship name 7303 under the analysis.

The maximum accident risk 7307 is the maximum value of the accident risk 7305 for the same analysis ID 7301.

FIG. 26 shows an example of the data structure of an evasion method instruction.

Data on the evasion method instruction may have “a traffic control target ship 7210,” “an overall traffic control action risk 7201,” “a traffic control time point 7202,” “a traffic control latitude 7203,” “a traffic control longitude 7204,” “a traffic control speed 7205,” “a traffic control bow angle 7206,” and “the traffic control action risk 7207” as the column item.

The data on the evasion method instruction may further have “a traffic control instruction target sea area 7208” and “an evasion ID 7209” as the column item showing analysis supplementary information.

The evasion ID 7209 is an ID of the evasion plan calculated by the traffic risk evasive action explorer 205.

The traffic control target ship 7210 is the ship name 9501 that is a target of an evasive action. The evasive action may be independently configured for each ship.

The traffic control instruction target sea area 7208 is the sea area ID 7602 that is a target of an evasive action. The traffic control instruction target sea area 7208 may be calculated by using a method for allocating the sea area ID 7602 on the basis of the evasion plan and from the coordinates where the ship travels, or the target sea area 7306 may be directly used as the traffic control instruction target sea area 7208.

The traffic control action risk 7207 represents a risk accompanied by execution of an evasive action. The traffic control action risk 7207 may be the sum of the values of the geography E9997, cumulated in step 1210, at the travel destination of the ship U9402. The traffic control action risk 7207 may be the information on the priority of an accident risk.

The overall traffic control action risk 7201 is the maximum value of the traffic control action risk 7207 for the evasion ID 7209.

The traffic control bow angle 7206, the traffic control speed 7205, the traffic control longitude 7204, the traffic control latitude 7203, and the traffic control time point 7202 are parameters required, after an evasion plan is formulated, for each ship to achieve the evasion plan, specifically, the coordinates of the ship during each unit time 9991 and the navigation speed for achieving the coordinates.

FIG. 27 shows an example of the data structure of the evasion method instruction and evasion order instruction data.

The evasion method instruction and the evasion order instruction data have “the traffic control target ship 7210,” “a distribution time point 7102,” “traffic control instruction distribution priority 7101,” “the instruction sentence 7901,” and “a distribution place ID 7103” as the column item.

The evasion method instruction and the evasion order instruction data may further have "the traffic control instruction target sea area 7208" and "the evasion ID 7209" as the column item showing supplementary information at the point of time of distribution.

The traffic control instruction distribution priority 7101 is an index that is used in traffic control instruction distribution in a case where a plurality of traffic control instructions need to be issued at the same time and assists judgement of the order in which the traffic control instructions are issued. The traffic control instruction distribution priority 7101 may be analyzed by using the overall traffic control action risk 7201 and "one or both of the degree of instruction observance L9993 and the response speed Tr9994 of the traffic control target ship 7210."

The distribution time point 7102 is the time point when the instruction sentence 7901 is distributed.

The distribution place ID 7103 is the coordinates or the ID of the distribution place 9713 from which the instruction sentence 7901 is distributed.

Figure 28:
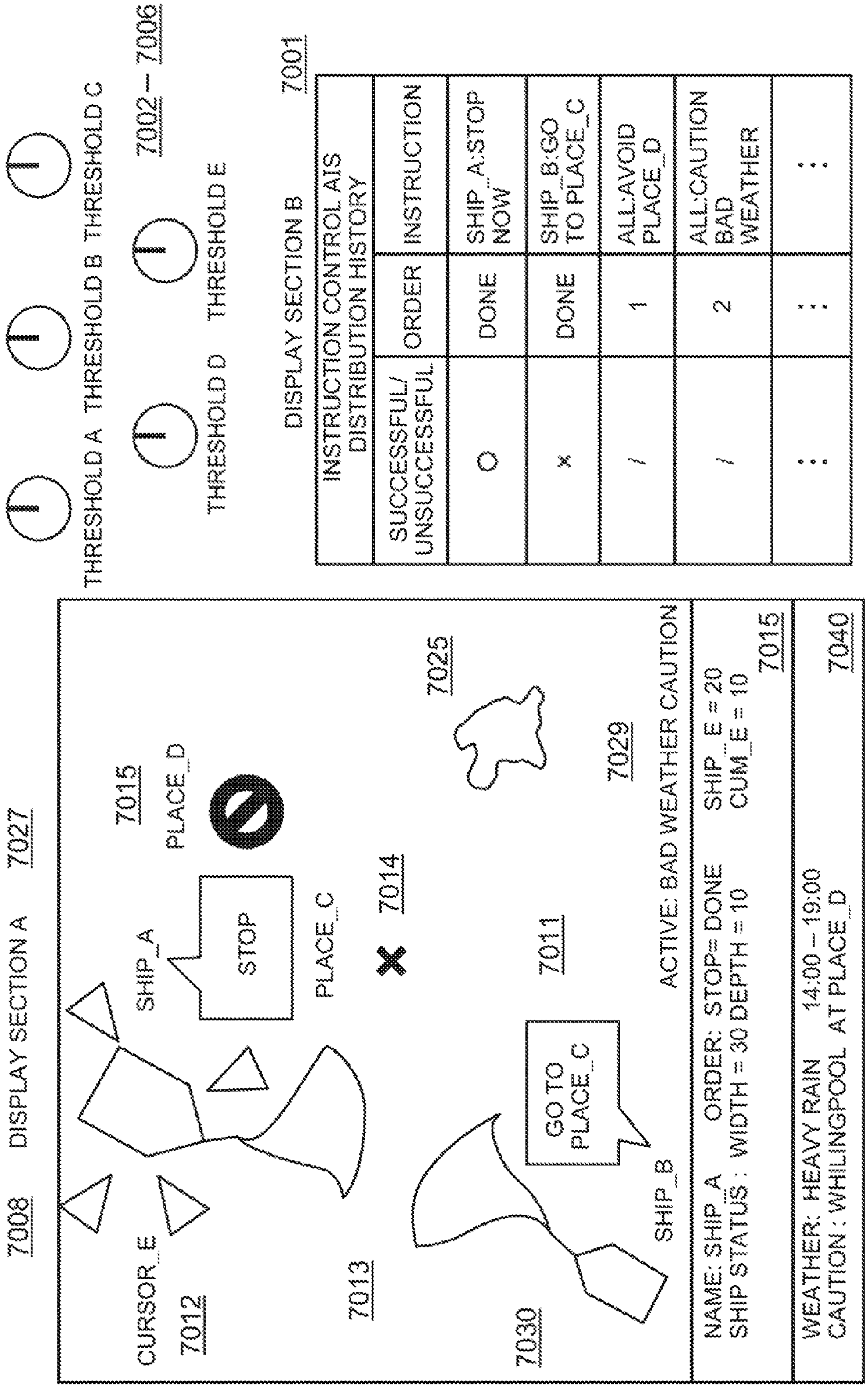
FIG. 28 shows an example of a user interface.

FIG. 28 shows an example of the user interface.

The user interface may include a display section A7008 and a display section B7001.

The display section A7008 and the display section B7001 may be displayed on the same screen or may be displayed on separate screens. Instead, only the display section A7008 or the display section B7001 may be displayed. Still instead, only part of the contents on the display sections may be displayed, or the entirety or part of the information on the contents on the display section B7001 may be transmitted to another interface, apparatus, or ship.

The contents on the display sections shown in the present embodiment may be manipulated by the traffic controller 016, another user, or any other person who operates a touch panel or inputs a request to another interface including, for example, voice, a gesture and/or buttons.

The traffic controller 016 may, for example, place a mark or write a memorandum at any point of the screen.

The display section A7008 may display pieces of information on the traffic control on a map or a mesh structure of a traffic controlled area with the pieces of information superimposed on one another. The pieces of information so displayed as to be superimposed on one another may include, for example, ship name imparted information 7027, a ship silhouette 7030, a ship course prediction range 7013, a traffic control instruction destination PLACE_C7014, a traffic control instruction evasion place PLACE_D7010, an overall traffic control instruction history ACTIVE_E7029, a detailed information illustrating target cursor 7012, a command distribution popup 7011, ship detailed information 7015, and traffic controlled sea area information 7040.

The traffic control instruction destination PLACE_C7014 and the traffic control instruction evasion place PLACE_D7010 represent coordinates where the effects of the two places in the instruction sentence 7901 having been distributed or to be distributed appear. The effects may be displayed in the form of letters or symbols.

The overall traffic control instruction history ACTIVE_E7029 represents the content considered as currently still effective among the traffic control instructions outputted to the whole area. The displayed ACTIVE_E7029 may be kept displayed, may be automatically deleted after fixed time elapses, or may be manually deleted by the traffic controller 016.

A geographic construct 7025 represents a construct other than ships displayed on the display section A7008. Information acquired from the geographic information DB006 may be embedded in the position where the geographic construct 7025 is displayed. Further, the geographic construct 7025 may be converted into an OBJECT, and the traffic controller 016 may add information or a mark thereto.

The detailed information illustrating target cursor 7012 points a target that displays the ship detailed information 7015. The display target may be the ship silhouette 7030 or any other geographic construct 7025. The detailed information illustrating target cursor 7012 may move along with a target ship silhouette 7030 or may be manually moved by the traffic controller 016 on the screen rightward, leftward, upward, and downward.

The command distribution popup 7011 represents the content of an instruction issued to a ship. The command distribution popup 7011 may move along with the ship silhouette 7030 or the ship name imparted information 7027, may be stationary and displayed at a fixed location, or may be manually moved to any other position by the traffic controller 016.

The ship name imparted information 7027 represents the ship name 9501. The ship name imparted information 7027 may move along with the ship silhouette 7030 or may be differentiated, for example, by coloring from the other portions and displayed at a fixed location.

The ship detailed information 7015 represents detailed information on a ship, the ship silhouette 7030, or the geographic construct 7025 selected with the detailed information illustrating target cursor 7012. The detailed information may, for example, be the ship name 9501, a target instruction sentence 7901, the degree of application of the instruction sentence 7901, the specifications of the ship, geographic E prediction during navigation, the name of the captain, means for communicating with the ship, and other pieces of information.

The ship silhouette 7030 represents the presence of a ship. The ship silhouette 7030 may change in accordance with the size of the ship, may have a fixed size, or may be information, such as a color painted on a mesh.

The ship course prediction range 7013 is a range which is calculated by the course predictor 202 and where a ship is expected to travel. The ship course prediction range 7013 may be expressed by a linear shape, a fan-like shape, a triangular shape, or a colored portion on a mesh or may be expressed by connected lines representing an actual predicted range.

The traffic controlled sea area information 7040 represents detailed information on the entire sea area. The detailed information may, for example, be the weather/oceanographic phenomena, an ocean current, an accident risk, a sunken ship, and other pieces of information.

A display section B represents a history of distributed traffic control instructions AIS015. The display section B may show the order in which instruction sentences 7901 will be distributed or have been distributed. In the display section B, a mark may be placed to a history showing that an instruction sentence has already been distributed. Further, since whether or not a traffic control instruction has been applied to a ship is determined in the learning phase 004, which operates concurrently with the traffic control phase 005, the display section B may display a result of the determination.

A threshold A display section 7002, a threshold B display section 7003, a threshold C display section 7004, a threshold D display section 7005, and a threshold E display section 7006 show information on the threshold A8800, the threshold B8801, the threshold C8803, the threshold D8804, and the threshold E8805, respectively.

According to the present embodiment, a maritime traffic controller can establish a traffic control instruction plan in consideration of the responsiveness to an instruction to a ship. Further, the possibility of observance of a distributed instruction is improved. Moreover, an accident risk of a ship can be automatically calculated. Further, the maritime traffic controller can reduce time for carefully watching the sea area of a traffic controlled area. Further, a traffic control proposal that allows a long inter-ship navigation distance can be distributed. The probability of a ship operator's observance of a distributed traffic control proposal can be improved. Further, the amount of calculation necessary for prediction of a course of a ship is reduced in accordance with a person's response speed.

Second Embodiment

Using the system described above to distribute intermediate data generated in the learning phase 004 and the traffic control phase 005 via a data interface 8001 allows a data user 8002 to form a data use/application system 8003, which uses the intermediate data.

Figure 29:
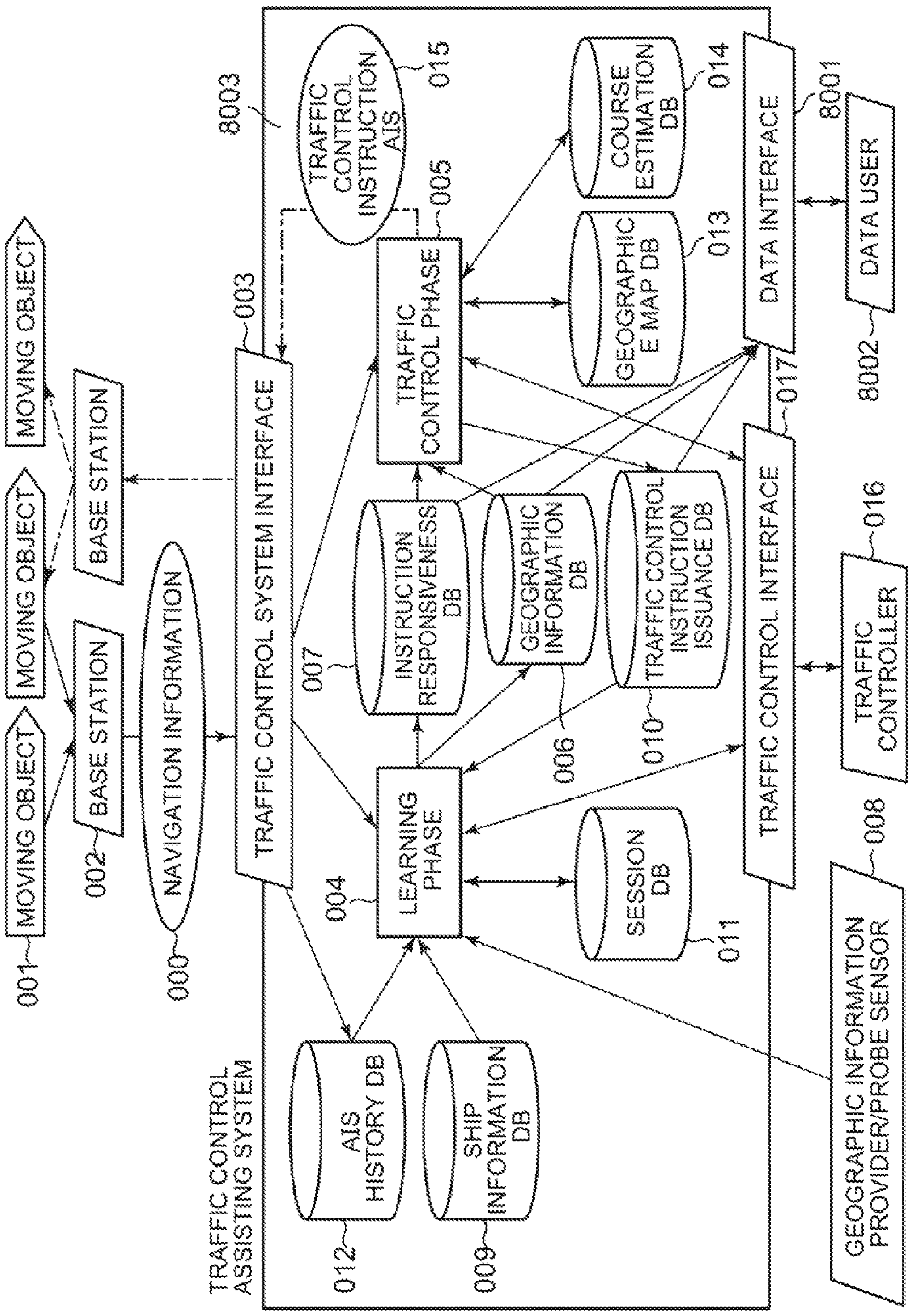
FIG. 29 is a block diagram of a data use/application system.

FIG. 29 is a block diagram showing an example of the configuration of the data use/application system 8003. In the following section, only the difference from FIG. 1 will be described. Other items may be the same as those in FIG. 1.

FIG. 29 shows an example of the system 8003 that analyzes the degree of danger of navigation by using the instruction responsiveness of a ship. The system 8003 is, for example, provided to the data user 8002, such as an insurance agent, via a network or any other medium.

The system 8003 provides, for example, a module, an API, and/or a program that estimates the degree of danger. For example, an insurance agent can use, when calculating an accident risk of a ship, for example, the module, the API, and/or the program provided by the system 8003 to acquire the degree of danger of the ship. In this case, the system 8003 may use part or entirety of "the response speed Tr9994," "the instruction target skill Sp9996," "the degree of instruction observance L9993," and "the geographic requirement skill Se9995" to generate a model of the degree of danger of the ship. The insurance agent may then use the generated model of the degree of danger of the ship to calculate insurance fees.

Another example of the data user 8002 may include a port transporter, a land transporter, a custom worker, a port entry manager, and other "transportation companies." For example, the "transportation companies" described above can refer to information on the geographic E map DB013 and the course prediction DB014 and roughly calculate, for example, a cargo arrival time point and influence of a navigation environment on the cargo to optimize own work time scheduling. The optimization of the scheduling may include a path map for automatic or manual driving of a vehicle or any other tool used to transport a cargo in a port.

The embodiments described above are presented by way of example for description of the present invention, and the range of the present invention is not intended to be limited to the embodiments. A person skilled in the art can implement the present invention in a variety of other aspects without departing from the substance of the present invention.

For example, the traffic control assisting system 9900 may an interface section, a storage section, and a processor section coupled thereto. The interface section may be one or more interface devices. The one or more interface devices may be at least one of one or more communication interface devices and one or more user interface devices. The storage section may be at least one of one or more memories and one or more non-volatile storage devices. The processor section may be one or more processors (e.g. CPUs). The processor section may execute one or more computer programs in order to realize the above mentioned functions.

In addition, the traffic control assisting system 9900 may be constituted by one or more computers. Specifically, for example, when a first computer displays information (specifically, when the first computer displays information on its own display device which is an example of an interface device (or when the first computer transmits information for display to a remote second computer (display computer)), the first computer is the traffic control assisting system 9900.

What is claimed is:

1. A traffic control assisting system comprising:

a storage section being at least one of one or more memories and one or more non-volatile storage devices; and a processor section being one or more processors coupled to the storage section, the storage section being configured to store action data on an action of a moving object, geographic data in which geographic attribute information, which is information on a reference of movement of the moving object, is imparted to individual segments that are meshes into which a map is divided, and responsiveness data on the moving object's responsiveness to an instruction;

the processor unit being configured to execute the following processes, an instruction responsiveness estimate process which is a process including processes of estimating an ideal action of the moving object based on the responsiveness data, calculating a difference between the estimated action and an action in the action data, and updating the responsiveness data based on a result of the calculation, a geographic E map generating process which is a process including processes of estimating probability of presence of the moving object at certain coordinates at each time point based on the action data, the geographic data, and the responsiveness data and generating a geographic E map, and a travel predicting process which is a process including a process of predicting future coordinates of the moving object based on the geographic E map.

2. The traffic control assisting system according to claim 1, wherein the geographic E map generating process includes a process of invoking the instruction responsiveness estimate process to update the responsiveness data and the process of generating the geographic E map.

3. The traffic control assisting system according to claim 1, wherein the processor section is configured to further execute the following process, a traffic control risk simulating process which is a process including process of estimating a segment where an accident risk is higher than a predetermined threshold based on the geographic data and the responsiveness data and issuing a warning about the estimated segment.

4. The traffic control assisting system according to claim 1, wherein the processor section is configured to further execute the following process, a traffic risk evasive action exploring process which includes processes of exploring an action plan that allows an accident risk of the moving object to be lower than a predetermined threshold based on the geographic E map and generating an evasion command based on the explored action plan.

5. The traffic control assisting system according to claim 4, wherein the processor section is configured to further execute the following process, a traffic control instructing process which includes a process of determining, based on the responsiveness data, priority in accordance with which a traffic control instruction is distributed.

6. The traffic control assisting system according to claim 1, wherein the processor section is configured to further execute the following process, a session classifying process which is a process including process of classifying the action data into a plurality of sessions based on acceleration/deceleration, a destination, and a time point in the action data and forwarding a result of the classification to the instruction responsiveness estimator.

7. The traffic control assisting system according to claim 2, wherein the instruction responsiveness estimate process includes the following processes, a process of calculating, based on a difference between an ideal action pattern of the moving object and the action data, probability of the moving object's changing an action thereof, after receiving an instruction, in accordance with the instruction, and a process of updating the responsiveness data based on the calculated probability.

8. The traffic control assisting system according to claim 2, wherein the instruction responsiveness estimate process includes the following processes, a process of calculating, based on a difference between an ideal action pattern of the moving object and the action data, a response speed at which the moving object, after receiving an instruction, changes an action thereof in accordance with the instruction, and a process of updating the responsiveness data based on the calculated response speed.

9. The traffic control assisting system according to claim 2, wherein the instruction responsiveness estimate process includes the following process, a process of correcting an amount of increase or decrease in action skill based on a difference between an end time point of a preceding action session of the moving object and start a time point of a current action session of the moving object, and the action skill is an amount of the moving object's action skill and is contained in the responsiveness data.

10. The traffic control assisting system according to claim 2, wherein the instruction responsiveness estimate process includes the following processes, a process of calculating, based on action specifications of the moving object and geographic data on the travel target section at each time point, a degree of difficulty for the moving object in traveling through a travel target section, and a process of calculating, based on the calculated degree of difficulty, action skill necessary for the moving object to travel through the travel target section, and the action skill is an amount of the moving object's action skill and is contained in the responsiveness data.

11. The traffic control assisting system according to claim 10, wherein the instruction responsiveness estimate process includes the following processes, a process of calculating, based on an action history of the moving object contained in the action data, the degree of difficulty for the moving object in having traveled a section and, a processing of correcting the moving object's action skill based on a result of the calculation.

12. The traffic control assisting system according to claim 11, wherein the instruction responsiveness estimate process includes the following process, a process of evaluating the moving object and a moving object in a predetermined model case relative to each other to separately analyze difficulty for the moving object in traveling through the travel target section and the moving object's performance that handles the difficulty.

13. The traffic control assisting system according to claim 1, wherein the processor section is configured to further execute the following process, a process of displaying information on priority of a traffic control instruction to the moving object and information on responsiveness to the traffic control instruction with the information superimposed on a map including coordinates of the moving object.

14. The traffic control assisting system according to claim 11, wherein the processor section is configured to further execute the following process, a process of providing an API for inputting the action data, the geographic data, and the responsiveness data and a process of providing an API for accessing the moving object's responsiveness data calculated by the instruction responsiveness estimator.

15. The traffic control assisting system according to claim 14, the processor section is configured to further execute the following process, a process of calculating a degree of danger of an operator of the moving object based on moving object's responsiveness data, a process of providing an API for accessing the calculated degree of danger of the operator of the moving object.

16. A traffic control assisting method comprising:

executing, by a processor, an instruction responsiveness estimate process which is a process including processes of estimating an ideal action of the moving object based on responsiveness data, calculating a difference between the estimated action and an action in the action data, and updating the responsiveness data based on a result of the calculation, the responsiveness data being data on the moving object's responsiveness to an instruction;

executing, by the processor, a geographic E map generating process which is a process including processes of estimating probability of presence of the moving object at certain coordinates at each time point based on action data, geographic data, and the responsiveness data and generating a geographic E map, the action data being data on an action of a moving object, geographic data being data in which geographic attribute information, which is information on a reference of movement of the moving object, is imparted to individual segments that are meshes into which a map is divided, and executing, by the processor, a travel predicting process which is a process including a process of predicting future coordinates of the moving object based on the geographic E map.

* * * * *